(12) United States Patent
Umeda

(10) Patent No.: US 12,228,713 B2
(45) Date of Patent: Feb. 18, 2025

(54) VARIABLE MAGNIFICATION OPTICAL SYSTEM, OPTICAL APPARATUS, AND METHOD FOR PRODUCING VARIABLE MAGNIFICATION OPTICAL SYSTEM

(71) Applicant: Nikon Corporation, Tokyo (JP)

(72) Inventor: Takeshi Umeda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 18/367,995

(22) Filed: Sep. 13, 2023

(65) Prior Publication Data
US 2024/0077709 A1 Mar. 7, 2024

Related U.S. Application Data

(63) Continuation of application No. 17/535,915, filed on Nov. 26, 2021, now Pat. No. 11,789,245, which is a
(Continued)

(51) Int. Cl.
*G02B 15/14* (2006.01)

(52) U.S. Cl.
CPC .............. *G02B 15/144105* (2019.08); *G02B 15/145105* (2019.08); *G02B 15/145121* (2019.08); *G02B 15/1461* (2019.08)

(58) Field of Classification Search
None
See application file for complete search history.

(56) References Cited

U.S. PATENT DOCUMENTS 4,861,145 A * 8/1989 Kikuchi ......... G02B 15/145113
359/687
11,231,566 B2 1/2022 Umeda
(Continued)

FOREIGN PATENT DOCUMENTS

CN 101470255 A 7/2009
JP 2008-076493 A 4/2008
(Continued)

OTHER PUBLICATIONS

International Search Report from International Patent Application No. PCT/JP2017/032696, Dec. 12, 2017.
(Continued)

*Primary Examiner* — Darryl J Collins
(74) *Attorney, Agent, or Firm* — Potomac Law Group, PLLC

(57) ABSTRACT

A variable magnification optical system comprising, in order from an object side, a first lens group having positive refractive power, a second lens group having negative refractive power, a third lens group having positive refractive power, and a rear lens group having negative refractive power; upon varying a magnification from a wide angle end state to a tele photo end state, a distance between the first lens group and the second lens group being varied, a distance between the second lens group and the third lens group being varied, and a distance between the third lens group and the rear lens group being varied; the third lens group or the rear lens group comprising a focusing lens group which is moved upon carrying out focusing from an infinitely distant object to a closely distant object; and predetermined conditional expression(s) being satisfied, thereby various aberrations being corrected superbly.

21 Claims, 37 Drawing Sheets

Related U.S. Application Data continuation of application No. 16/645,564, filed as application No. PCT/JP2017/032696 on Sep. 11, 2017, now Pat. No. 11,231,566.

(56) References Cited

U.S. PATENT DOCUMENTS

| | | | |
|---|---|---|---|
| 2008/0088945 | A1 | 4/2008 | Satori |
| 2008/0231969 | A1* | 9/2008 | Satori ............ G02B 15/145121 359/683 |
| 2009/0161227 | A1 | 6/2009 | Yamamoto et al. |
| 2011/0102905 | A1 | 5/2011 | Harada |
| 2011/0267708 | A1 | 11/2011 | Kon |
| 2011/0286105 | A1 | 11/2011 | Yamanaka et al. |
| 2012/0092777 | A1* | 4/2012 | Tochigi .......... G02B 15/145121 359/684 |
| 2012/0242887 | A1 | 9/2012 | Matsumura et al. |
| 2012/0293872 | A1 | 11/2012 | Katayose |
| 2013/0242166 | A1 | 9/2013 | Hosoi et al. |
| 2014/0347545 | A1 | 11/2014 | Okibane |
| 2014/0362452 | A1 | 12/2014 | Obama |
| 2015/0085165 | A1 | 3/2015 | Maruyama et al. |
| 2015/0219882 | A1 | 8/2015 | Mog |
| 2015/0350557 | A1 | 12/2015 | Tanaka |
| 2016/0062096 | A1 | 3/2016 | Hatada |
| 2016/0077316 | A1* | 3/2016 | Yamamoto ..... G02B 15/144105 359/557 |
| 2016/0154222 | A1 | 6/2016 | Noda et al. |
| 2016/0209632 | A1 | 7/2016 | Imaoka |
| 2016/0223800 | A1* | 8/2016 | Ikegaya ......... G02B 15/145523 |
| 2016/0349491 | A1 | 12/2016 | Suzuki |
| 2017/0242227 | A1 | 8/2017 | Kitada et al. |
| 2017/0248777 | A1 | 8/2017 | Koga |
| 2017/0261728 | A1 | 9/2017 | Shibata et al. |
| 2017/0299944 | A1 | 10/2017 | Matsumura |
| 2017/0371132 | A1 | 12/2017 | Saito |
| 2018/0164558 | A1 | 6/2018 | Saito |
| 2018/0180860 | A1 | 6/2018 | Kurioka et al. |
| 2018/0252895 | A1 | 9/2018 | Hatada |
| 2018/0348478 | A1 | 12/2018 | Mori |

FOREIGN PATENT DOCUMENTS

| | | |
|---|---|---|
| JP | 2011-039101 A | 2/2011 |
| JP | 2011-099925 A | 5/2011 |
| JP | 2011-209347 A | 10/2011 |
| JP | 2011-232624 A | 11/2011 |
| JP | 2011-247962 A | 12/2011 |
| JP | 2012-212106 A | 11/2012 |
| JP | 2013-182022 A | 9/2013 |
| JP | 2013-195619 A | 9/2013 |
| JP | 2014-209226 A | 11/2014 |
| JP | 2015-064492 A | 4/2015 |
| JP | 2015-102587 A | 6/2015 |
| JP | 2015-145914 A | 8/2015 |
| JP | 2016-048355 A | 4/2016 |
| JP | 2016-109721 A | 6/2016 |
| JP | 2016-139125 A | 8/2016 |
| JP | 2016-157143 A | 9/2016 |
| JP | 2017-146588 A | 8/2017 |
| JP | 2017-156428 A | 9/2017 |
| JP | 2017-156741 A | 9/2017 |
| JP | 2018004717 A | 1/2018 |
| JP | 2018-031935 A | 3/2018 |
| JP | 2018-097134 A | 6/2018 |
| JP | 2018-109757 A | 7/2018 |
| JP | 2018-146739 A | 9/2018 |
| JP | 2018-205475 A | 12/2018 |
| WO | WO 2016/031256 A1 | 3/2016 |
| WO | 2017122235 A1 | 7/2017 |

OTHER PUBLICATIONS

Office Action issued Nov. 17, 2020, in Japanese Patent Application No. 2019-540733.
Office Action issued May 21, 2021, in Chinese Patent Application No. 201780094587.9.
Office Action issued Nov. 3, 2021, in Chinese Patent Application No. 201780094587.9.
Office Action issued Feb. 24, 2021, in Japanese Patent Application No. 2019-540733.
Decision of Refusal issued Nov. 24, 2021, in Japanese Patent Application No. 2019-540733.
Office Action issued Nov. 1, 2022, in Japanese Patent Application No. 2022-023649.
Office Action issued May 12, 2023, in Chinese Patent Application No. 202210465260.0.
Office Action issued Nov. 15, 2023, in Chinese Patent Application No. 202210465260.0.
Office Action issued Nov. 6, 2023, in Japanese Patent Application No. 2023-030151.

* cited by examiner

VARIABLE MAGNIFICATION OPTICAL SYSTEM, OPTICAL APPARATUS, AND METHOD FOR PRODUCING VARIABLE MAGNIFICATION OPTICAL SYSTEM

TECHNICAL FIELD

The present invention relates to a variable magnification optical system, an optical apparatus and a method for manufacturing the variable magnification optical system.

BACKGROUND ART

There has been proposed a variable magnification optical system that is small in size but can adopt large-sized image pick-up device suitable for photo-taking a motion picture and for effecting high speed focusing. For example, refer to Japanese Patent application Laid-Open Gazette No. 2015-064492. However, in the conventional variable magnification optical system, corrections of various aberrations have not been made sufficiently.

PRIOR ART REFERENCE

Patent Document

Patent Document 1: Japanese Patent application Laid-Open Gazette No. 2015-064492.

SUMMARY OF THE INVENTION

The present invention is related to a variable magnification optical system comprising, in order from an object side, a first lens group having positive refractive power, a second lens group having negative refractive power, a third lens group having positive refractive power, and a rear lens group having negative refractive power;

upon varying a magnification, a distance between said first lens group and said second lens group being varied, a distance between said second lens group and said third lens group being varied, and a distance between said third lens group and said rear lens group being varied;

said third lens group or said rear lens group comprising a focusing lens group which is moved upon carrying out focusing; and the following conditional expressions being satisfied:

$$2.00 < f1/fw < 8.000$$

$$0.400 < BFw/fw < 1.300$$

where f1 denotes a focal length of said first lens group, fw denotes a focal length of said variable optical system in a wide angle end state, BFw denotes a back focus of said variable magnification optical system in the wide angle end state, and fw denotes the focal length of said variable magnification optical system in the wide angle end state.

Further, the present invention is related to a method for manufacturing a variable magnification optical system comprising, in order from an object side, a first lens group having positive refractive power, a second lens group having negative refractive power, a third lens group having positive refractive power, and a rear lens group having negative refractive power; comprising the steps of:

constructing such that, upon varying a magnification, a distance between said first lens group and said second lens group is varied, a distance between said second lens group and said third lens group is varied, and a distance between said third lens group and said rear lens group is varied;

constructing such that said third lens group or said rear lens group comprises a focusing lens group which is moved upon carrying out focusing; and constructing such that the following conditional expressions are satisfied:

$$2.00 < f1/fw < 8.000$$

$$0.400 < BFw/fw < 1.300$$

where f1 denotes a focal length of said first lens group, fw denotes a focal length of said variable optical system in a wide angle end state, BFw denotes a back focus of said variable magnification optical system in the wide angle end state, and fw denotes the focal length of said variable magnification optical system in the wide angle end state.

EMBODIMENT FOR CARRYING OUT THE INVENTION

Figure 1A:
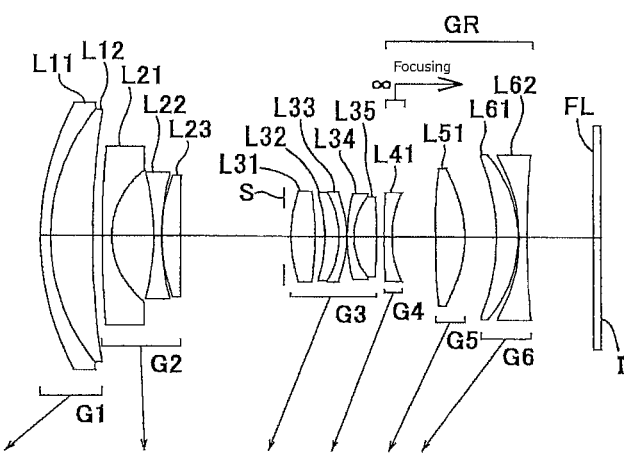
FIG. 1A, FIG. 1B and FIG. 1C are cross sectional views in the wide angle end state, in the intermediate focal length state and in the telephoto end state, respectively, of a variable magnification optical system according to a First Example.

Hereinafter, a variable magnification optical system according to the present embodiment, an optical apparatus and a method for producing the variable magnification optical system, will be explained. At first, the variable magnification optical system according to the present embodiment will be explained.

The variable magnification optical system according to the present embodiment comprises, in order from an object side, a first lens group having positive refractive power, a second lens group having negative refractive power, a third lens group having positive refractive power, and a rear lens group having negative refractive power;

upon varying a magnification from a wide angle end state to a telephoto end state, a distance between said first lens group and said second lens group being varied, a distance between said second lens group and said third lens group being varied, and a distance between said third lens group and said rear lens group being varied;

said third lens group or said rear lens group comprising a focusing lens group which is moved upon carrying out focusing from an infinite distance object to a close distance object; and the following conditional expressions (1) and (2) being satisfied:

$$2.00 < f1/fw < 8.000 \qquad (1)$$

$$0.400 < BFw/fw < 1.300 \qquad (2)$$

where f1 denotes a focal length of said first lens group, fw denotes a focal length of said variable optical system in a wide angle end state, BFw denotes a back focus of said variable magnification optical system in a wide angle end state, and fw denotes the focal length of said variable magnification optical system in the wide angle end state.

The rear lens group of the variable magnification optical system according to the present embodiment comprises at least one lens group. Meanwhile, in the present embodiment, a lens group means a portion which comprises at least one lens separated by an air space. Further, in the present embodiment, a lens component means a single lens or a cemented lens composed of two or more lenses cemented with each other.

The variable magnification optical system according to the present embodiment can conduct superbly aberration corrections upon varying a magnification, by varying respective distances between the lens groups upon varying magnification from a wide angle end state to a telephoto end state. Further, the focusing lens group may be made small in size and reduced in weight by disposing the focusing lens group in the third lens group or in the rear lens group, and as a result, high speed focusing becomes possible and the variable magnification optical system and the lens barrel can be small-sized.

The conditional expression (1) defines a ratio of a focal length of the first lens group to a focal length of the variable optical system in the wide angle end state. With satisfying the conditional expression (1), the variable magnification optical system according to the present embodiment can correct superbly coma aberration and other various aberrations in the wide angle end state.

When the value of f1/fw is equal to or exceeds the upper limit of the conditional expression (1), refractive power of the first lens group becomes small, and it becomes difficult to correct superbly various aberrations in the wide angle end state. Meanwhile, in order to secure the advantageous effect of the present embodiment more surely, it is preferable to set the upper limit value of the conditional expression (1) to 7.000. Further, in order to secure the advantageous effect of the present embodiment much more surely, it is preferable to set the upper limit value of the conditional expression (1) to 6.500, and much more preferable to 6.300.

On the other hand, when the value of f1/fw is equal to or falls below the lower limit of the conditional expression (1), refractive power of the first lens group becomes large, and it becomes difficult to correct superbly various aberrations in the wide angle end state, and in particular, coma aberration. Meanwhile, in order to secure the advantageous effect of the present embodiment more surely, it is preferable to set the lower limit value of the conditional expression (1) to 3.00. In order to secure the advantageous effect of the present— embodiment much more surely, it is preferable to set the lower limit value of the conditional expression (1) to 4.00 and more preferable to 4.50.

The conditional expression (2) defines a ratio of a back focus of the variable magnification optical system in the wide angle end state to a focal length of the variable magnification optical system in the wide angle end state.

With satisfying the conditional expression (2), the variable magnification optical system according to the present embodiment can correct superbly a coma aberration and other various aberrations in the wide angle end state. Meanwhile, by the term "back focus" is meant a distance from the most image side lens surface to the image plane on the optical axis.

When the value of BFw/fw is equal to or exceeds the upper limit of the conditional expression (2), the back focus of the variable magnification optical system in the wide angle end state relative to the focal length of the variable magnification optical system in the wide angle end state becomes large and it becomes difficult to correct superbly various aberrations in the wide angle end state. Meanwhile, in order to attain the advantageous effect of the present embodiment more surely, it is preferable to set the upper limit value of the conditional expression (2) to 1.000. Further, in order to attain the advantageous effect of the present embodiment much more surely, it is preferable to set the upper limit value of the conditional expression (2) to 0.950 and much more preferable to 0.900.

On the other hand, when the value of BFw/fw is equal to or falls below the lower limit of the conditional expression (2), the back focus of the variable magnification optical system in the wide angle end state relative to the focal length of the variable magnification optical system in the wide angle end state becomes small, and it becomes difficult to correct various aberrations in the wide angle end state, and in particular coma aberration superbly. Meanwhile, in order to secure the advantageous effect of the present embodiment more surely, it is preferable to set the lower limit value of the conditional expression (2) to 0.500. In order to secure the advantageous effect of the present embodiment much_more surely, it is preferable to set the lower limit value of the conditional expression (2) to 0.600 and more preferable to 0.650.

Incidentally, in the conditional expression (2), "back focus of the variable magnification optical system in the wide angle end state" denoted by BFw may be replaced by "back focus of the variable magnification optical system in the state where the whole length is smallest", and "focal length of the variable magnification optical system in the wide angle end state" denoted by fw may be replaced by "focal length of the variable magnification optical system in the state where the whole length is smallest". That is to say, the conditional expression (2) may be expressed, as below:

$$0.400 < BFs/fs < 1.300 \quad (2)$$

where BFs denotes a back focus of said variable magnification optical system in a state where the whole length is smallest, and fs denotes a focal length of said variable magnification optical system in the state where the whole length is smallest.

By the above-mentioned configuration, the variable magnification optical system according to the present embodiment can be small-sized but be made compatible with a large sized imaging device, and it is possible to realize a variable magnification optical system which can correct various aberrations superbly upon varying magnification and upon carrying out focusing.

In the variable magnification optical system according to the present embodiment, it is desirable that the following conditional expression (3) is satisfied:

$$0.500 < 1/\beta Rw < 1.200 \quad (3)$$

where βRw denotes transverse magnification of the lens group disposed on the most image plane side in the wide angle end state.

The conditional expression (3) defines the transverse magnification of the lens group disposed on the most image plane side in the wide angle end state. With satisfying the conditional expression (3), the variable magnification optical system according to the present embodiment can correct superbly astigmatism and other various aberrations in the wide angle end state.

When the value of 1/βRw is equal to or exceeds the upper limit value of the conditional expression (3) of the variable magnification optical system according to the present embodiment, the transverse magnification of the lens group disposed on the most image plane side in the wide angle end state, becomes small, and it becomes difficult to correct superbly various aberrations in the wide angle end state and, in particular, astigmatism. Meanwhile, in order to secure the advantageous effect of the present embodiment more surely, it is preferable to set the upper limit value of the conditional expression (3) to 1.100. Further, in order to secure the advantageous effect of the present embodiment much more surely, it is preferable to set the upper limit value of the conditional expression (3) to 1.000, and more preferable to 0.900.

On the other hand, when the value of 1/βRw in the conditional expression (3) of the variable magnification optical system according to the present embodiment, is equal to or falls below the lower limit value, the transverse magnification of the lens group disposed on the most image plane side in the wide angle end state, becomes large, and curvature of field in the wide angle end state is apt to be generated, and further it becomes difficult to correct superbly various aberrations. Meanwhile, in order to secure the advantageous effect of the variable magnification optical system according to the present embodiment more surely, it is preferable to set the lower limit value of the conditional expression (3) to 0.550. And in order to secure the advantageous effect of the present embodiment much more surely, it is preferable to set the lower limit value of the conditional expression (3) to 0.580, and more preferable to 0.600.

Further, in the variable magnification optical system according to the present embodiment, it is desirable that the following conditional expression (4) is satisfied:

$$4.000 < f1/f1Rw < 9.000 \quad (4)$$

where f1 denotes the focal length of the first lens group, and f1Rw denotes a composite focal length of lens groups in the wide angle end state disposed on the side which is closer to the image plane than the first lens group.

The conditional expression (4) defines a ratio of the focal length of the first lens group to the composite focal length of lens groups in the wide angle end state disposed on the side which is closer to the image plane than the first lens group. With satisfying the conditional expression (4), the variable magnification optical system according to the present embodiment can correct superbly coma aberration and other various aberrations in the wide angle end state. Further, with satisfying the conditional expression (4), variations in spherical aberration and in other various aberrations can be suppressed upon varying magnification from the wide angle end state to the telephoto end state.

When the value of f1/f1Rw is equal to or exceeds the upper limit value of the conditional expression (4) of the variable magnification optical system according to the present embodiment, refractive power of the lens groups in the wide angle end state disposed on the side which is closer to the image plane than the first lens group, becomes large, and it becomes difficult to correct superbly various aberrations in the wide angle end state and, in particular, coma aberration.

Further, upon varying magnification from the wide angle end state to the telephoto end state, it becomes difficult to suppress variations in spherical aberration and in other various aberrations. Meanwhile, in order to secure the advantageous effect of the present embodiment more surely, it is preferable to set the upper limit value of the conditional expression (4) to 8.500. Further, in order to secure the advantageous effect of the present embodiment much more surely, it is preferable to set the upper limit value of the conditional expression (4) to 8.000, and more preferable to 7.000.

On the other hand, when the value of f1/f1Rw in the conditional expression (4) of the variable magnification optical system according to the present embodiment, is equal to or falls below the lower limit value, refractive power of the first lens group becomes large, and it becomes difficult to correct various aberrations in the wide angle end state and in particular, coma aberration. Further, upon varying magnification from the wide angle end state to the telephoto end state, it becomes difficult to suppress variations in spherical aberration and in other various aberrations. Meanwhile, in order to secure the advantageous effect of the variable magnification optical system according to the present embodiment more surely, it is preferable to set the lower limit value of the conditional expression (4) to 5.000. And in order to secure the advantageous effect of the present embodiment much more surely, it is preferable to set the lower limit value of the conditional expression (4) to 5.100, and more preferable to 5.200.

Further, in the variable magnification optical system according to the present embodiment, it is desirable that the following conditional expression (5) is satisfied:

$$nd3fp<1.800 \quad (5)$$

where nd3fp denotes refractive index of a lens having the largest refractive index in the third lens group.

The conditional expression (5) defines refractive index of the lens having the largest refractive index in the third lens group. With using glass material having high refractive index satisfying the conditional expression (5), the variable magnification optical system according to the present embodiment can correct superbly longitudinal chromatic aberration and spherical aberration.

When the value of nd3fp is equal to or exceeds the upper limit value of the conditional expression (5) of the variable magnification optical system according to the present embodiment, refractive power of the third lens group becomes large, and it becomes difficult to correct superbly longitudinal chromatic aberration and spherical aberration. Meanwhile, in order to secure the advantageous effect of the present embodiment more surely, it is preferable to set the upper limit value of the conditional expression (5) to 1.750. Further, in order to secure the advantageous effect of the present embodiment much more surely, it is preferable to set the upper limit value of the conditional expression (5) to 1.700, and more preferable to 1.650.

In the variable magnification optical system according to the present embodiment, it is desirable that the following conditional expression (6) is satisfied:

$$50.000<vd3p \quad (6)$$

where vd3p denotes Abbe's number of a lens having the smallest Abbe's number in the third lens group.

The conditional expression (6) defines the Abbe's number of a lens having the smallest Abbe's number in the third lens group. With using glass material of low dispersion satisfying the conditional expression (6), the variable magnification optical system according to the present embodiment can let the third lens group have anomalous dispersion, and it becomes possible to correct superbly longitudinal chromatic aberration and spherical aberration.

When the value of vd3p in the conditional expression (6) of the variable magnification optical system according to the present embodiment, is equal to or falls below the lower limit value, it is not possible to let the third lens group have sufficient anomalous dispersion, and it becomes difficult to correct superbly longitudinal chromatic aberration and spherical aberration. Meanwhile, in order to secure the advantageous effect of the present embodiment more surely, it is preferable to set the lower limit value of the conditional expression (6) to 55.000. And, in order to secure the advantageous effect of the present embodiment much more surely, it is preferable to set the lower limit value of the conditional expression (6) to 58.000, and more preferable to 60.000.

Further, in the variable magnification optical system according to the present embodiment, it is desirable that the following conditional expression (7) is satisfied:

$$1.100<\beta Fw<2.500 \quad (7)$$

where $\beta$Fw denotes a transverse magnification of the focusing lens group in the wide angle end state.

The conditional expression (7) defines the transverse magnification of the focusing lens group in the wide angle end state. With satisfying the conditional expression (7), the variable magnification optical system according to the present embodiment can make an amount of movement of the focusing lens group upon focusing small so that the variable magnification optical system can be made small-sized.

When the value of $\beta$Fw is equal to or exceeds the upper limit value of the conditional expression (7) of the variable magnification optical system according to the present embodiment, the amount of movement of the focusing lens group upon focusing becomes large, so it becomes difficult to make the variable magnification optical system small-sized. Meanwhile, in order to secure the advantageous effect of the present embodiment more surely, it is preferable to set the upper limit value of the conditional expression (7) to 2.000. Further, in order to secure the advantageous effect of the present embodiment much more surely, it is preferable to set the upper limit value of the conditional expression (7) to 1.800, and more preferable to 1.700.

On the other hand, when the value of $\beta$Fw in the conditional expression (7) of the variable magnification optical system according to the present embodiment, is equal to or falls below the lower limit value, the amount of movement of the focusing lens group upon focusing becomes small, so it becomes difficult to control focusing. Meanwhile, in order to secure the advantageous effect of the present embodiment more surely it is preferable to set the lower limit value of the conditional expression (7) to 1.200. Further, in order to secure the advantageous effect of the present embodiment much more surely, it is preferable to set the upper limit value of the conditional expression (7) to 1.250 and more preferable to 1.300.

Further, in the variable magnification optical system according to the present embodiment, it is desirable that the following conditional expression (8) is satisfied:

$$0.500<f2fn/f2<1.100 \quad (8)$$

where f2fn denotes a focal length of a most object side lens component in the second lens group, and f2 denotes a focal length of the second lens group.

The conditional expression (8) defines a ratio of the focal length of the most object side lens component in the second lens group relative to the focal length of the second lens group. With satisfying the conditional expression (8), the variable magnification optical system according to the present embodiment can arrange the power of the most object side lens component in the second lens group properly, so that it is possible to correct superbly spherical aberration and other various aberrations.

When the value of f2fn/f2 is equal to or exceeds the upper limit value of the conditional expression (8) of the variable magnification optical system according to the present embodiment, the refractive power of the most object side lens component in the second lens group becomes small, and it becomes difficult to correct superbly spherical aberration and other various aberrations. Meanwhile, in order to secure the advantageous effect of the present embodiment more surely, it is preferable to set the upper limit value of the conditional expression (8) to 1.000. Further, in order to secure the advantageous effect of the present embodiment much more surely, it is preferable to set the upper limit value of the conditional expression (8) to 0.900, and more preferable to 0.850.

On the other hand, when the value of f2fn/f2 in the conditional expression (8) of the variable magnification optical system according to the present embodiment, is equal to or falls below the lower limit value, the refractive power of the most object side lens component in the second lens group becomes large, and it becomes difficult to correct superbly spherical aberration and other various aberrations. Meanwhile, in order to secure the advantageous effect of the variable magnification optical system according to the present embodiment more surely, it is preferable to set the lower limit value of the conditional expression (8) to 0.550. And in order to secure the advantageous effect of the present embodiment much more surely, it is preferable to set the lower limit value of the conditional expression (8) to 0.600 and more preferable to 0.650.

Further, in the variable magnification optical system according to the present embodiment, it is desirable that the following conditional expression (9) is satisfied:

$$0.300 < |fF|/ft < 1.000 \quad (9)$$

where fF denotes a focal length of the focusing lens group, and ft denotes a focal length of the variable magnification optical system in the telephoto end state.

The conditional expression (9) defines a ratio of the focal length of the focusing lens group relative to the focal length of the variable magnification optical system in the tele photo end state. With satisfying the conditional expression (9), the variable magnification optical system according to the present embodiment can suppress variations in spherical aberration and in other various aberrations upon conducting focusing from an infinite distance object to a close distance object, so that the variable magnification optical system and the lens barrel may be made small in size.

When the value of |fF|/ft is equal to or exceeds the upper limit value of the conditional expression (9) of the variable magnification optical system according to the present embodiment, the refractive power of the focusing lens group becomes small, and it becomes difficult to correct superbly variations in various aberrations and, in particular, variation in spherical aberration upon conducting focusing from an infinite distance object to a close distance object. Meanwhile, in order to secure the advantageous effect of the present embodiment more surely, it is preferable to set the upper limit value of the conditional expression (9) to 0.900. Further, in order to secure the advantageous effect of the present embodiment much more surely, it is preferable to set the upper limit value of the conditional expression (9) to 0.800, and more preferable to 0.750.

On the other hand, when the value of |fF|/ft in the conditional expression (9) of the variable magnification optical system according to the present embodiment, is equal to or falls below the lower limit value, the refractive power of the focusing lens group becomes large, and it becomes difficult to correct superbly variations in various aberrations upon conducting focusing from an infinite distance object to a close distance object and, in particular, variation in spherical aberration. Meanwhile, in order to secure the advantageous effect of the present embodiment more surely, it is preferable to set the lower limit value of the conditional expression (9) to 0.400. And in order to secure the advantageous effect of the present embodiment much more surely, it is preferable to set the lower limit value of the conditional expression (9) to 0.500, and more preferable to 0.550.

In the variable magnification optical system according to the present embodiment, it is desirable that the following conditional expression (10) is satisfied:

$$40.00° < \omega w < 85.00° \quad (10)$$

where ωw denotes a half angle of view of the variable magnification optical system in the wide angle end state.

The conditional expression (10) defines the half angle of view of the variable magnification optical system in the wide angle end state. With satisfying the conditional expression (10), the variable magnification optical system according to the present embodiment can correct superbly various aberrations such as coma aberration, distortion, curvature of field and the like, while maintaining large angle of view.

When the value of ωw is equal to or exceeds the upper limit value of the conditional expression (10) of the variable magnification optical system according to the present embodiment, the angle of view becomes too large and it becomes difficult to correct superbly various aberrations, such as coma aberration, distortion, curvature of field and the like. Meanwhile, in order to secure the advantageous effect of the present embodiment more surely, it is preferable to set the upper limit value of the conditional expression (10) to 84.00°. Further, in order to secure the advantageous effect of the present embodiment much more surely, it is preferable to set the upper limit value of the conditional expression (10) to 83.00°, and more preferable to 82.00°.

On the other hand, when the value of ow in the conditional expression (10) of the variable magnification optical system according to the present embodiment, is equal to or falls below the lower limit value, the angle of view becomes small and it becomes difficult to correct superbly various aberrations. Meanwhile, in order to secure the advantageous effect of the present embodiment more surely, it is preferable to set the lower limit value of the conditional expression (10) to 41.00°. Further, in order to secure the advantageous effect of the present embodiment much more surely, it is preferable to set the lower limit value of the conditional expression (10) to 42.00°, and more preferable to 43.00°.

Further, in the variable magnification optical system according to the present embodiment, it is desirable that the rear lens group comprises a fourth lens group having negative refractive power and a fifth lens group having positive refractive power and that the fourth lens group has a focusing lens group. With this configuration, in the variable magnification optical system according to the present embodiment, the focusing lens group may be made small in size and light in weight, and as a result the variable magnification optical system and the lens barrel may be made small-sized.

The optical apparatus of the present embodiment is equipped with the variable magnification optical system having the above described configuration, so it is possible to realize an optical apparatus which is compatible with a large-sized imaging device in spite that the optical apparatus is small in size, and which can correct superbly various aberrations upon varying magnification as well as upon focusing.

A method for manufacturing a variable magnification optical system according to the present embodiment, is a method for manufacturing a variable magnification optical system which comprises, in order from an object side, a first lens group having positive refractive power, a second lens group having negative refractive power, a third lens group having positive refractive power, and a rear lens group having negative refractive power; comprising the steps of:

constructing such that, upon varying a magnification from a wide angle end state to a tele photo end state, a distance between said first lens group and said second lens group is varied, a distance between said second lens group and said third lens group is varied, and a distance between said third lens group and said rear lens group is varied;

constructing such that said third lens group or said rear lens group comprises a focusing lens group which is moved upon carrying out focusing from an infinite distance object to a close distance object; and constructing such that the following conditional expressions (1) and (2) are satisfied:

$$2.00 < f1/fw < 8.000 \quad (1)$$

$$0.400 < BFw/fw < 1.300 \quad (2)$$

where f1 denotes a focal length of said first lens group, fw denotes a focal length of said variable optical system in a wide angle end state, BFw denotes a back focus of said variable magnification optical system in the wide angle end state, and fw denotes the focal length of said variable magnification optical system in the wide angle end state.

By this method, it is possible to manufacture a variable magnification optical system which is compatible with a large-sized imaging device in spite that the optical system is small-sized, and which can correct superbly various aberrations upon varying magnification as well as upon focusing.

Hereinafter, the variable magnification optical systems relating to numerical examples of the present embodiment will be explained with reference to the accompanying drawings.

First Example

Figure 1B:
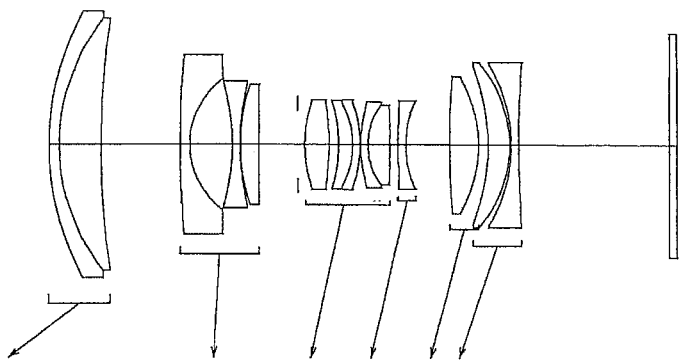
Figure 1C:
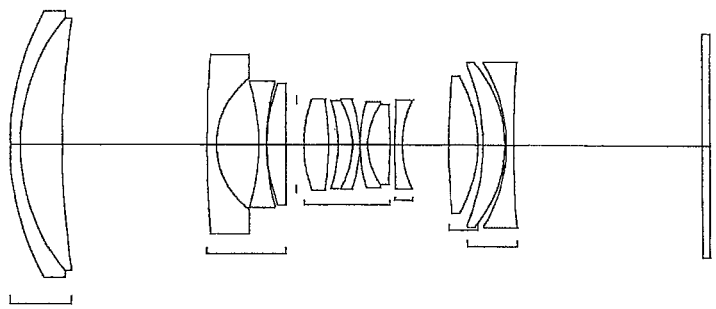

FIG. 1A, FIG. 1B and FIG. 1C are, respectively, cross sectional views in a wide angle end state, in an intermediate focal length state and in a telephoto end state, of a variable magnification optical system according to a First Example of the present embodiment. Arrows below respective lens groups in FIG. 1A show directions of movements of respective lens groups upon varying magnification from the wide angle end state to the intermediate focal length state. Arrows below respective lens groups in FIG. 1B show movement trajectories of respective lens groups upon varying magnification from the intermediate focal length state to the telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having negative refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a double convex positive lens L23. The negative meniscus lens L21 is a glass mold type aspherical lens whose object side lens surface and image plane I side lens surface are aspherical.

The third lens group G3 consists of, in order from the object side along the optical axis, a double convex positive lens L31, a cemented lens constructed by a positive meniscus lens L32 having a concave surface facing the object side cemented with a negative meniscus lens L33 having a concave surface facing the object side, and a cemented lens constructed by a negative meniscus lens L34 having a convex surface facing the object side cemented with a double convex positive lens L35. The double convex positive lens L31 is a glass mold type aspherical lens whose object side lens surface is aspherical.

The rear lens group GR is composed of, in order from the object side along the optical axis, a fourth lens group G4 having negative refractive power, a fifth lens group G5 having positive refractive power and a sixth lens group G6 having negative refractive power.

The fourth lens group G4 consists of a negative meniscus lens L41 having a convex surface facing the object side. The negative meniscus lens L41 is a glass mold type aspherical lens whose image plane I side lens surface is aspherical.

The fifth lens group G5 consists of a double convex positive lens L51. The double convex positive lens 51 is a glass mold type aspherical lens whose image plane I side lens surface is aspherical.

The sixth lens group G6 consists of, in order from the object side along the optical axis, a positive meniscus lens L61 having a concave surface facing the object side, and a double concave negative lens L62.

A filter FL such as a low pass filter is disposed between the sixth lens group G6 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the sixth lens group G6 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5 and a distance between the fifth lens group G5 and the sixth lens group G6, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the image plane I along the optical axis as a focusing lens group.

Table 1 below shows various values of the variable magnification optical system relating to the present Example.

In [Surface Data], "m" denotes an order of an optical surface counted from the object side, "r" denotes a radius of curvature, "d" denotes a surface-to-surface distance, that is, an interval from an n-th surface to an (n+1)-th surface, where n is an integer, "nd" denotes refractive index for d-line (wavelength λ=587.6 nm) and "vd" denotes an Abbe number for d-line (wavelength λ=587.6 nm). Further, "OP" denotes an object surface, "Dn" denotes a variable surface-to-surface distance, where n is an integer, "S" denotes an aperture stop, and "I" denotes an image plane. Meanwhile, radius of curvature r=∞ denotes a plane surface, and refractive index of the air nd=1.00000 is omitted. In addition, an aspherical surface is expressed by attaching "*" to the surface number, and in the column of the radius of curvature "r", a paraxial radius of curvature is shown.

In [Various Data], "f" denotes a focal length, "FNo" denotes an F-number, "ω" denotes a half angle of view (unit "°"), "Y" denotes a maximum image height, and "TL" denotes a total length of the variable magnification optical system according to the present Example, that is, a distance along the optical axis from the first lens surface to the image plane I. "BF" denotes a back focus, that is, a distance on the optical axis from a most image side lens surface to the image plane I, and "BF" (air converted length) is a value of the distance on the optical axis from the most image side lens surface to the image plane I measured in a state where optical block(s) such as filter(s) is(are) removed from on the optical path. Meanwhile, "W" denotes a wide angle end state, "M" denotes an intermediate focal length state, and "T" denotes a tele photo end state.

In [Lens Group Data], a starting surface number "ST" and a focal length "f" of each lens group are shown.

In [Aspherical Surface Data], with respect to aspherical surface(s) shown in [Surface Data], a shape of the aspherical surface is exhibited by the following expression:

$$X=(h^2/r)/[1+[1-\kappa(h/r)^2]^{1/2}]+A4h^4+A6h^6+A8h^8+A10y^{10}$$

where h denotes a vertical height from the optical axis; X denotes a sag amount which is a distance along the optical axis from the tangent plane at the vertex of the aspherical surface to the aspherical surface at the vertical height h; κ denotes a conical coefficient; A4, A6, A8 and A10 each denotes an aspherical surface coefficient; r denotes a radius of curvature of a reference sphere, that is, a paraxial radius of curvature. Meanwhile, "E-n" denotes "×10$^{-n}$", in which "n" is an integer, and for example "1.234E-05" denotes "1.234×10$^{-5}$". The second order aspherical coefficient A2 is 0 and omitted.

In [Variable Distance Data], Dn denotes a surface to surface distance from n-th surface to (n+1)-th surface, where n is an integer. Further, W denotes a wide-angle end state, M denotes an intermediate focal length state, T denotes a telephoto end state, "Infinite" denotes time on which an infinite distance object is focused, and "Close" denotes time on which a close distance object is focused.

In [Values for Conditional Expressions], values with respect to respective conditional expressions are shown.

The focal length f, the radius of curvature r and other units on the length described in Table 1 involve using generally [mm], however, the optical system acquires the equal optical performance even when proportionally enlarged or reduced and is not therefore limited to this unit.

Note that the descriptions of the reference numerals and symbols in Table 1 are the same in the subsequent Examples.

TABLE 1

First Example

[Surface Data]

| m | r | d | nd | vd |
|---|---|---|---|---|
| OP | ∞ | | | |
| 1 | 55.56269 | 2.090 | 1.84666 | 23.8 |
| 2 | 40.07848 | 8.659 | 1.75500 | 52.3 |
| 3 | 165.87769 | D3 | | |
| *4 | 305.23816 | 2.000 | 1.83357 | 41.5 |
| *5 | 15.91291 | 8.769 | | |
| 6 | -46.53317 | 1.500 | 1.49782 | 82.6 |
| 7 | 47.28615 | 0.150 | | |
| 8 | 36.78652 | 3.869 | 2.00060 | 25.5 |
| 9 | -4410.95550 | D9 | | |
| 10 (S) | ∞ | 1.500 | | |
| *11 | 25.50000 | 5.056 | 1.61881 | 63.9 |
| 12 | -55.83871 | 1.974 | | |
| 13 | -29.70567 | 2.979 | 1.75500 | 52.3 |
| 14 | -17.48858 | 1.500 | 1.91435 | 31.0 |
| 15 | -26.37061 | 0.150 | | |
| 16 | 30.89509 | 1.500 | 1.95375 | 32.3 |
| 17 | 13.37829 | 4.608 | 1.59848 | 57.2 |
| 18 | -117.59347 | D18 | | |
| 19 | 297.46406 | 1.500 | 1.55332 | 71.7 |
| *20 | 20.53630 | D20 | | |
| 21 | 143.35194 | 6.018 | 1.55332 | 71.7 |
| *22 | -24.59285 | D22 | | |
| 23 | -42.73323 | 4.479 | 1.84666 | 23.8 |
| 24 | -25.30641 | 0.331 | | |
| 25 | -31.61248 | 1.500 | 1.85026 | 32.4 |
| 26 | 200.00000 | D26 | | |
| 27 | ∞ | 1.500 | 1.51680 | 64.1 |
| 28 | ∞ | D28 | | |
| I | ∞ | | | |

[Various Data]
Variable magnification ratio: 2.75

| | W | M | T |
|---|---|---|---|
| f | 24.72 | 46.30 | 67.90 |
| FNo | 4.00 | 4.25 | 4.00 |
| ω | 43.4 | 24.3 | 17.0 |
| Y | 21.70 | 21.70 | 21.70 |
| TL | 116.068 | 129.674 | 144.273 |
| BF | 15.310 | 32.587 | 40.396 |
| BF(air converted length) | 14.799 | 32.076 | 39.885 |

[Lens Group Data]

| Lens Group | ST | f |
|---|---|---|
| 1$^{st}$ Lens Group | 1 | 113.52 |
| 2$^{nd}$ Lens Group | 4 | -25.53 |
| 3$^{rd}$ Lens Group | 10 | 23.75 |
| 4$^{th}$ Lens Group | 19 | -39.94 |
| 5$^{th}$ Lens Group | 21 | 38.43 |
| 6$^{th}$ Lens Group | 23 | -57.87 |

[Aspherical Surface Data]

Surface Number: 4 K = 1.00000e+00
A4 = 6.25659e-06 A6 = -1.91556e-08 A8 = 2.52781e-11
A10 = -1.35238e-14
Surface Number: 5 K = 0.00000e+00
A4 = 2.80706e-05 A6 = 6.07832e-08 A8 = -2.35463e-11
A10 = 1.70671e-13
Surface Number: 11 K = 1.00000e+00
A4 = -1.67018e-05 A6 = -1.56513e-09 A8 = 3.10565e-12
A10 = -5.19087e-13

TABLE 1-continued

First Example

Surface Number: 20 K = 1.00000e+00
A4 = 4.64472e-06 A6 = -7.82369e-08 A8 = 6.72266e-10
A10 = -6.64718e-12
Surface Number: 22 K = 1.00000e+00
A4 = 1.52142e-05 A6 = -5.80147e-09 A8 = -8.01313e-12
A10 = 3.24010e-14

[Variable Distance Data]

|  | W Infinite | M Infinite | T Infinite | W Close | M Close | T Close |
|---|---|---|---|---|---|---|
| D3 | 2.000 | 16.335 | 29.807 | 2.000 | 16.335 | 29.807 |
| D9 | 21.355 | 7.927 | 2.222 | 21.355 | 7.927 | 2.222 |
| D18 | 1.630 | 1.662 | 1.111 | 3.282 | 5.509 | 8.035 |
| D20 | 9.084 | 9.053 | 9.604 | 7.433 | 5.205 | 2.680 |
| D22 | 6.556 | 1.978 | 1.000 | 6.556 | 1.978 | 1.000 |
| D26 | 13.711 | 30.988 | 38.797 | 13.711 | 30.988 | 38.797 |
| D28 | 0.100 | 0.099 | 0.099 | 0.100 | 0.099 | 0.099 |

[Values for Conditional Expressions]

| (1) | f1/fw = 4.5920 |
|---|---|
| (2) | BFw/fw = 0.5987 |
| (3) | 1/βRw = 0.7639 |
| (4) | f1/f1Rw = 5.4336 |
| (5) | nd3fp = 1.6188 |
| (6) | vd3p = 63.8544 |
| (7) | βFw = 2.4956 |
| (8) | f2fn/f2 = 0.7915 |
| (9) | |fF|/ft = 0.5882 |
| (10) | ωw = 43.4511° |

Figure 2A:
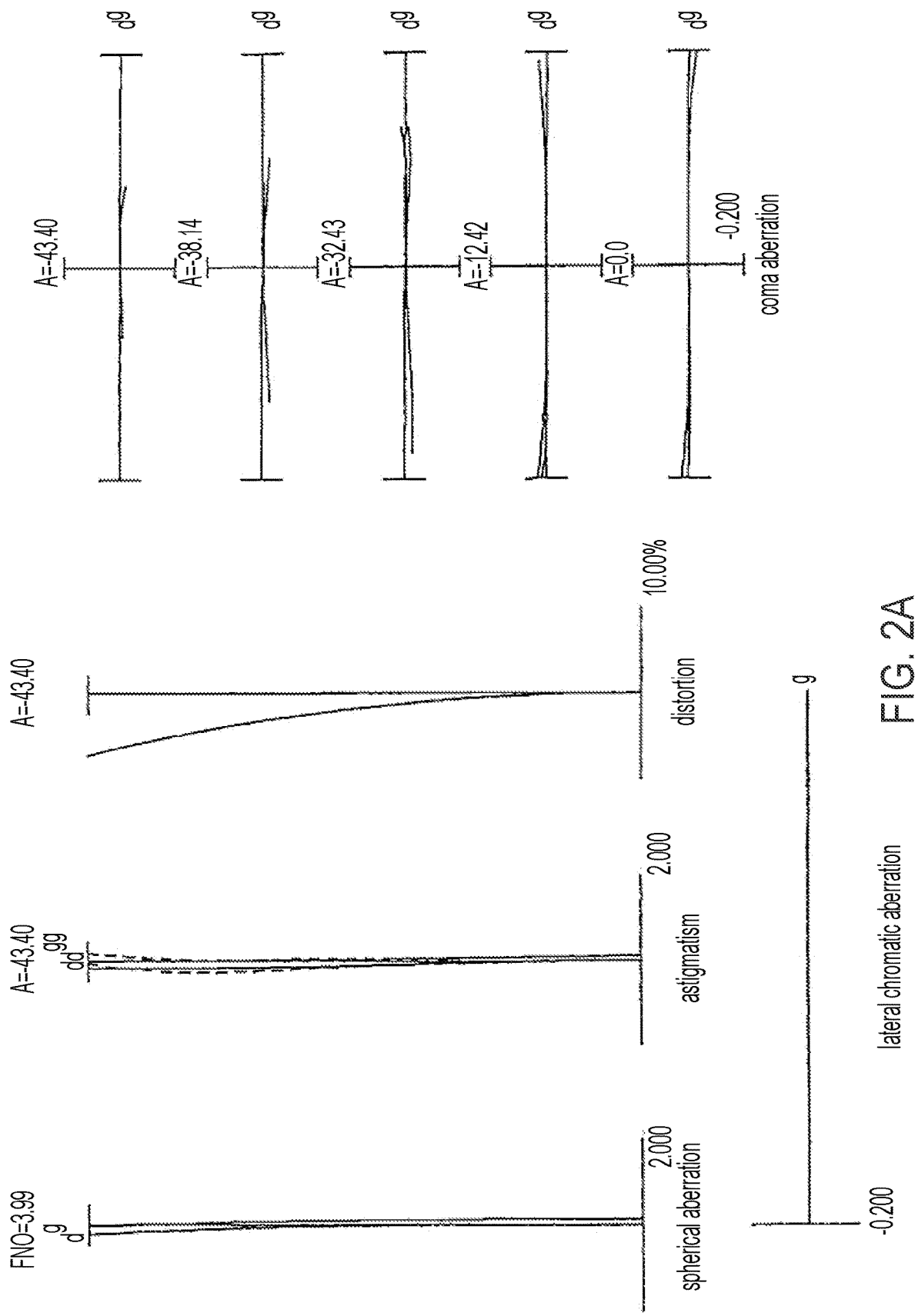
FIG. 2A, FIG. 2B and FIG. 2C are graphs showing various aberrations, upon focusing on an infinite distance object, in the wide angle end state, in the intermediate focal length state, and in the telephoto end state, respectively, of the variable magnification optical system according to the First Example.
Figure 2B:
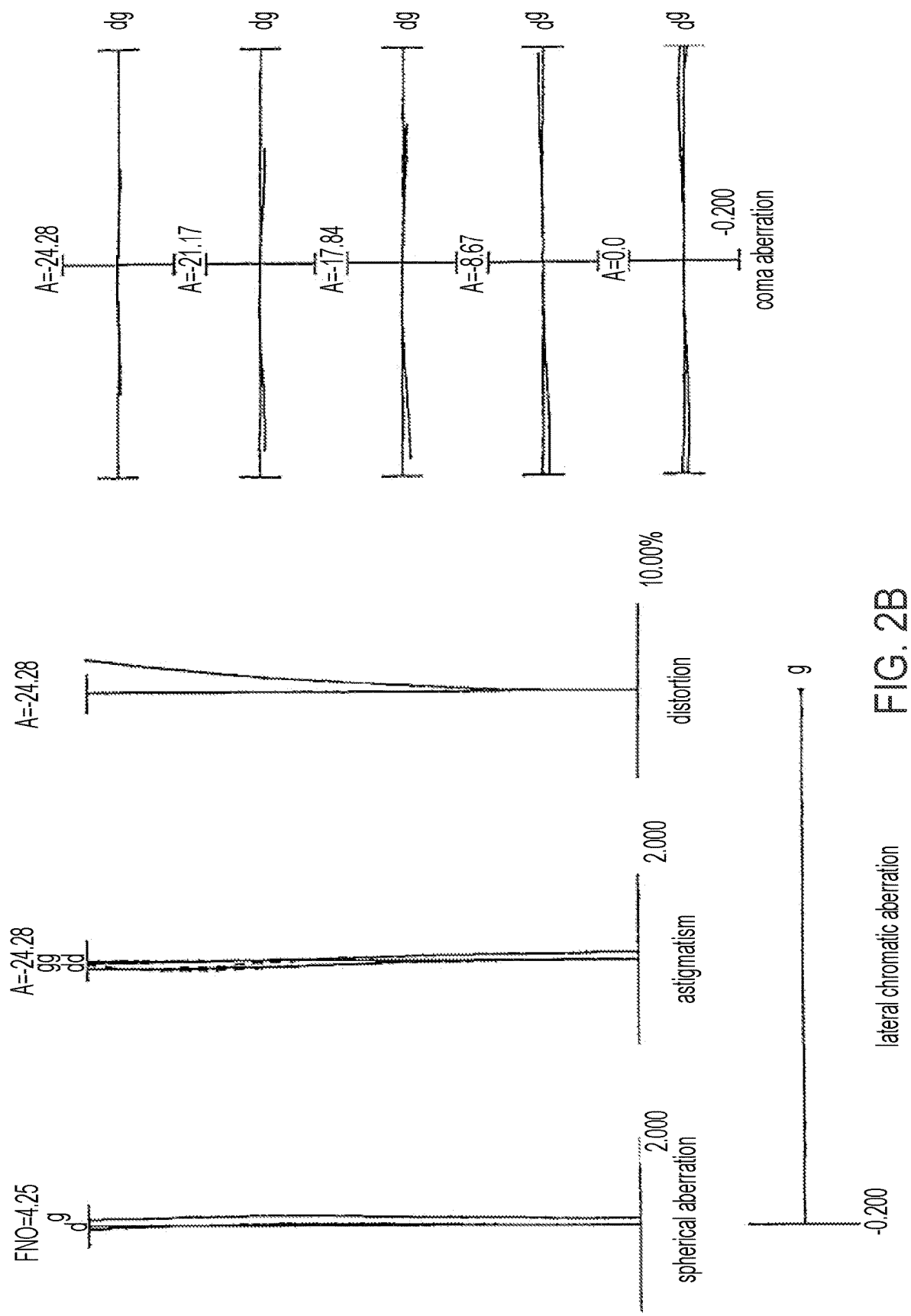
Figure 2C:
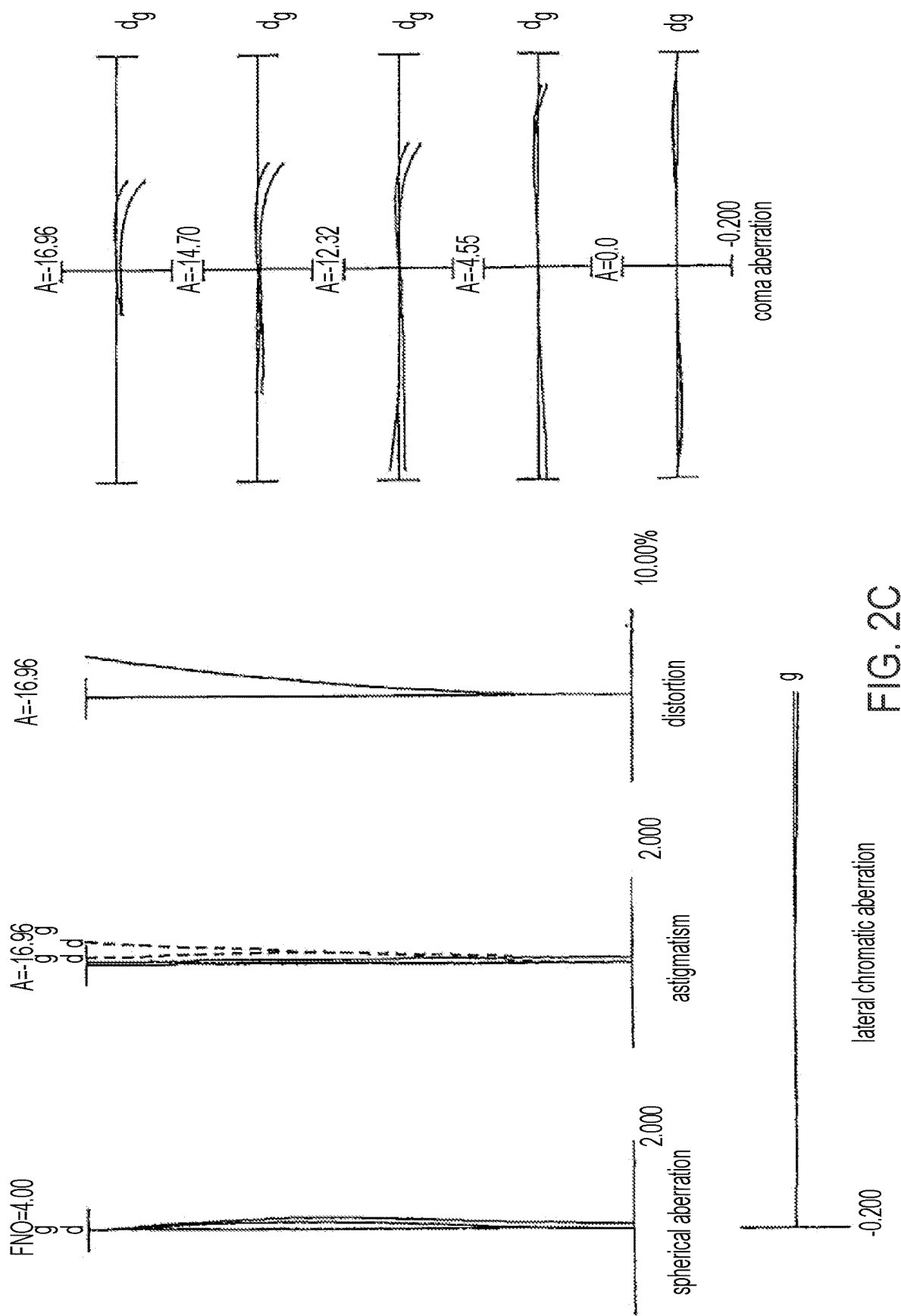

FIG. 2A, FIG. 2B and FIG. 2C are graphs showing various aberrations upon focusing on an infinite distance object, respectively, in the wide angle end state, in the intermediate focal length state and in the telephoto end state, of the variable magnification optical system according to the First Example.

Figure 3A:
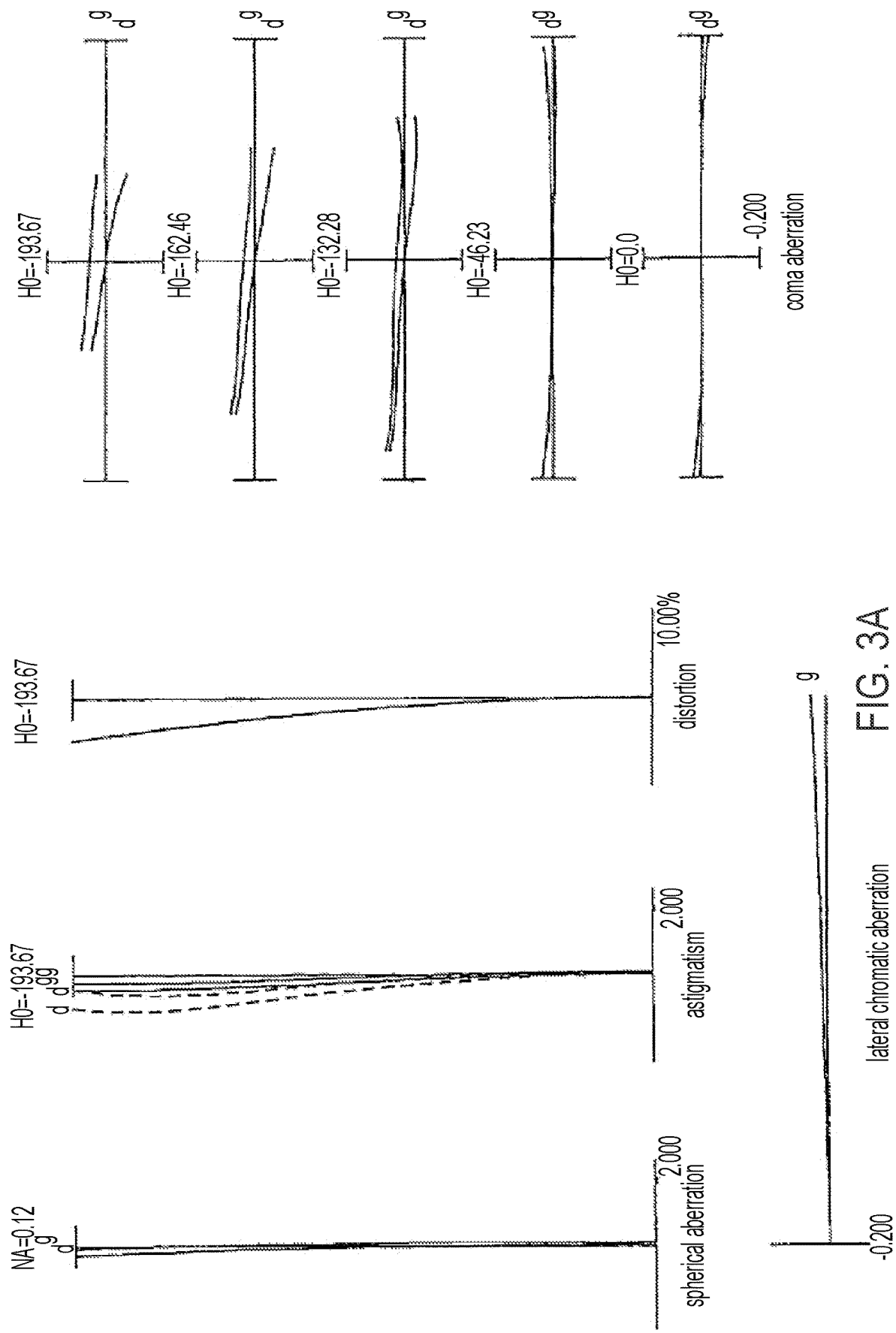
FIG. 3A, FIG. 3B and FIG. 3C are graphs showing various aberrations, upon focusing on a close distance object, in the wide angle end state, in the intermediate focal length state, and in the telephoto end state, respectively, of the variable magnification optical system according to the First Example.
Figure 3B:
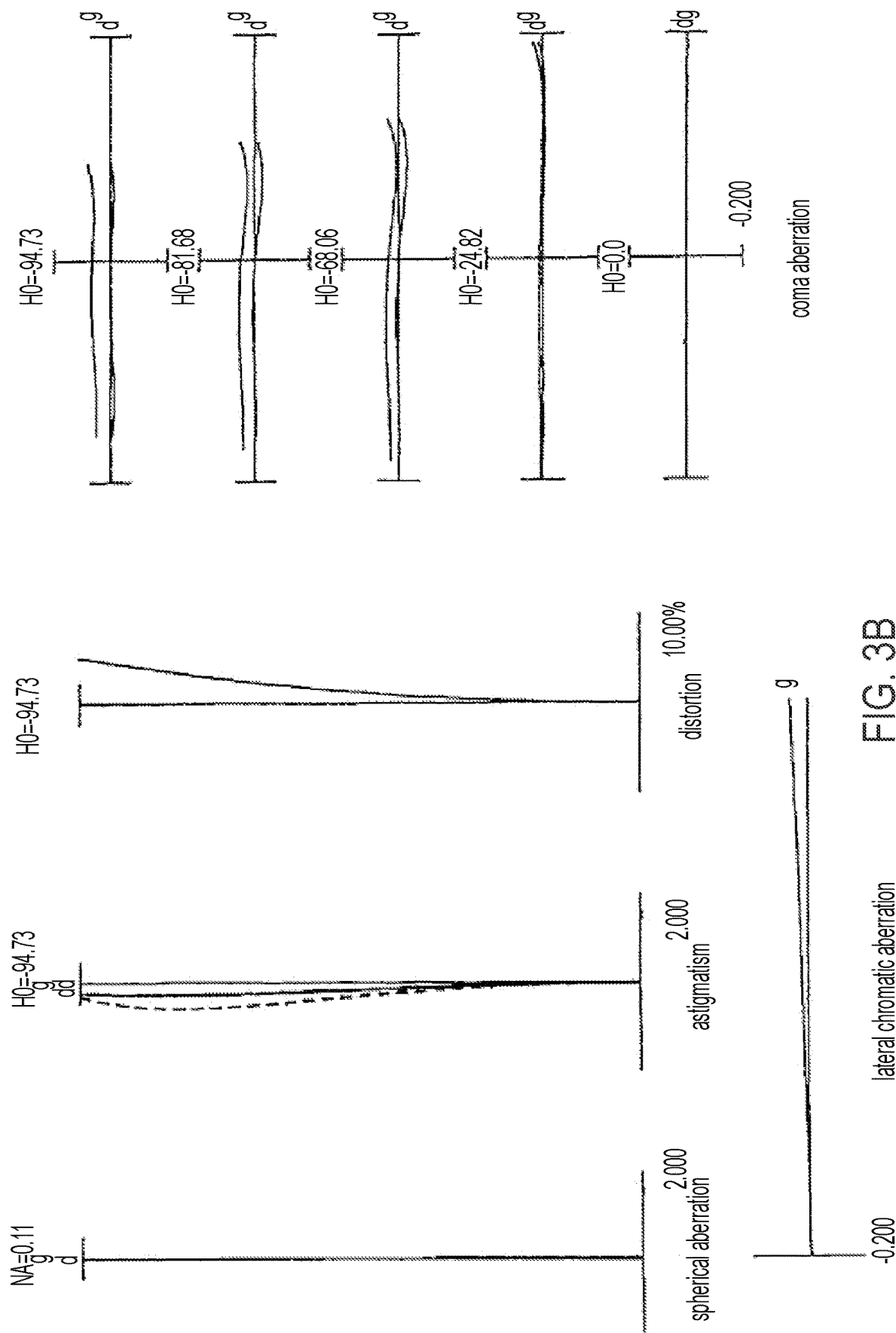
Figure 3C:
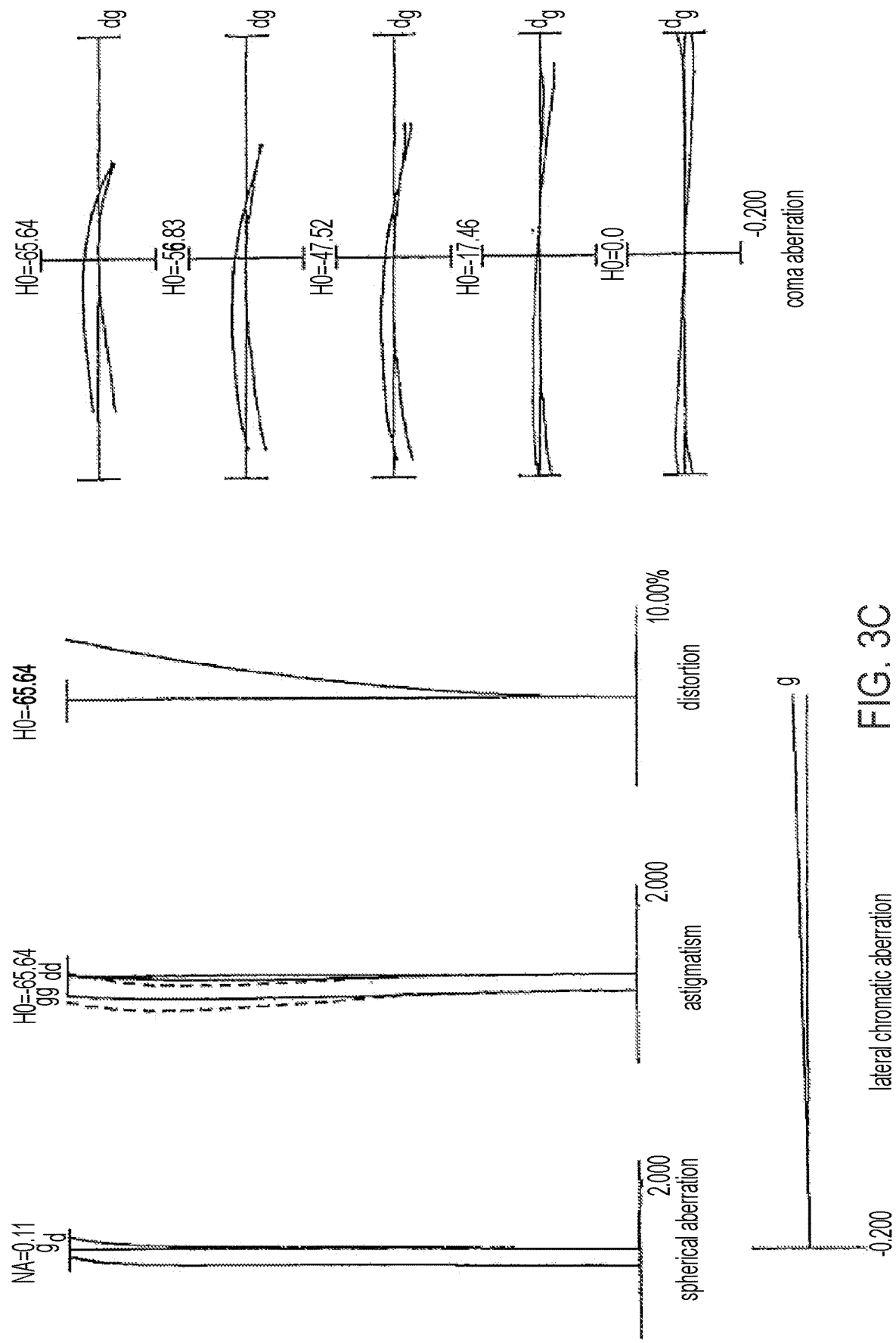

FIG. 3A, FIG. 3B and FIG. 3C are graphs showing various aberrations upon focusing on a close distance object, respectively, in the wide angle end state, in the intermediate focal length state and in the telephoto end state, of the variable magnification optical system according to the First Example.

In the respective graphs showing aberrations, "FNO" denotes an F-number, "NA" denotes a numerical aperture, and "A" denotes an incident angle of light rays, that is, a half angle of view (unit "°"), and "HO" denotes an object height (unit: mm). In detail, in graphs showing spherical aberrations, the value of F-number FNO or numerical aperture NA corresponding to the maximum aperture is shown. In graphs showing astigmatism and distortions, the maximum values of the half angle of view or the maximum object height are shown respectively, and in graphs showing coma aberration, each half angle of view or each object height is shown. "d" denotes aberration for d-line (wavelength λ=587.6 nm), "g" denotes aberration for g-line (wavelength λ=435.8 nm), and graphs with "g" or "d" being not attached, show aberration for d-line. In graphs showing astigmatism, a solid line indicates a sagittal image plane, and a broken line indicates a meridional image plane. In graphs showing coma aberration, coma aberration in each half angle of view or each object height, that is, transverse aberration is shown. Meanwhile, in graphs showing various aberrations in the respective Examples as described below, the same symbols as in the present Example are employed.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

Second Example

Figure 4A:
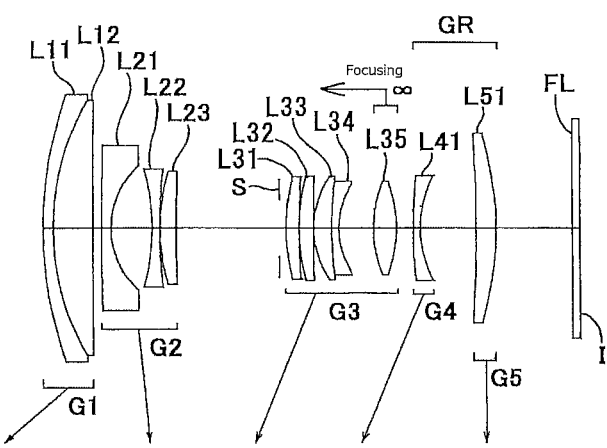
FIG. 4A, FIG. 4B and FIG. 4C are cross sectional views in the wide angle end state, in the intermediate focal length state and in the telephoto end state, respectively, of a variable magnification optical system according to a Second Example.
Figure 4B:
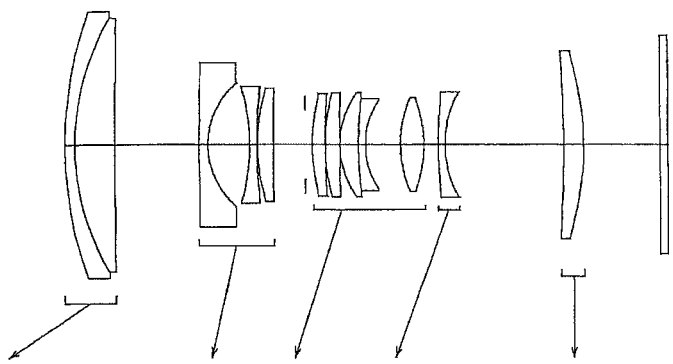
Figure 4C:
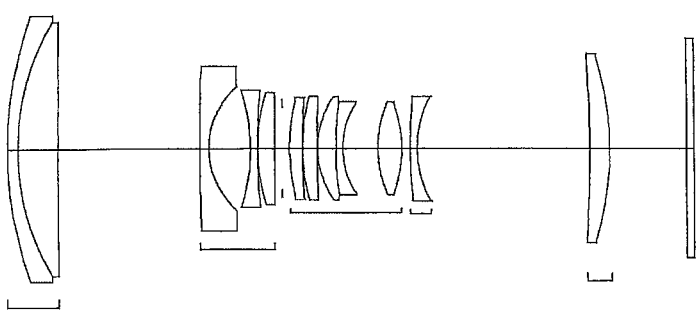

FIG. 4A, FIG. 4B and FIG. 4C are, respectively, cross sectional views in a wide angle end state, in an intermediate focal length state and in a telephoto end state, of a variable magnification optical system according to a Second Example of the variable magnification optical system of the present embodiment. Arrows below respective lens groups in FIG. 4A show directions of movements of respective lens groups upon varying magnification from the wide angle end state to the intermediate focal length state. Arrows below respective lens groups in FIG. 4B show movement trajectories of respective lens groups upon varying magnification from the intermediate focal length state to the telephoto end state.

The variable magnification optical system according to the present Example is composed of, in order from the object side along the optical axis, a first lens group G1 having positive refractive power, a second lens group G2 having negative refractive power, an aperture stop S, a third lens group G3 having positive refractive power, and a rear lens group GR having negative refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose object side lens surface and image plane I side lens surface are aspherical.

The third lens group G3 consists of, in order from the object side along the optical axis, a positive meniscus lens L31 having a convex surface facing the object side, a positive meniscus lens L32 having a convex surface facing the object side, a cemented lens constructed by a positive meniscus lens L33 having a convex surface facing the object side cemented with a negative meniscus lens L34 having a convex surface facing the object side, and a double convex positive lens L35. The positive meniscus lens L31 is a glass mold type aspherical lens whose object side lens surface is aspherical. The double convex positive lens L35 is a glass mold type aspherical lens whose object side lens surface and image plane I side lens surface are aspherical.

The rear lens group GR is composed of, in order from the object side along the optical axis, a fourth lens group G4 having negative refractive power and a fifth lens group G5 having positive refractive power.

The fourth lens group G4 consists of a negative meniscus lens L41 having a convex surface facing the object side. The negative meniscus lens L41 is a glass mold type aspherical lens whose object side lens surface is aspherical.

The fifth lens group G5 consists of a positive meniscus lens group L51 having a concave surface facing the object side.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, the first lens group G1, the second lens group G2, the third lens group G3 and the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. At this time, the fifth lens group G5 is fixed relative to the image plane I. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the positive lens L35 of the third lens group G3 toward the object along the optical axis as a focusing lens group.

Table 2 below shows various values of the variable magnification optical system relating to the present Example.

TABLE 2

Second Example

[Surface Data]

| m | r | d | nd | vd |
|---|---|---|----|-----|
| OP | ∞ | | | |
| 1 | 80.37239 | 2.191 | 1.84666 | 23.8 |
| 2 | 51.98777 | 8.571 | 1.75500 | 52.3 |
| 3 | 2070.67650 | D3 | | |
| *4 | 641.99827 | 2.000 | 1.85135 | 40.1 |
| *5 | 16.81311 | 8.912 | | |
| 6 | −42.25332 | 1.500 | 1.49782 | 82.6 |
| 7 | 110.99976 | 0.132 | | |
| 8 | 41.80583 | 3.451 | 2.00069 | 25.5 |
| 9 | 1058.33950 | D9 | | |
| 10 (S) | ∞ | 1.500 | | |
| *11 | 39.00831 | 2.770 | 1.49710 | 81.5 |
| 12 | 140.27569 | 0.100 | | |
| 13 | 43.60704 | 3.000 | 1.85896 | 22.7 |
| 14 | 289.56516 | 0.100 | | |
| 15 | 18.65400 | 3.904 | 1.49782 | 82.6 |
| 16 | 75.27582 | 1.500 | 1.85896 | 22.7 |
| 17 | 16.91540 | 7.449 | | |
| *18 | 23.17679 | 5.123 | 1.49710 | 81.5 |
| *19 | −24.33043 | D19 | | |
| *20 | 99.02941 | 1.500 | 1.74330 | 49.3 |
| 21 | 22.73753 | D21 | | |
| 22 | −272.28910 | 4.264 | 1.48749 | 70.3 |
| 23 | −65.54087 | 16.319 | | |
| 24 | ∞ | 1.500 | 1.51680 | 64.1 |
| 25 | ∞ | D25 | | |
| I | ∞ | | | |

[Various Data]
Variable magnification ratio 2.75

| | W | M | T |
|---|---|---|---|
| f | 24.72 | 46.31 | 67.90 |
| FNo | 4.00 | 4.00 | 4.00 |
| ω | 43.4 | 23.6 | 16.5 |
| Y | 21.70 | 21.70 | 21.70 |

TABLE 2-continued

Second Example

| TL | 115.511 | 129.313 | 146.760 |
|---|---|---|---|
| BF | 17.920 | 17.921 | 17.921 |
| BF(air converted length) | 17.409 | 17.410 | 17.410 |

[Lens Group Data]

| Lens Group | ST | f |
|---|---|---|
| 1st Lens Group | 1 | 118.36 |
| 2nd Lens Group | 4 | −26.19 |
| 3rd Lens Group | 10 | 24.69 |
| 4th Lens Group | 20 | −40.04 |
| 5th Lens Group | 22 | 175.88 |

[Aspherical Surface Data]

Surface Number: 4 K = 1.00000e+00
A4 = 4.80528e−06 A6 = −2.54101e−08 A8 = 4.94759e−11
A10 = −4.51789e−14
Surface Number: 5 K = 0.00000e+00
A4 = 2.73459e−05 A6 = 3.32316e−08 A8 = 9.23524e−12
A10 = −2.12635e−13
Surface Number: 11 K = 1.00000e+00
A4 = −5.44666e−06 A6 = −6.91574e−09 A8 = −1.69497e−11
A10 = 3.80992e−13
Surface Number: 18 K = 1.00000e+00
A4 = −2.14682e−05 A6 = 1.69238e−07 A8 = −7.34656e−11
A10 = −4.73585e−12
Surface Number: 19 K = 1.00000e+00
A4 = 2.20572e−05 A6 = 1.07214e−07 A8 = 3.49803e−10
A10 = −7.90497e−12
Surface Number: 20 K = 1.00000e+00
A4 = 4.65831e−07 A6 = 4.17596e−08 A8 = −6.57210e−10
A10 = 0.00000e+00

[Variable Distance Data]

| | W Infinite | M Infinite | T Infinite | W Close | M Close | T Close |
|---|---|---|---|---|---|---|
| D3 | 2.000 | 18.199 | 30.446 | 2.000 | 18.199 | 30.446 |
| D9 | 22.008 | 6.706 | 1.701 | 22.008 | 6.706 | 1.701 |
| D19 | 3.665 | 3.116 | 1.770 | 4.734 | 6.005 | 7.453 |
| D21 | 11.952 | 25.405 | 36.955 | 11.952 | 25.405 | 36.955 |
| D25 | 0.101 | 0.102 | 0.102 | 0.101 | 0.102 | 0.102 |

[Values for Conditional Expressions]

| (1) | f1/fw = 4.7877 |
|---|---|
| (2) | BFw/fw = 0.7042 |
| (3) | 1/βRw = 1.1035 |
| (4) | f1/f1Rw = 5.5459 |
| (5) | nd3fp = 1.4971 |
| (6) | vd3p = 81.5584 |
| (7) | βFw = −0.0064 |
| (8) | f2fn/f2 = 0.7755 |
| (9) | |fF|/ft = 0.3645 |
| (10) | ωw = 43.4244° |

Figure 5A:
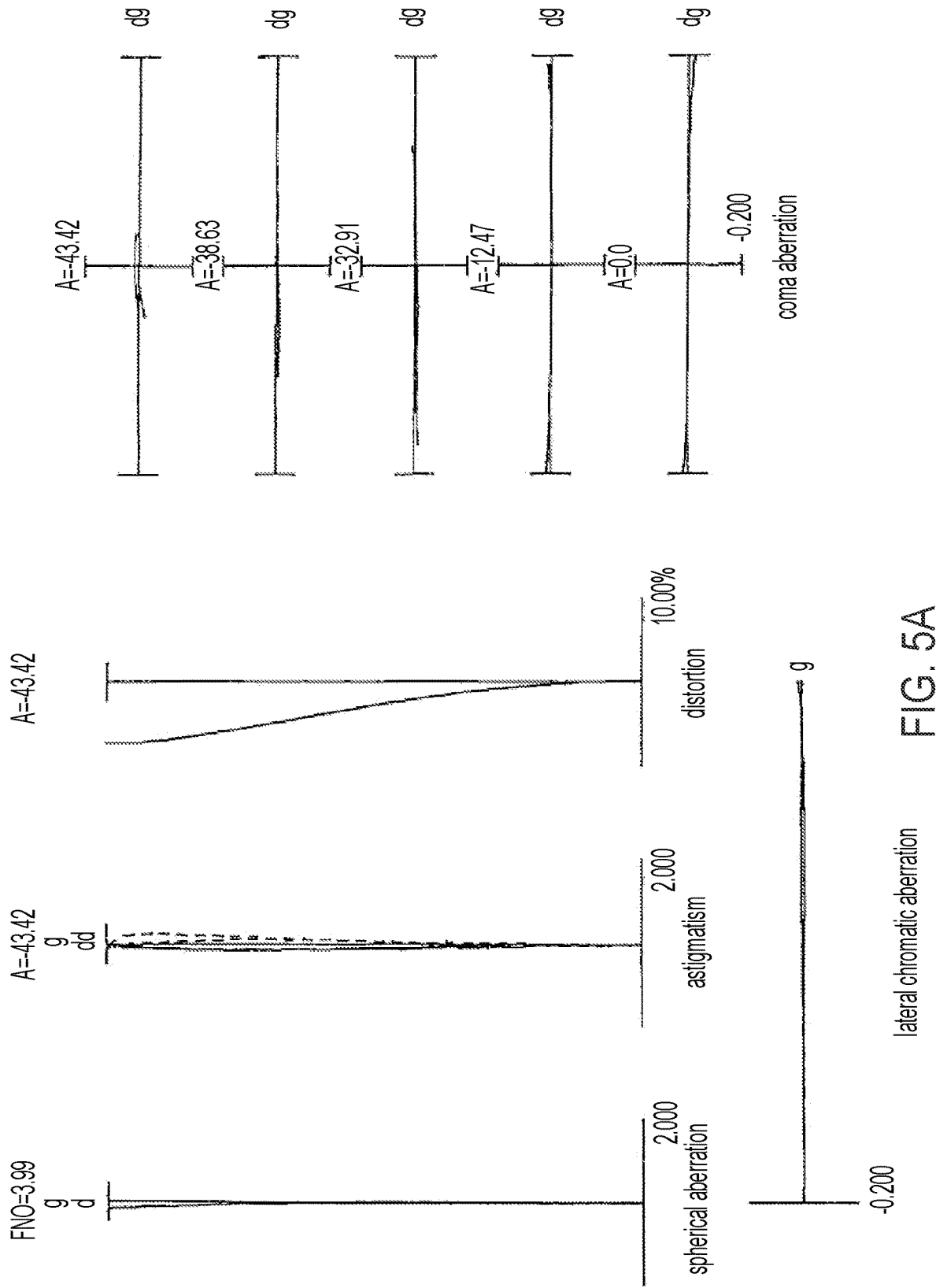
FIG. 5A, FIG. 5B and FIG. 5C are graphs showing various aberrations, upon focusing on an infinite distance object, in the wide angle end state, in the intermediate focal length state, and in the telephoto end state, respectively, of the variable magnification optical system according to the Second Example.
Figure 5B:
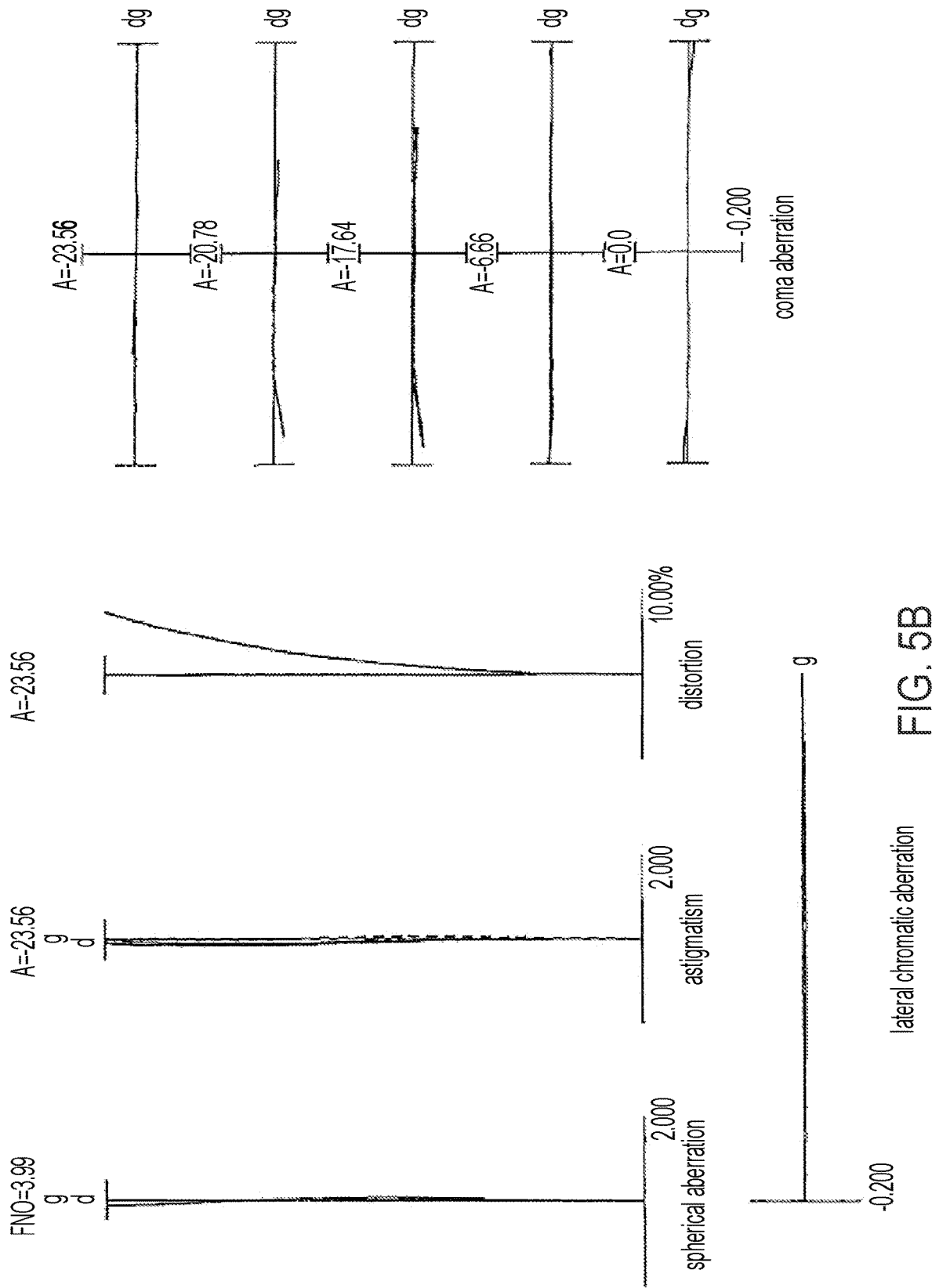
Figure 5C:
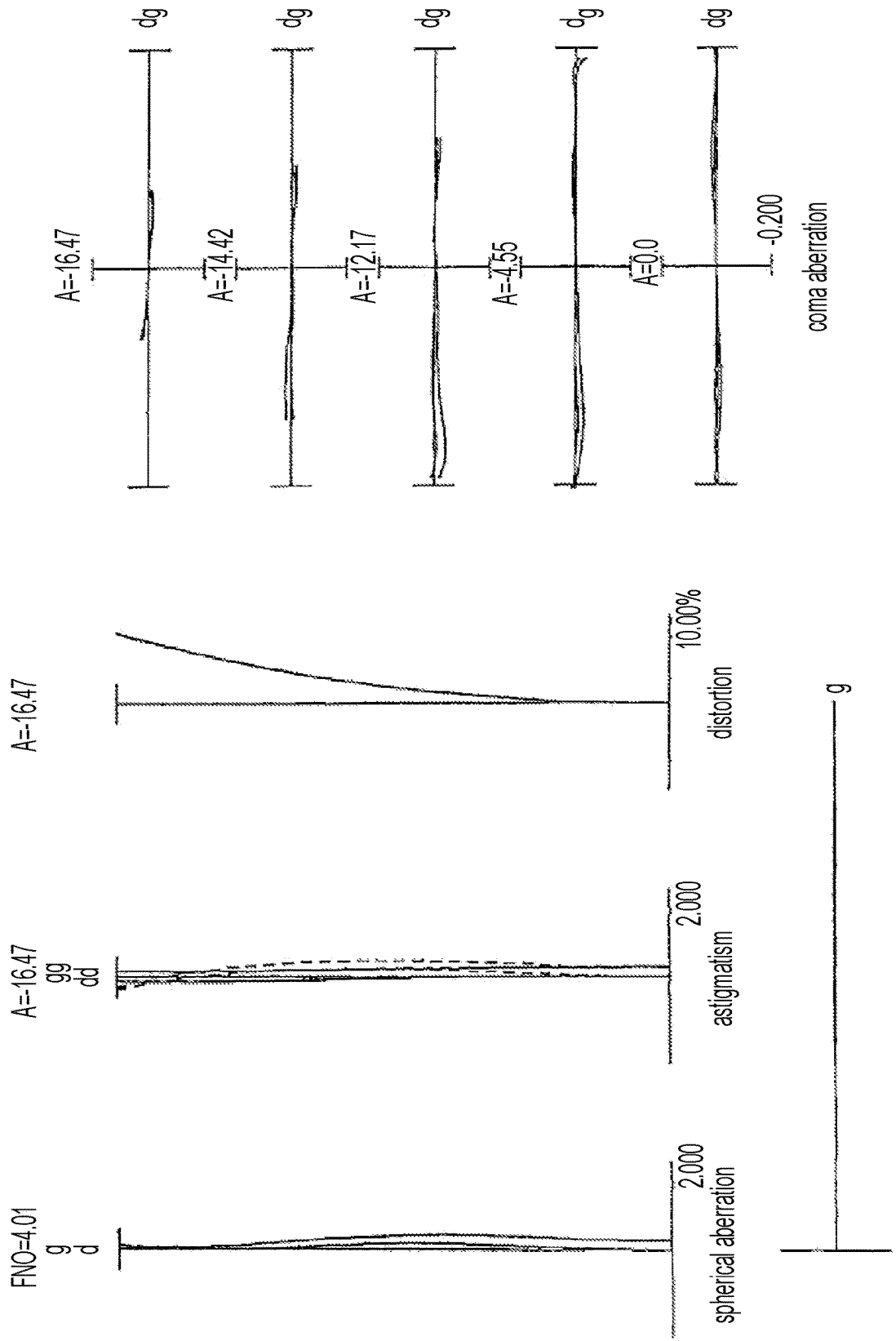

FIG. 5A, FIG. 5B and FIG. 5C are graphs showing various aberrations upon focusing on an infinite distance object, respectively, in the wide angle end state, in the intermediate focal length state and in the telephoto end state, of the variable magnification optical system according to the Second Example.

Figure 6A:
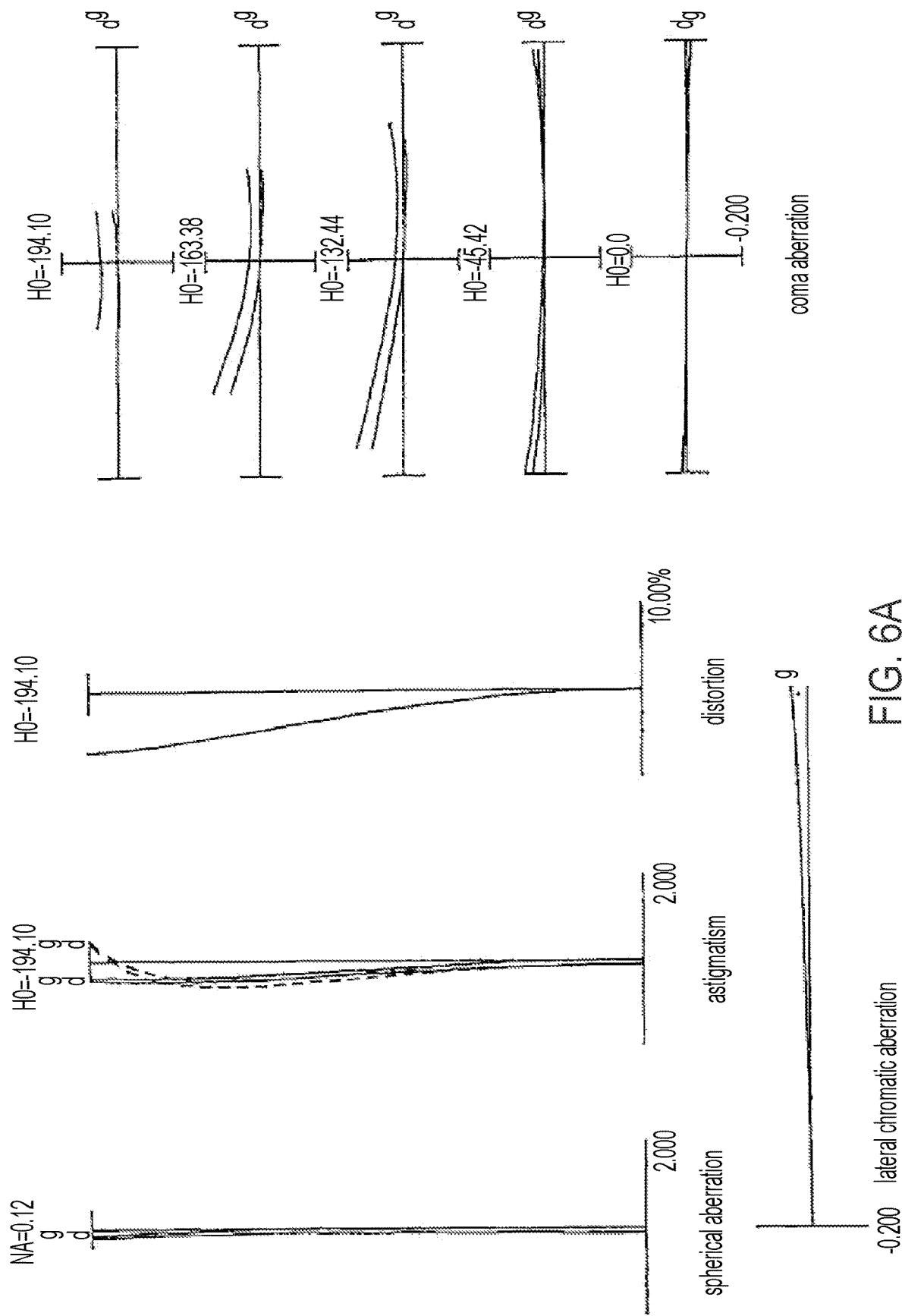
FIG. 6A, FIG. 6B and FIG. 6C are graphs showing various aberrations, upon focusing on a close distance object, in the wide angle end state, in the intermediate focal length state and in the telephoto end state, respectively, of the variable magnification optical system according to the Second Example.
Figure 6B:
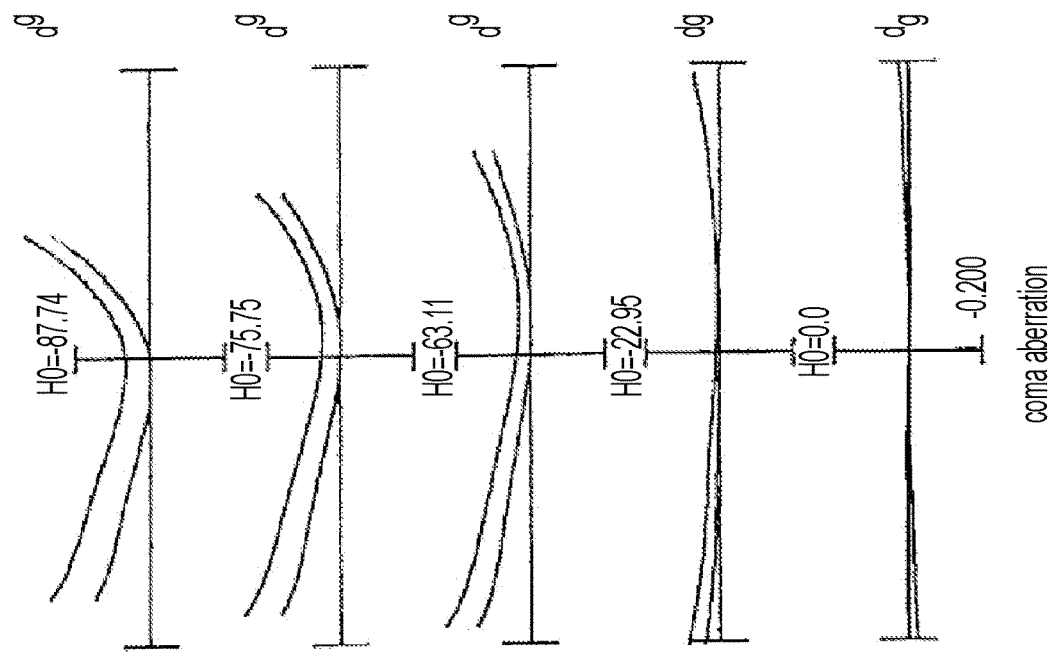
Figure 6B:
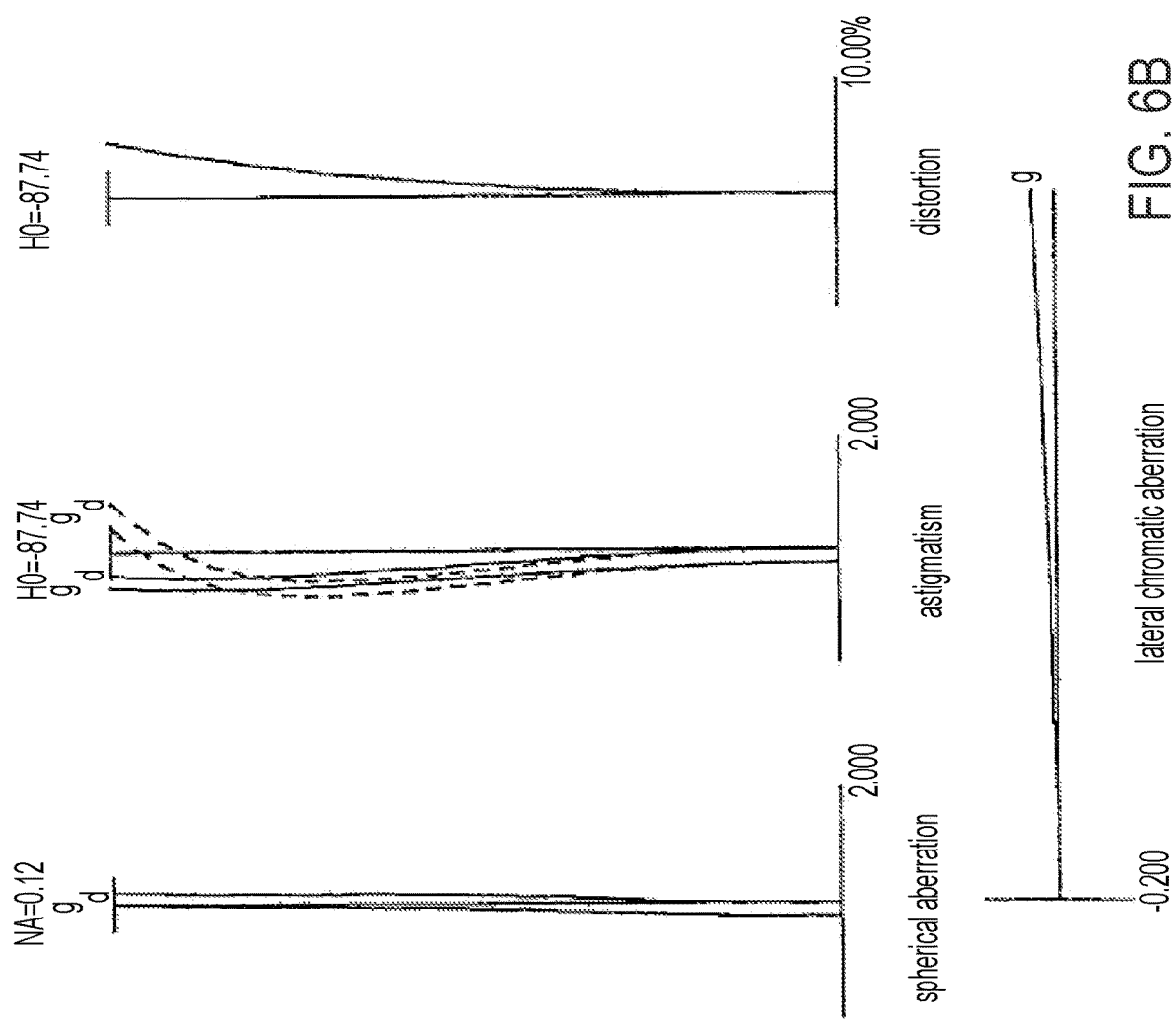
Figure 6C:
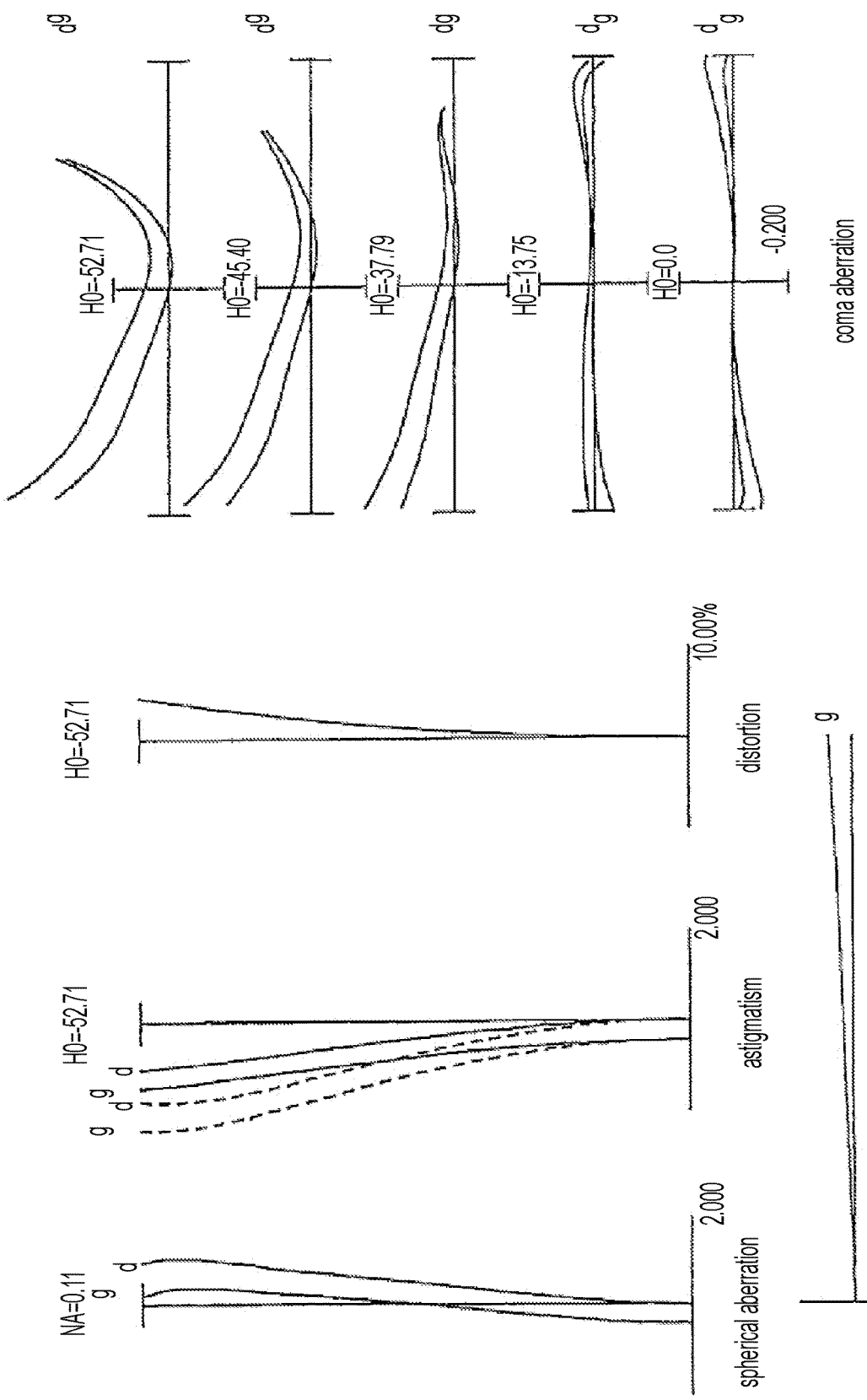

FIG. 6A, FIG. 6B and FIG. 6C are graphs showing various aberrations upon focusing on a close distance object, respectively, in the wide angle end state, in the intermediate focal length state and in the telephoto end state, of the variable magnification optical system according to the Second Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

Third Example

Figure 7A:
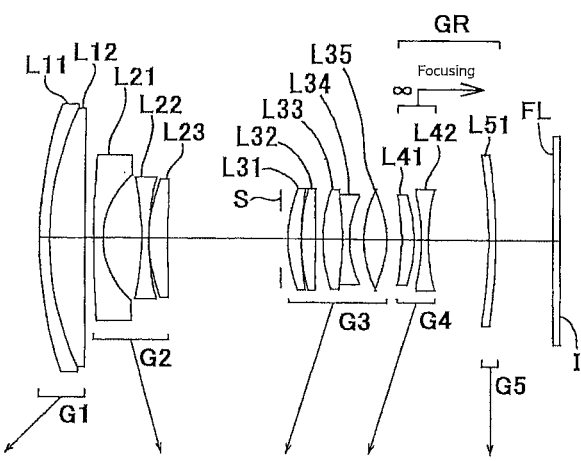
FIG. 7A, FIG. 7B and FIG. 7C are cross sectional views in the wide angle end state, in the intermediate focal length state and in the telephoto end state, respectively, of a variable magnification optical system according to a Third Example.
Figure 7B:
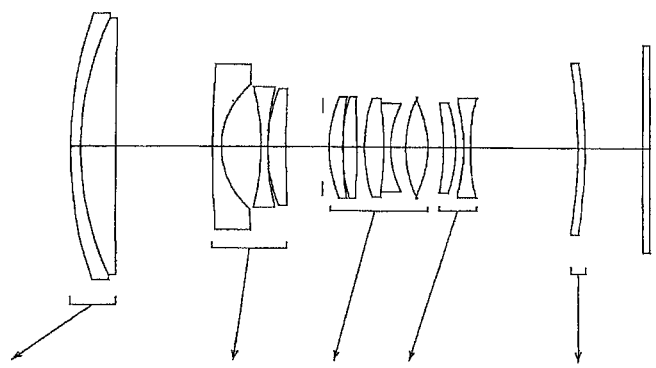
Figure 7C:
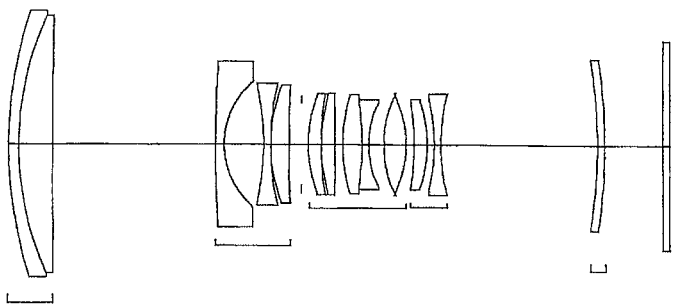

FIG. 7A, FIG. 7B and FIG. 7C are, respectively, cross sectional views in a wide angle end state, in an intermediate focal length state and in a telephoto end state, of a variable magnification optical system according to a Third Example of the variable magnification optical system of the present embodiment. Arrows below respective lens groups in FIG. 7A show directions of movements of respective lens groups upon varying magnification from the wide angle end state to the intermediate focal length state. Arrows below respective lens groups in FIG. 7B show movement trajectories of respective lens groups upon varying magnification from the intermediate focal length state to the telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having negative refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose object side lens surface and image plane I side lens surface are aspherical.

The third lens group G3 consists of, in order from the object side along the optical axis, a positive meniscus lens L31 having a convex surface facing the object side, a double convex positive lens L32, a cemented lens constructed by a double convex positive lens L33 cemented with a double concave negative lens L34, and a double convex positive lens L35. The positive meniscus lens L31 is a glass mold type aspherical lens whose object side lens surface is aspherical. The double convex positive lens L35 is a glass mold type aspherical lens whose object side lens surface and image plane I side lens surface are aspherical.

The rear lens group GR is composed of, in order from the object side along the optical axis, a fourth lens group G4 having negative refractive power and a fifth lens group G5 having negative refractive power.

The fourth lens group G4 consists of a positive meniscus lens L41 having a concave surface facing the object side and a double concave negative lens L42. The double concave negative lens L42 is a glass mold type aspherical lens whose object side lens surface and image plane I side lens surface are aspherical.

The fifth lens group G5 consists of a negative meniscus lens group L51 having a concave surface facing the object side.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, the first lens group G1, the second lens group G2, the third lens group G3 and the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. At this time, the fifth lens group G5 is fixed relative to the image plane I. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the image plane I along the optical axis as a focusing lens group.

Table 3 below shows various values of the variable magnification optical system relating to the present Example.

TABLE 3

Third Example

[Surface Data]

| m | r | d | nd | vd |
|---|---|---|---|---|
| OP | ∞ | | | |
| 1 | 89.76586 | 2.265 | 1.91255 | 19.4 |
| 2 | 66.23033 | 7.686 | 1.72916 | 54.6 |
| 3 | 2195.99100 | D3 | | |
| *4 | 277.38836 | 2.000 | 1.88079 | 37.3 |
| *5 | 17.49175 | 8.770 | | |
| 6 | −57.48461 | 1.500 | 1.49782 | 82.6 |
| 7 | 51.02263 | 0.150 | | |
| 8 | 35.06470 | 4.055 | 2.04370 | 27.2 |
| 9 | 245.04447 | D9 | | |
| 10 (S) | ∞ | 1.500 | | |
| *11 | 26.08134 | 2.954 | 1.49710 | 81.5 |
| 12 | 64.38198 | 0.150 | | |
| 13 | 42.81458 | 3.000 | 1.85896 | 22.7 |
| 14 | −408.89472 | 1.730 | | |
| 15 | 33.86607 | 4.307 | 1.49782 | 82.6 |
| 16 | −67.66664 | 1.500 | 1.85896 | 22.7 |
| 17 | 20.59315 | 3.307 | | |
| *18 | 24.88849 | 5.009 | 1.49710 | 81.5 |
| *19 | −20.31236 | D19 | | |
| 20 | −55.34887 | 2.804 | 1.92119 | 24.0 |
| 21 | −30.11397 | 1.627 | | |
| *22 | −37.35916 | 1.500 | 1.79864 | 45.4 |
| *23 | 56.50097 | D23 | | |
| 24 | −115.79135 | 1.614 | 1.48749 | 70.3 |
| 25 | −121.94772 | 13.000 | | |
| 26 | ∞ | 1.500 | 1.51680 | 64.1 |
| 27 | ∞ | D27 | | |
| I | ∞ | | | |

[Various Data]
Variable magnification ratio 2.75

| | W | M | T |
|---|---|---|---|
| f | 24.72 | 46.31 | 67.90 |
| FNo | 4.00 | 4.00 | 4.00 |
| ω | 43.5 | 23.5 | 16.4 |

TABLE 3-continued

Third Example

| | | | |
|---|---|---|---|
| Y | 21.70 | 21.70 | 21.70 |
| TL | 116.411 | 128.891 | 146.759 |
| BF | 14.601 | 14.601 | 14.601 |
| BF(air converted length) | 14.089 | 14.090 | 14.090 |

[Lens Group Data]

| Lens Group | ST | f |
|---|---|---|
| 1st Lens Group | 1 | 140.58 |
| 2nd Lens Group | 4 | −27.73 |
| 3rd Lens Group | 10 | 25.37 |
| 4th Lens Group | 20 | −47.81 |
| 5th Lens Group | 24 | −5147.18 |

[Aspherical Surface Data]

Surface Number: 4 K = 1.00000e+00
A4 = 8.89487e−06 A6 = −5.32351e−08 A8 = 1.15340e−10
A10 = −9.61968e−14
Surface Number: 5 K = 0.00000e+00
A4 = 3.06664e−05 A6 = 4.19740e−08 A8 = −3.78170e−10
A10 = 1.10549e−12
Surface Number: 11 K = 1.00000e+00
A4 = −1.43493e−05 A6 = −1.64931e−08 A8 = −1.16757e−10
A10 = 5.06940e−13
Surface Number: 18 K = 1.00000e+00
A4 = −5.15936e−06 A6 = −8.80397e−08 A8 = 2.04540e−09
A10 = −5.99297e−12
Surface Number: 19 K = 1.00000e+00
A4 = 3.60122e−05 A6 = −1.84722e−07 A8 = 2.16592e−09
A10 = −2.51269e−12
Surface Number: 22 K = 1.00000e+00
A4 = 3.47799e−05 A6 = −5.63856e−07 A8 = 5.11223e−09
A10 = −2.14413e−11
Surface Number: 23 K = 1.00000e+00
A4 = 4.08762e−05 A6 = −4.22039e−07 A8 = 3.84567e−09
A10 = −1.33757e−11

[Variable Distance Data]

| | W Infinite | M Infinite | T Infinite | W Close | M Close | T Close |
|---|---|---|---|---|---|---|
| D3 | 2.000 | 21.368 | 35.662 | 2.000 | 21.368 | 35.662 |
| D9 | 25.688 | 8.326 | 2.837 | 25.688 | 8.326 | 2.837 |
| D19 | 3.296 | 3.360 | 1.742 | 5.189 | 7.744 | 8.532 |
| D23 | 13.398 | 23.808 | 34.489 | 11.505 | 19.424 | 27.699 |
| D27 | 0.101 | 0.101 | 0.101 | 0.101 | 0.101 | 0.101 |

[Values for Conditional Expressions]

| | |
|---|---|
| (1) | f1/fw = 5.6876 |
| (2) | BFw/fw = 0.5699 |
| (3) | 1/βRw = 0.9927 |
| (4) | f1/f1Rw = 6.3490 |
| (5) | nd3fp = 1.4971 |
| (6) | vd3p = 81.5584 |
| (7) | βFw = 1.5940 |
| (8) | f2fn/f2 = 0.7670 |
| (9) | \|fF\|/ft = 0.7042 |
| (10) | ωw = 43.4653° |

Figure 8A:
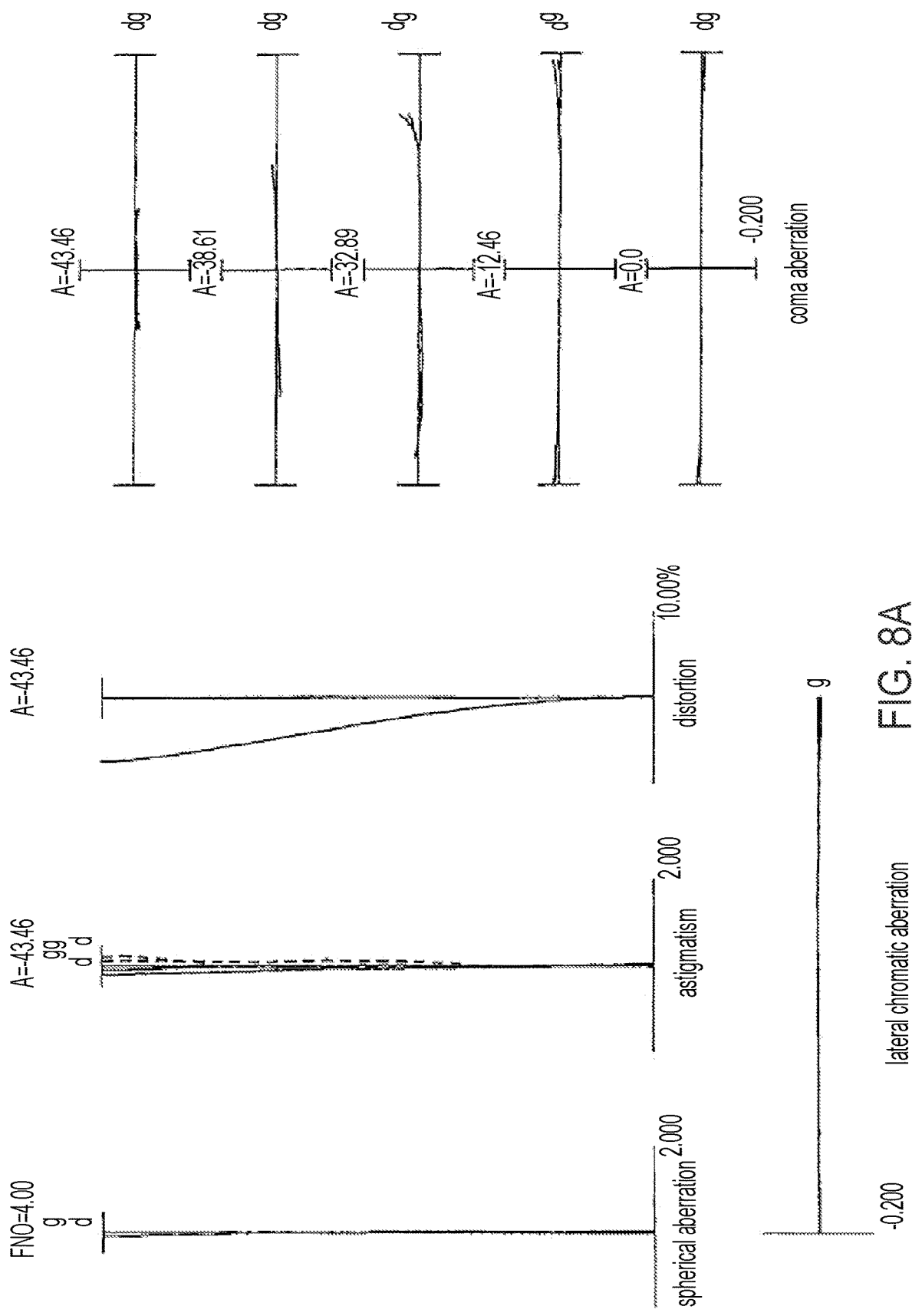
FIG. 8A, FIG. 8B and FIG. 8C are graphs showing various aberrations, upon focusing on an infinite distance object, in the wide angle end state, in the intermediate focal length state and in the telephoto end state, respectively, of the variable magnification optical system according to the Third Example
Figure 8B:
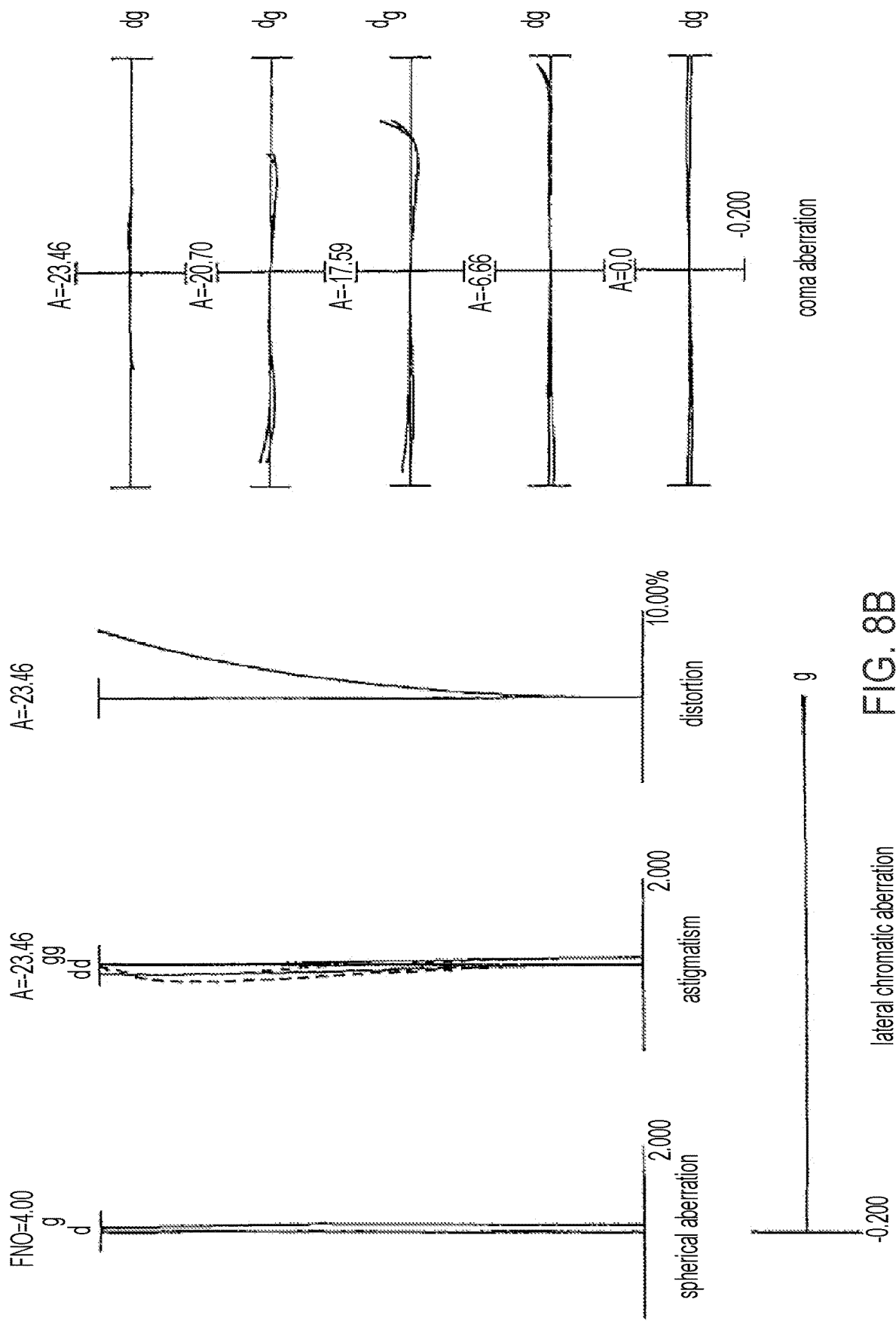
Figure 8C:
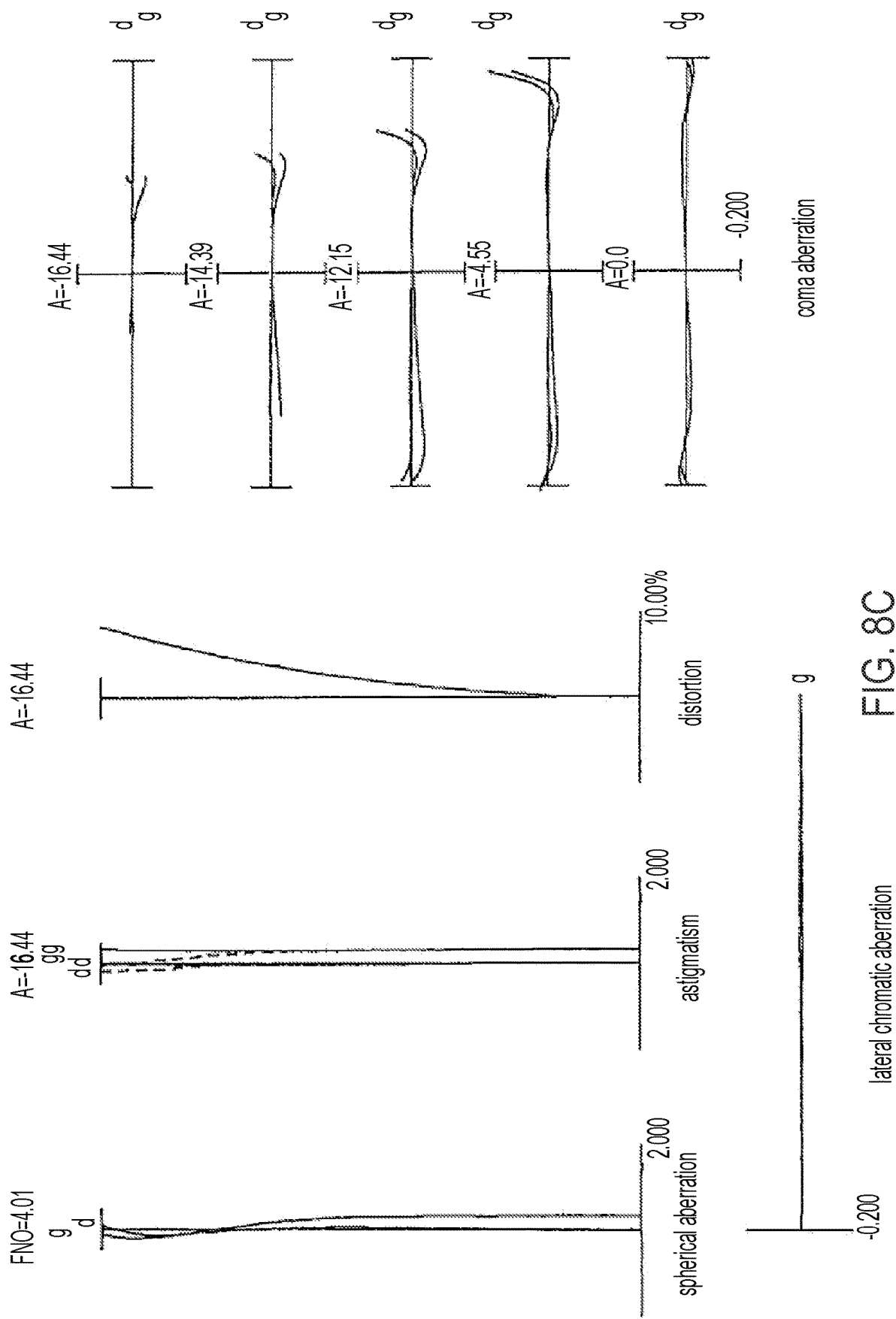

FIG. 8A, FIG. 8B and FIG. 8C are graphs showing various aberrations upon focusing on an infinite distance object, respectively, in the wide angle end state, in the intermediate focal length state and in the telephoto end state, of the variable magnification optical system according to the Third Example.

Figure 9A:
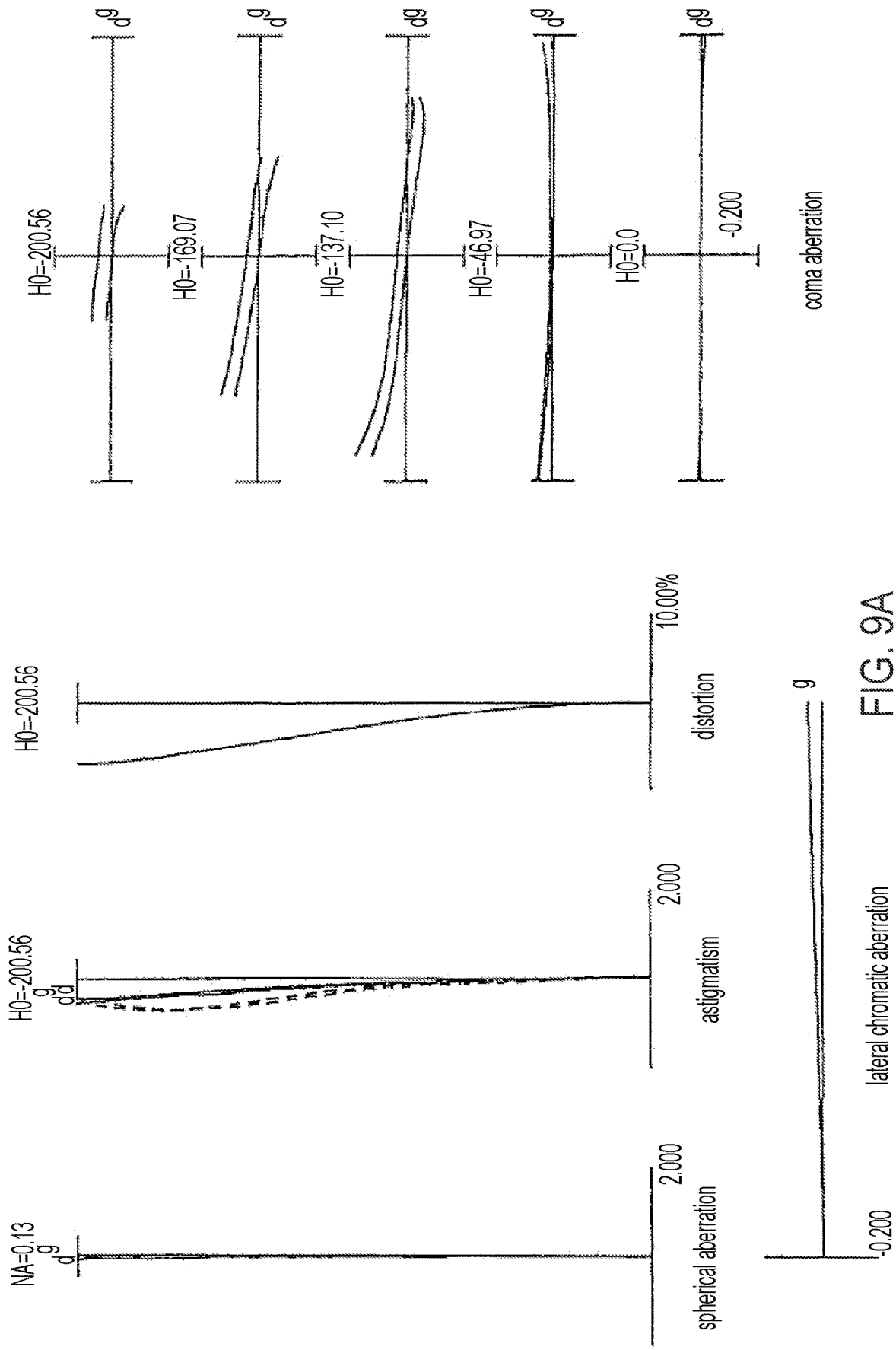
FIG. 9A, FIG. 9B and FIG. 9C are graphs showing various aberrations, upon focusing on a close distance object, in the wide angle end state, in the intermediate focal length state and in the telephoto end state, respectively, of the variable magnification optical system according to the Third Example.
Figure 9B:
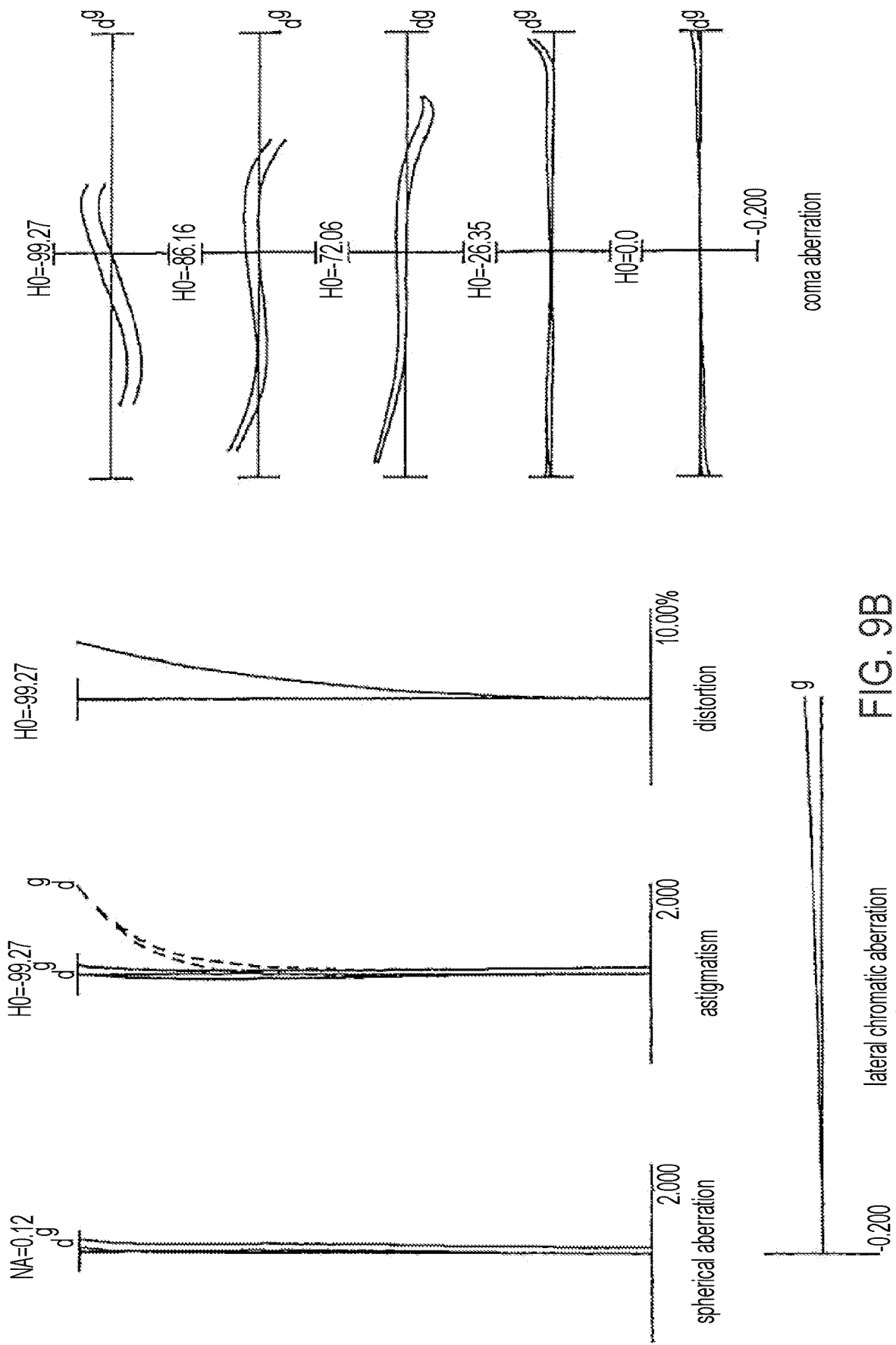
Figure 9C:
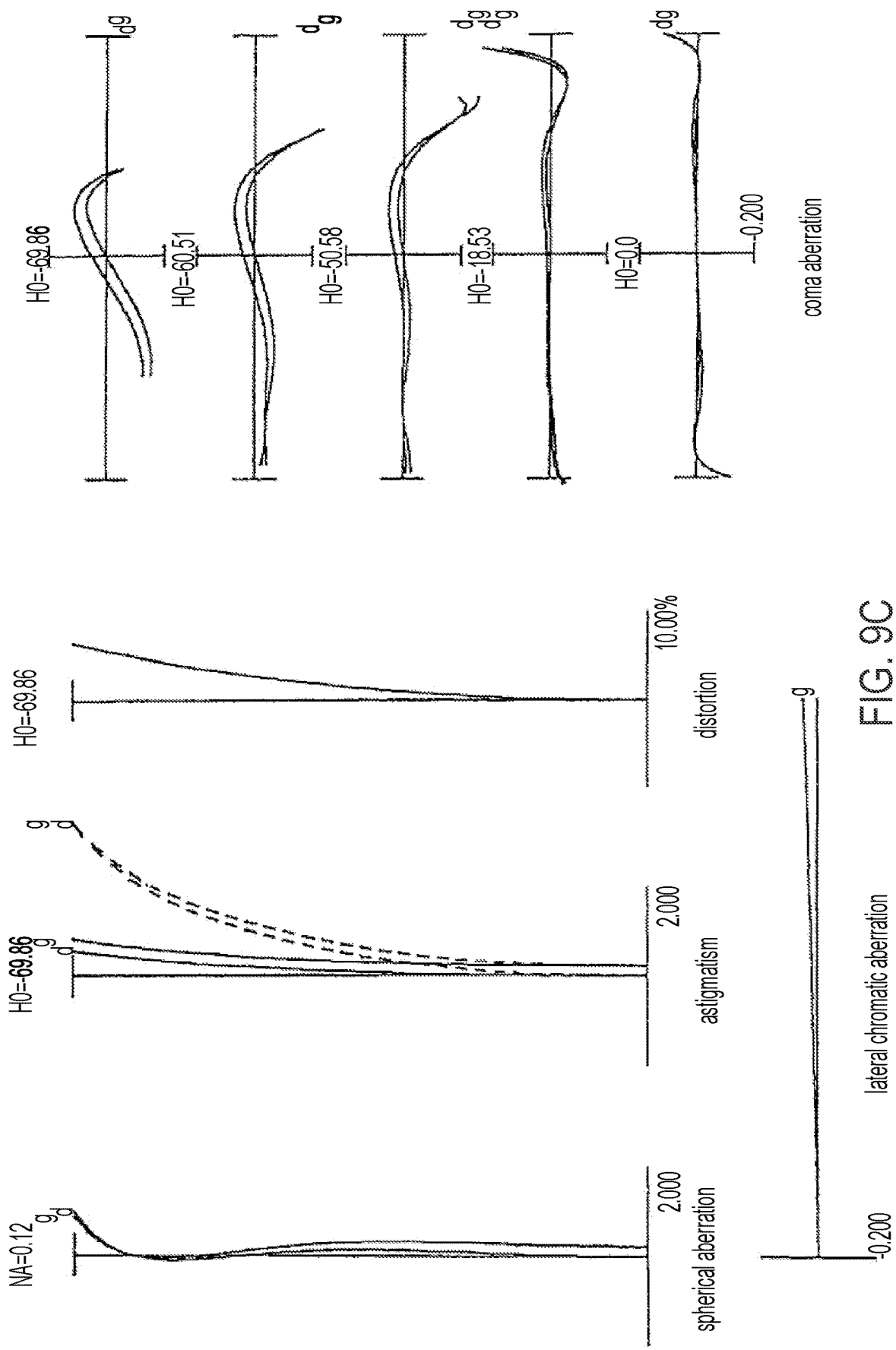

FIG. 9A, FIG. 9B and FIG. 9C are graphs showing various aberrations upon focusing on a close distance object, respectively, in the wide angle end state, in the intermediate focal length state and in the telephoto end state, of the variable magnification optical system according to the Third Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

Fourth Example

Figure 10A:
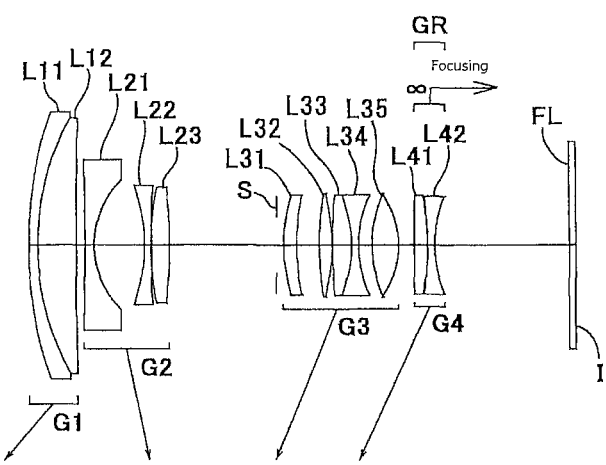
FIG. 10A, FIG. 10B and FIG. 10C are cross sectional views in the wide angle end state, in the intermediate focal length state and in the telephoto end state, respectively, of a variable magnification optical system according to a Fourth Example.
Figure 10B:
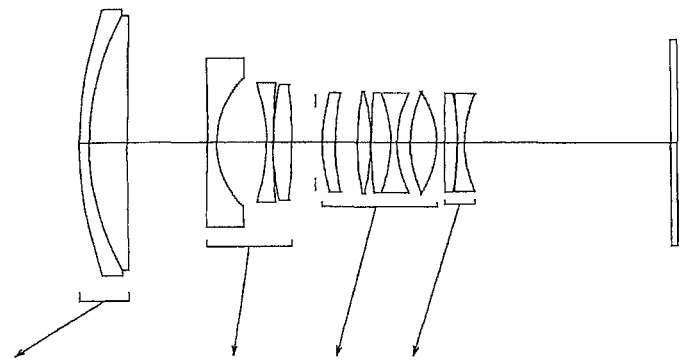
Figure 10C:
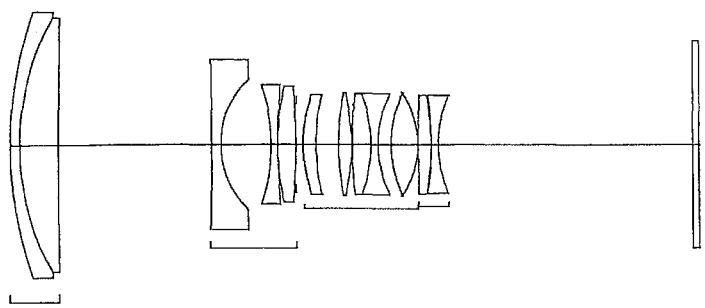

FIG. 10A, FIG. 10B and FIG. 10C are, respectively, cross sectional views in a wide angle end state, in an intermediate focal length state and in a telephoto end state, of a variable magnification optical system according to a Fourth Example of the variable magnification optical system of the present embodiment. Arrows below respective lens groups in FIG. 10A show directions of movements of respective lens groups upon varying magnification from the wide angle end state to the intermediate focal length state. Arrows below respective lens groups in FIG. 10B show movement trajectories of respective lens groups upon varying magnification from the intermediate focal length state to the telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having negative refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a double concave negative lens L21, a double concave negative lens L22, and a double convex positive lens L23. The double concave negative lens L21 is a glass mold type aspherical lens whose object side lens surface and image plane I side lens surface are aspherical.

The third lens group G3 consists of, in order from the object side along the optical axis, a positive meniscus lens L31 having a convex surface facing the object side, a double convex positive lens L32, a cemented lens constructed by a double convex positive lens L33 cemented with a double concave negative lens L34, and a double convex positive lens L35. The positive meniscus lens L31 is a glass mold type aspherical lens whose object side lens surface is aspherical. The double convex positive lens L35 is a glass mold type aspherical lens whose object side lens surface and image plane I side lens surface are aspherical.

The rear lens group GR consists of a fourth lens group G4 having negative refractive power.

The fourth lens group G4 consists of a double convex positive lens L41 and a double concave negative lens L42. The double concave negative lens L42 is a glass mold type aspherical lens whose image plane I side lens surface is aspherical.

A filter FL such as a low pass filter is disposed between the fourth lens group G4 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fourth lens group G4 are moved along the optical axis such that a distance between the first lens group G1 and the second lens group G2, a distance between the second lens group G2 and the third lens group G3, and a distance between the third lens group G3 and the fourth lens group G4, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 along the optical axis toward the image plane I as a focusing lens group.

Table 4 below shows various values of the variable magnification optical system relating to the present Example.

TABLE 4

Fourth Example

[Surface Data]

| m | r | d | nd | vd |
|---|---|---|---|---|
| OP | ∞ | | | |
| 1 | 87.62477 | 2.150 | 1.84666 | 23.8 |
| 2 | 57.73166 | 8.600 | 1.75500 | 52.3 |
| 3 | 1380.47940 | D3 | | |
| *4 | −252.60716 | 2.000 | 1.85135 | 40.1 |
| *5 | 19.73259 | 11.312 | | |
| 6 | −40.46779 | 1.500 | 1.49782 | 82.6 |
| 7 | 146.36804 | 0.100 | | |
| 8 | 64.01884 | 4.055 | 2.00100 | 29.1 |
| 9 | −126.68848 | D9 | | |
| 10 (S) | ∞ | 1.500 | | |
| *11 | 30.22445 | 3.000 | 1.59201 | 67.0 |
| 12 | 51.27630 | 5.037 | | |
| 13 | 57.69494 | 3.000 | 1.85896 | 22.7 |
| 14 | −45.14666 | 0.100 | | |
| 15 | 106.93037 | 4.300 | 1.49782 | 82.6 |
| 16 | −30.19382 | 1.500 | 1.85896 | 22.7 |
| 17 | 23.72608 | 2.966 | | |
| *18 | 23.40247 | 6.000 | 1.49710 | 81.5 |
| *19 | −18.45086 | D19 | | |
| 20 | 757.78393 | 2.800 | 1.92119 | 24.0 |
| 21 | −62.34786 | 0.172 | | |
| 22 | −73.09604 | 1.500 | 1.80139 | 45.5 |
| *23 | 26.98448 | D23 | | |
| 24 | ∞ | 1.500 | 1.51680 | 64.1 |
| 25 | ∞ | D25 | | |
| I | ∞ | | | |

[Various Data]
Variable magnification ratio 2.75

| | W | M | T |
|---|---|---|---|
| f | 24.72 | 46.32 | 67.90 |
| FNo | 4.00 | 4.00 | 4.00 |
| ω | 44.8 | 24.2 | 16.7 |
| Y | 21.70 | 21.70 | 21.70 |
| TL | 123.661 | 134.611 | 154.520 |
| BF | 32.085 | 47.771 | 58.404 |
| BF(air converted length) | 31.574 | 47.260 | 57.893 |

[Lens Group Data]

| Lens Group | ST | f |
|---|---|---|
| 1$^{st}$ Lens Group | 1 | 132.04 |
| 2$^{nd}$ Lens Group | 4 | −30.82 |
| 3$^{rd}$ Lens Group | 10 | 25.48 |
| 4$^{th}$ Lens Group | 20 | −41.00 |

TABLE 4-continued

Fourth Example

[Aspherical Surface Data]

Surface Number: 4 K = 1.00000e+00
A4 = 9.70747e−06 A6 = −3.52770e−08 A8 = 6.58152e−11
A10 = −4.95165e−14
Surface Number: 5 K = 0.00000e+00
A4 = 2.00742e−05 A6 = 3.39646e−08 A8 = −2.35998e−10
A10 = 6.14412e−13
Surface Number: 11 K = 1.00000e+00
A4 = −1.87683e−05 A6 = −3.17314e−08 A8 = −8.74929e−11
A10 = 1.27393e−13
Surface Number: 18 K = 1.00000e+00
A4 = −2.29499e−05 A6 = −5.63341e−08 A8 = 5.89446e−10
A10 = −2.45654e−12
Surface Number: 19 K = 1.00000e+00
A4 = 2.51719e−05 A6 = −1.53372e−07 A8 = 1.18933e−09
A10 = −4.11191e−12
Surface Number: 23 K = 1.00000e+00
A4 = −2.18656e−06 A6 = 7.65289e−08 A8 = −5.83461e−10
A10 = 2.30823e−12

[Variable Distance Data]

| | W Infinite | M Infinite | T Infinite | W Close | M Close | T Close |
|---|---|---|---|---|---|---|
| D3 | 2.000 | 18.027 | 34.324 | 2.000 | 18.027 | 34.324 |
| D9 | 24.453 | 5.483 | 0.100 | 24.453 | 5.483 | 0.100 |
| D19 | 3.531 | 1.737 | 0.100 | 4.979 | 4.625 | 4.590 |
| D23 | 30.484 | 46.169 | 56.802 | 29.035 | 43.281 | 52.312 |
| D25 | 0.101 | 0.102 | 0.102 | 0.101 | 0.102 | 0.103 |

[Values for Conditional Expressions]

| (1) | f1/fw = 4.8288 |
|---|---|
| (2) | BFw/fw = 1.2773 |
| (3) | 1/βRw = 0.6139 |
| (4) | f1/f1Rw = 5.5629 |
| (5) | nd3fp = 1.4971 |
| (6) | vd3p = 81.5584 |
| (7) | βFw = 1.6289 |
| (8) | f2fn/f2 = 0.7305 |
| (9) | |fF|/ft = 0.6426 |
| (10) | ωw = 44.2631° |

Figure 11A:
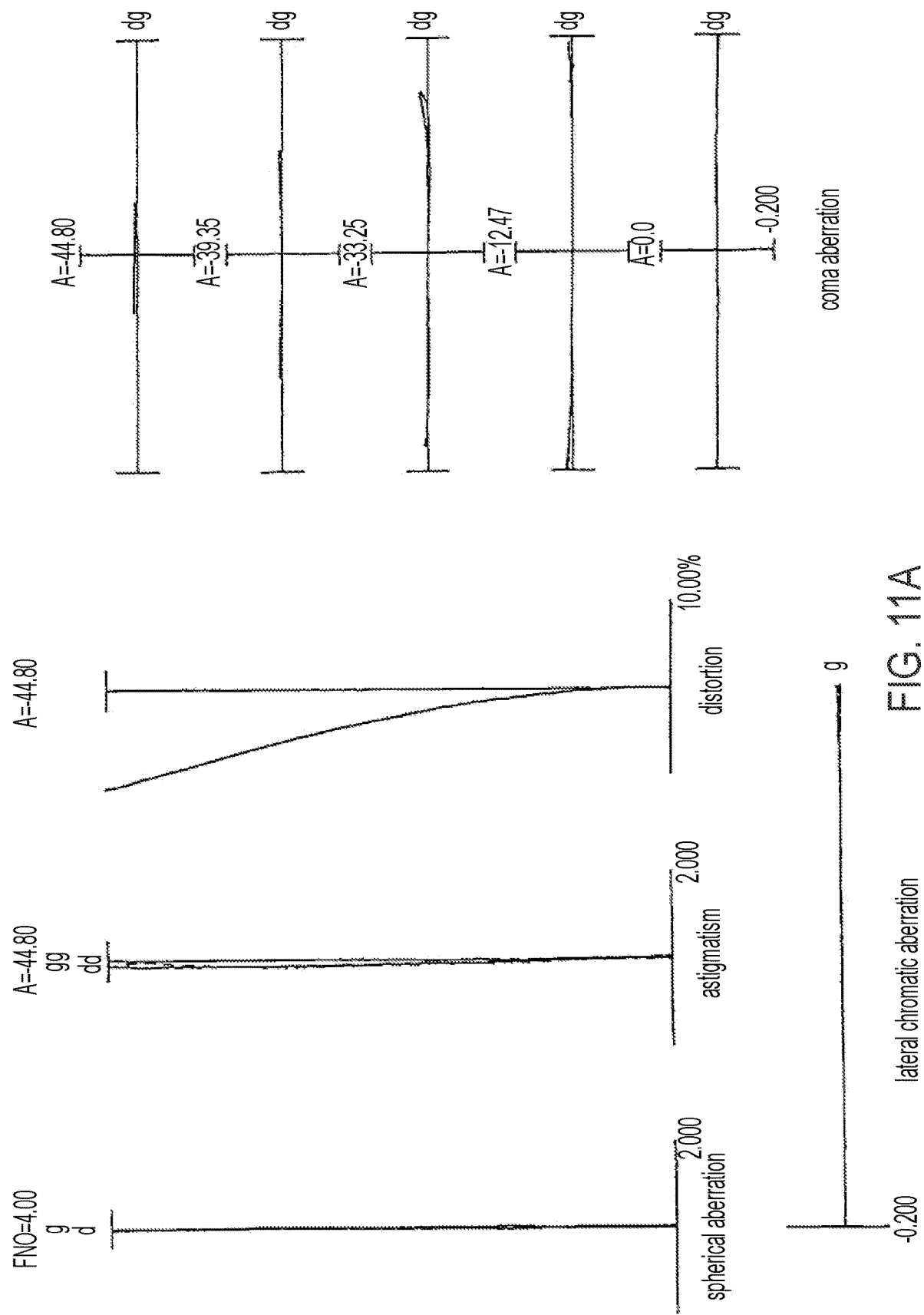
FIG. 11A, FIG. 11B and FIG. 11C are graphs showing various aberrations, upon focusing on an infinite distance object, in the wide angle end state, in the intermediate focal length state and in the telephoto end state, respectively, of the variable magnification optical system according to the Fourth Example.
Figure 11B:
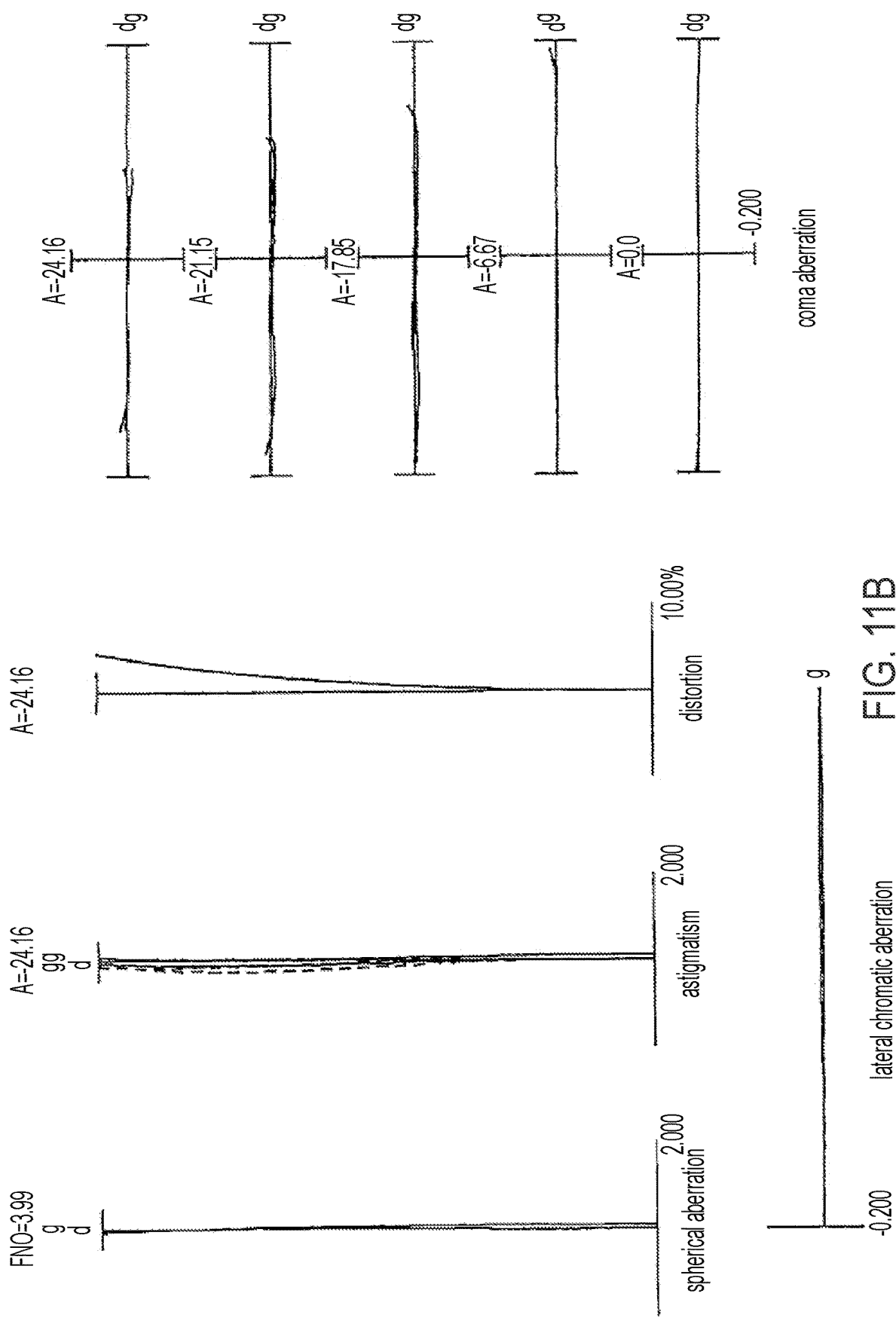
Figure 11C:
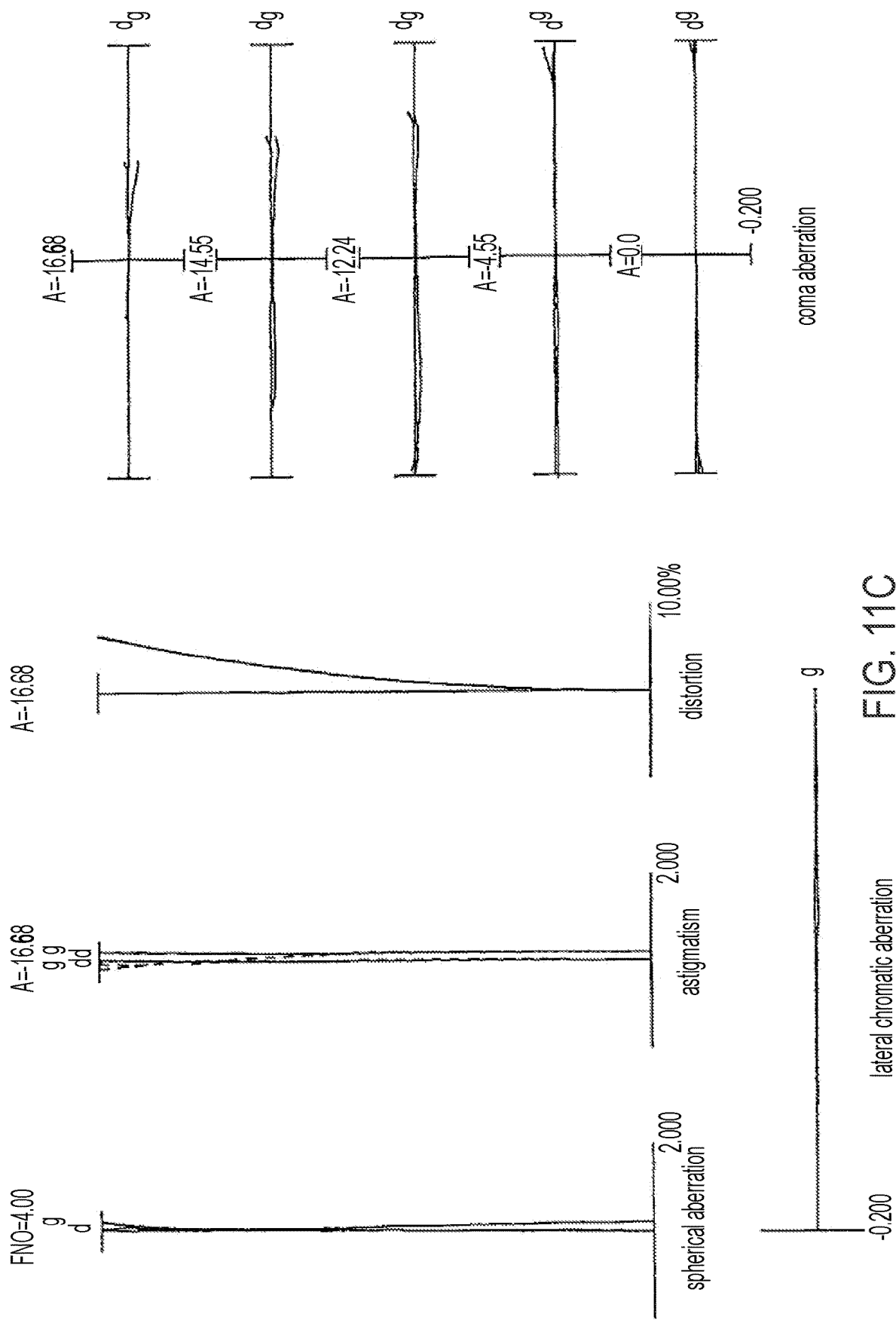

FIG. 11A, FIG. 11B and FIG. 11C are graphs showing various aberrations upon focusing on an infinite distance object, respectively, in the wide angle end state, in the intermediate focal length state and in the telephoto end state, of the variable magnification optical system according to the Fourth Example.

Figure 12A:
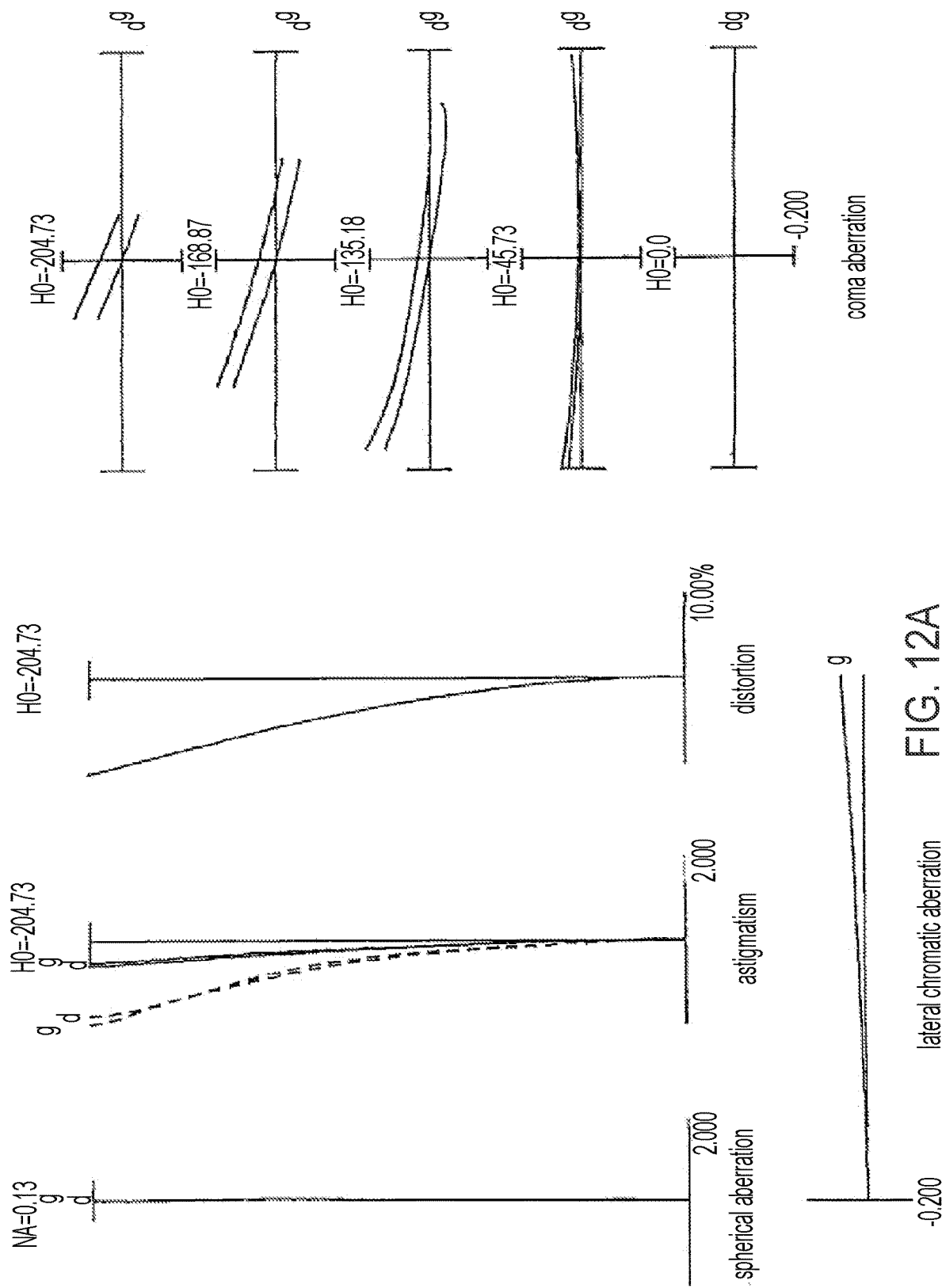
FIG. 12A, FIG. 12B and FIG. 12C are graphs showing various aberrations, upon focusing on a close distance object, in the wide angle end state, in the intermediate focal length state and in the telephoto end state, respectively, of the variable magnification optical system according to the Fourth Example.
Figure 12B:
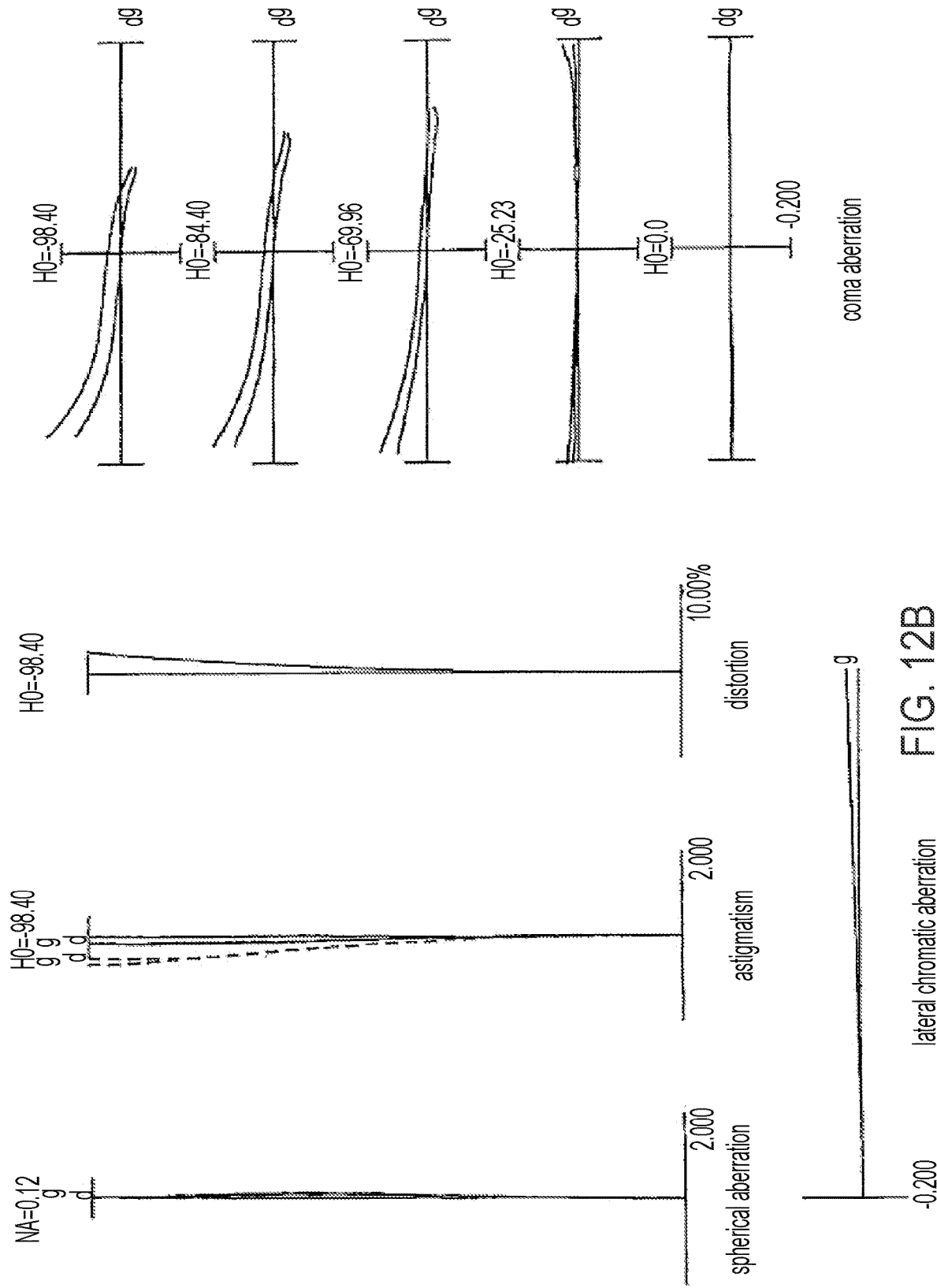
Figure 12C:
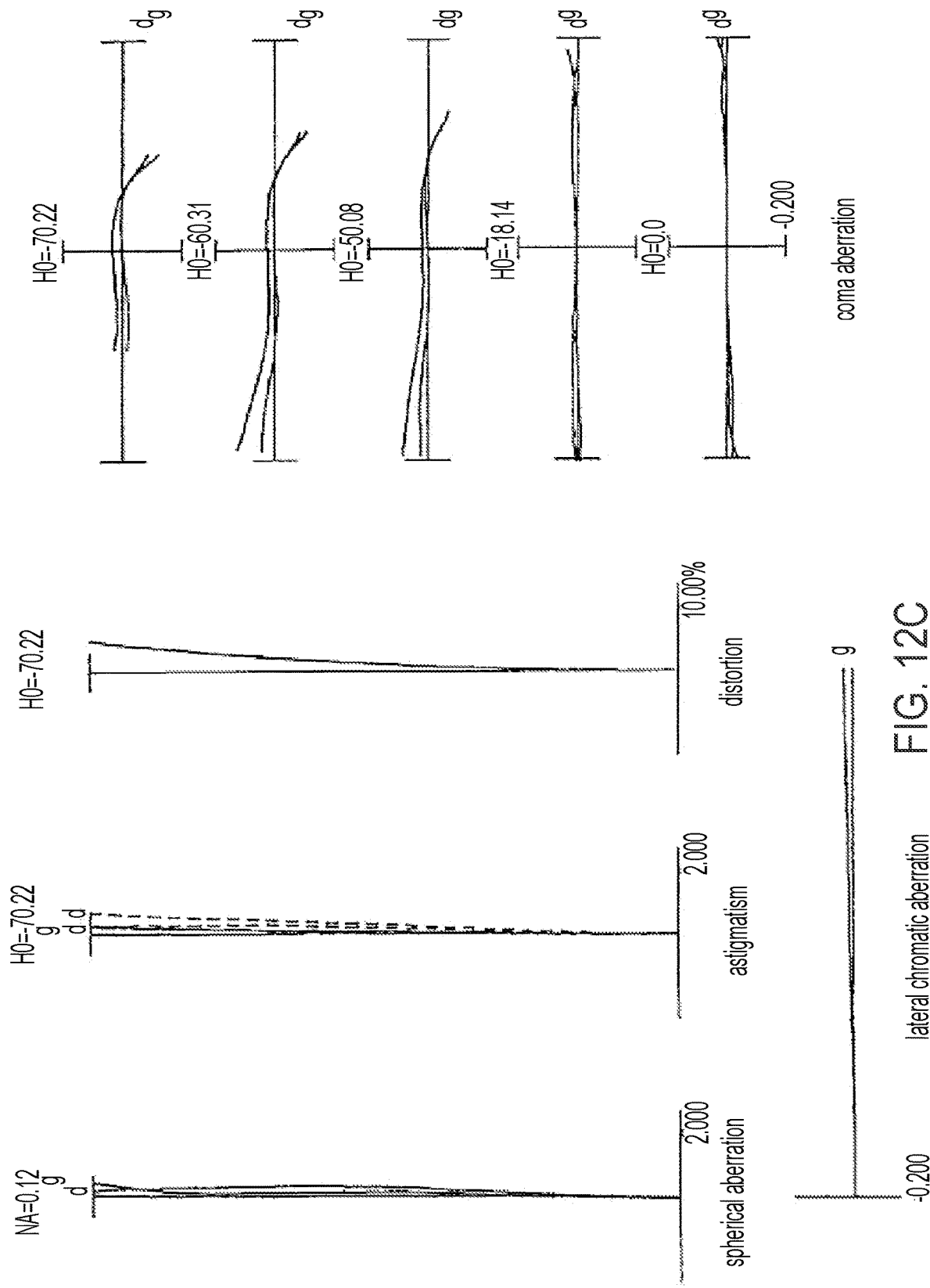

FIG. 12A, FIG. 12B and FIG. 12C are graphs showing various aberrations upon focusing on a close distance object, respectively, in the wide angle end state, in the intermediate focal length state and in the telephoto end state, of the variable magnification optical system according to the Fourth Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

Fifth Example

Figure 13A:
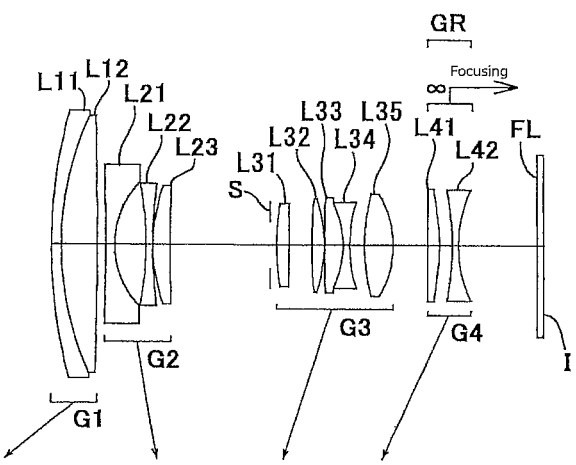
FIG. 13A, FIG. 13B and FIG. 13C are cross sectional views in the wide angle end state, in the intermediate focal length state and in the telephoto end state, respectively, of a variable magnification optical system according to a Fifth Example.
Figure 13B:
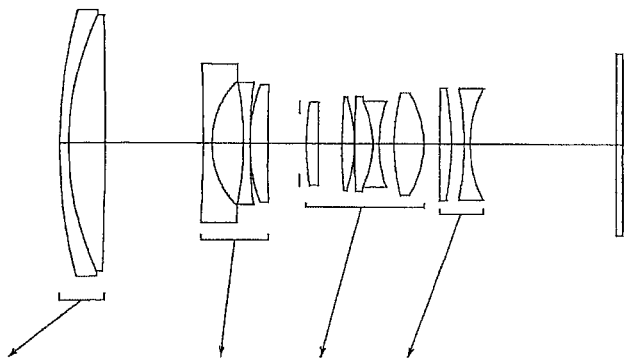
Figure 13C:
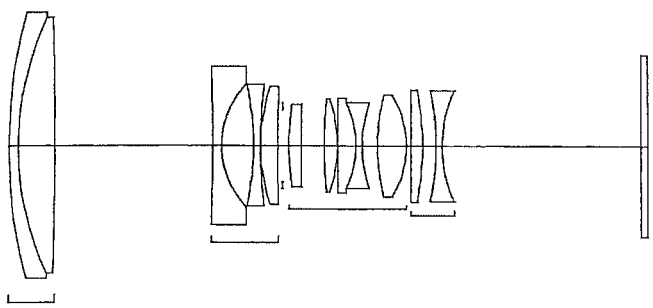

FIG. 13A, FIG. 13B and FIG. 13C are, respectively, cross sectional views in a wide angle end state, in an intermediate focal length state and in a telephoto end state, of a variable magnification optical system according to a Fifth Example of the variable magnification optical system of the present embodiment. Arrows below respective lens groups in FIG. 13A show directions of movements of respective lens groups upon varying magnification from the wide angle end state to the intermediate focal length state. Arrows below respective lens groups in FIG. 13B show movement trajectories of respective lens groups upon varying magnification from the intermediate focal length state to the telephoto end state.

The variable magnification optical system according to the present Example is composed of, in order from the object side along the optical axis, a first lens group G1 having positive refractive power, a second lens group G2 having negative refractive power, an aperture stop S, a third lens group G3 having positive refractive power, and a rear lens group GR having negative refractive power.

The first lens group G1 consists of a cemented lens constructed by, in order from the object side along the optical axis, a negative meniscus lens L11 having a convex surface facing the object side cemented with a double convex positive lens L12.

The second lens group G2 consists of, in order from the object side along the optical axis, a double concave negative lens L21, a double concave negative lens L22, and a positive meniscus lens L23 having a convex surface facing the object side. The double concave negative lens L21 is a glass mold type aspherical lens whose image plane I side lens surface is aspherical.

The third lens group G3 consists of, in order from the object side along the optical axis, a double convex positive lens L31, a double convex positive lens L32, a cemented lens constructed by a double convex positive lens L33 cemented with a double concave negative lens L34, and a double convex positive lens L35. The double convex positive lens L31 is a glass mold type aspherical lens whose object side lens surface is aspherical. The double convex positive lens L35 is a glass mold type aspherical lens whose object side lens surface is aspherical.

The rear lens group GR is composed of a fourth lens group G4 having negative refractive power.

The fourth lens group G4 consists of a double convex positive lens L41 and a double concave negative lens L42. The double concave negative lens L42 is a glass mold type aspherical lens whose object side lens surface is aspherical.

A filter FL such as a low pass filter is disposed between the fourth lens group G4 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fourth lens group G4 are moved along the optical axis such that a distance between the first lens group G1 and the second lens group G2, a distance between the second lens group G2 and the third lens group G3, and a distance between the third lens group G3 and the fourth lens group G4, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the image plane I along the optical axis as a focusing lens group.

Table 5 below shows various values of the variable magnification optical system relating to the present Example.

TABLE 5

Fifth Example

[Surface Data]

| m | r | d | nd | νd |
|---|---|---|---|---|
| OP | ∞ | | | |
| 1 | 119.32600 | 2.150 | 1.84666 | 23.8 |
| 2 | 68.71728 | 8.600 | 1.75500 | 52.3 |
| 3 | −1041.56390 | D3 | | |
| 4 | −457.17100 | 2.000 | 1.85135 | 40.1 |
| *5 | 20.61283 | 7.414 | | |
| 6 | −71.55363 | 1.500 | 1.49782 | 82.6 |
| 7 | 108.27671 | 0.100 | | |
| 8 | 42.73022 | 4.055 | 2.00069 | 25.5 |
| 9 | 567.23839 | D9 | | |
| 10 (S) | ∞ | 1.500 | | |
| *11 | 49.74902 | 2.954 | 1.55332 | 71.7 |
| 12 | −831.68070 | 5.492 | | |
| 13 | 119.77899 | 3.000 | 1.86074 | 23.1 |
| 14 | −32.91562 | 0.100 | | |
| 15 | 788.35305 | 4.307 | 1.49782 | 82.6 |
| 16 | −22.05418 | 1.500 | 1.86074 | 23.1 |
| 17 | 30.00000 | 3.522 | | |
| *18 | 41.01853 | 7.000 | 1.59201 | 67.0 |
| 19 | −22.23377 | D19 | | |
| 20 | 1063.64530 | 2.804 | 1.90200 | 25.3 |
| 21 | −64.43734 | 3.021 | | |
| *22 | −73.11499 | 1.500 | 1.80139 | 45.5 |
| 23 | 30.53440 | D23 | | |
| 24 | ∞ | 1.500 | 1.51680 | 64.1 |
| 25 | ∞ | D25 | | |
| I | ∞ | | | |

[Various Data]
Variable magnification ratio 2.75

| | W | M | T |
|---|---|---|---|
| f | 24.72 | 46.31 | 67.90 |
| FNo | 4.00 | 4.00 | 4.00 |
| ω | 43.3 | 22.1 | 15.4 |
| Y | 20.00 | 20.00 | 20.00 |
| TL | 116.346 | 132.760 | 149.927 |
| BF | 20.082 | 35.787 | 48.197 |
| BF(air converted length) | 19.571 | 35.276 | 47.686 |

[Lens Group Data]

| Lens Group | ST | f |
|---|---|---|
| 1st Lens Group | 1 | 154.54 |
| 2nd Lens Group | 4 | −34.53 |
| 3rd Lens Group | 10 | 28.38 |
| 4th Lens Group | 20 | −48.62 |

[Aspherical Surface Data]

Surface Number: 5 K = 0.00000e+00
A4 = 1.27904e−05 A6 = 4.25474e−08 A8 = −1.06207e−10
A10 = 3.28727e−13
Surface Number: 11 K = 1.00000e+00
A4 = −2.37429e−05 A6 = −4.66597e−09 A8 = −4.37585e−10
A10 = 2.03678e−12
Surface Number: 18 K = 1.00000e+00
A4 = −1.38634e−05 A6 = 3.10542e−08 A8 = −4.01477e−11
A10 = 9.01450e−14
Surface Number: 22 K = 1.00000e+00
A4 = −4.04480e−06 A6 = −1.42432e−08 A8 = 1.81173e−10
A10 = −7.62702e−13

[Variable Distance Data]

| | W Infinite | M Infinite | T Infinite | W Close | M Close | T Close |
|---|---|---|---|---|---|---|
| D3 | 2.000 | 23.094 | 37.212 | 2.000 | 23.094 | 37.212 |
| D9 | 23.685 | 7.628 | 1.000 | 23.685 | 7.628 | 1.000 |

TABLE 5-continued

Fifth Example

| | | | | | | |
|---|---|---|---|---|---|---|
| D19 | 8.059 | 3.733 | 1.000 | 9.929 | 6.663 | 5.153 |
| D23 | 18.482 | 34.186 | 46.595 | 16.612 | 31.256 | 42.442 |
| D25 | 0.101 | 0.101 | 0.102 | 0.101 | 0.101 | 0.102 |

[Values for Conditional Expressions]

| | |
|---|---|
| (1) | f1/fw = 6.2515 |
| (2) | BFw/fw = 0.7917 |
| (3) | 1/βRw = 0.7392 |
| (4) | f1/f1Rw = 6.8464 |
| (5) | nd3fp = 1.5533 |
| (6) | vd3p = 71.6835 |
| (7) | βFw = 1.3529 |
| (8) | f2fn/f2 = 0.6696 |
| (9) | |fF|/ft = 0.7160 |
| (10) | ωw = 46.7678° |

Figure 14A:
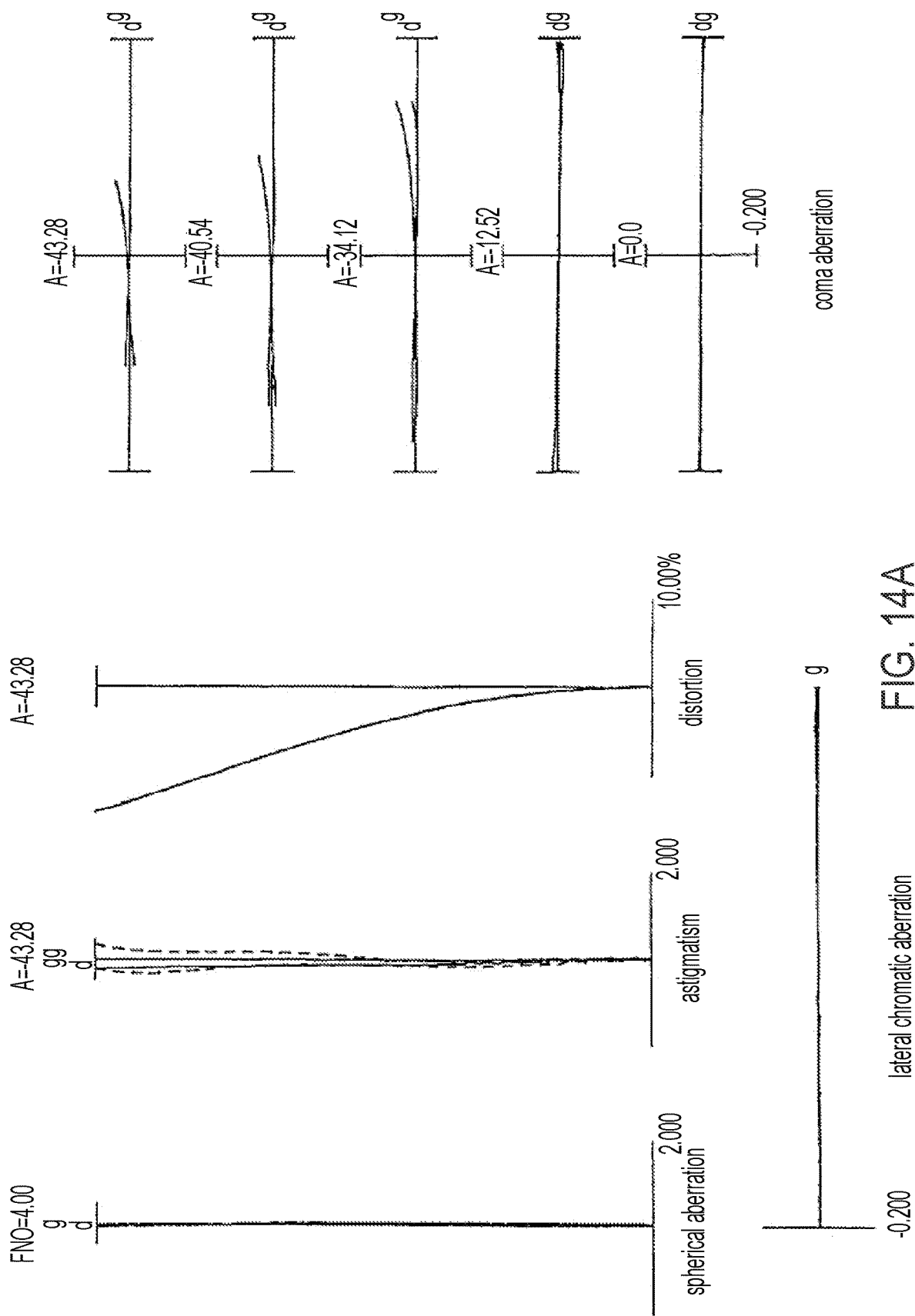
FIG. 14A, FIG. 14B and FIG. 14C are graphs showing various aberrations, upon focusing on an infinite distance object, in the wide angle end state, in the intermediate focal length state and in the telephoto end state, respectively, of the variable magnification optical system according to the Fifth Example
Figure 14B:
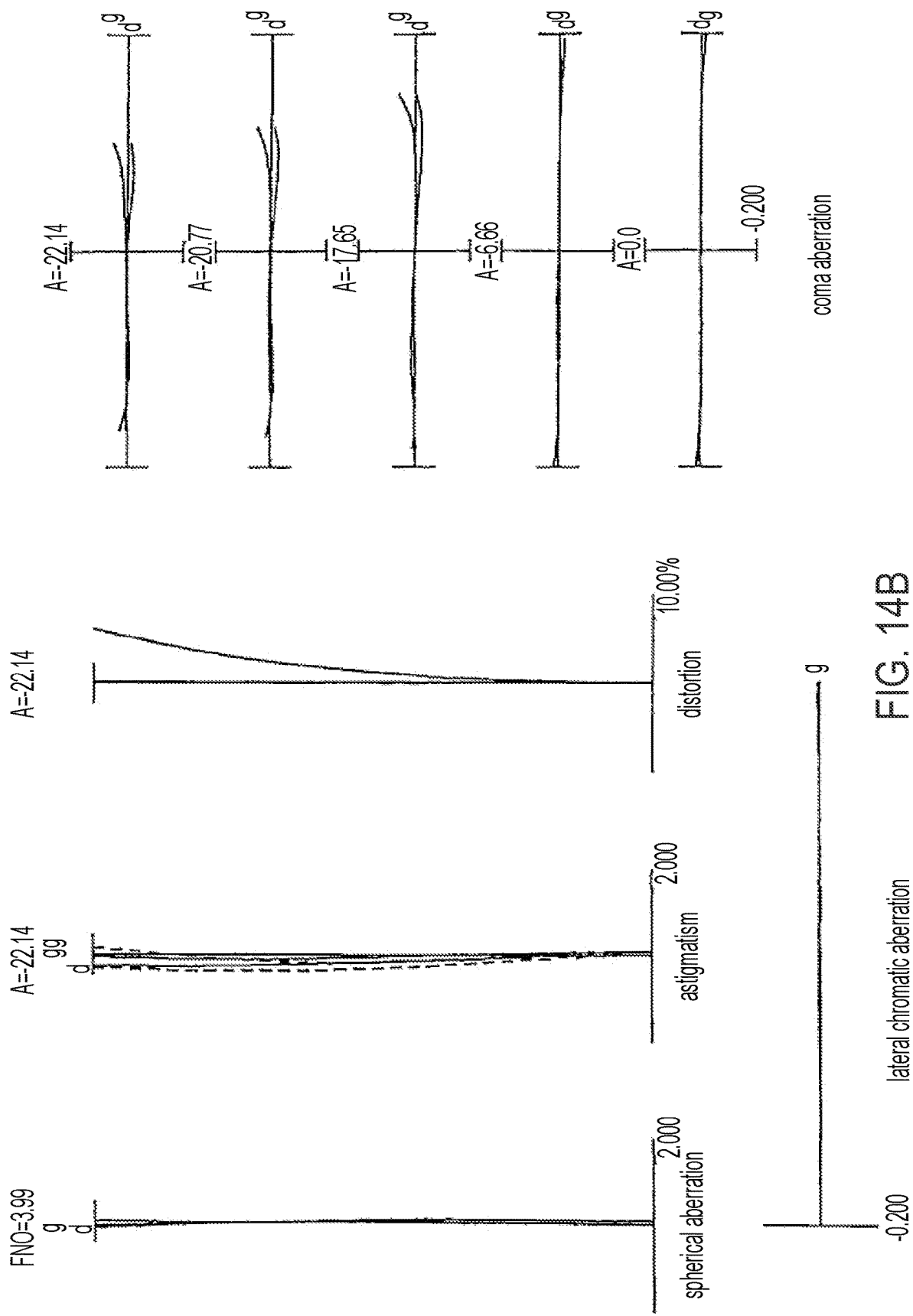
Figure 14C:
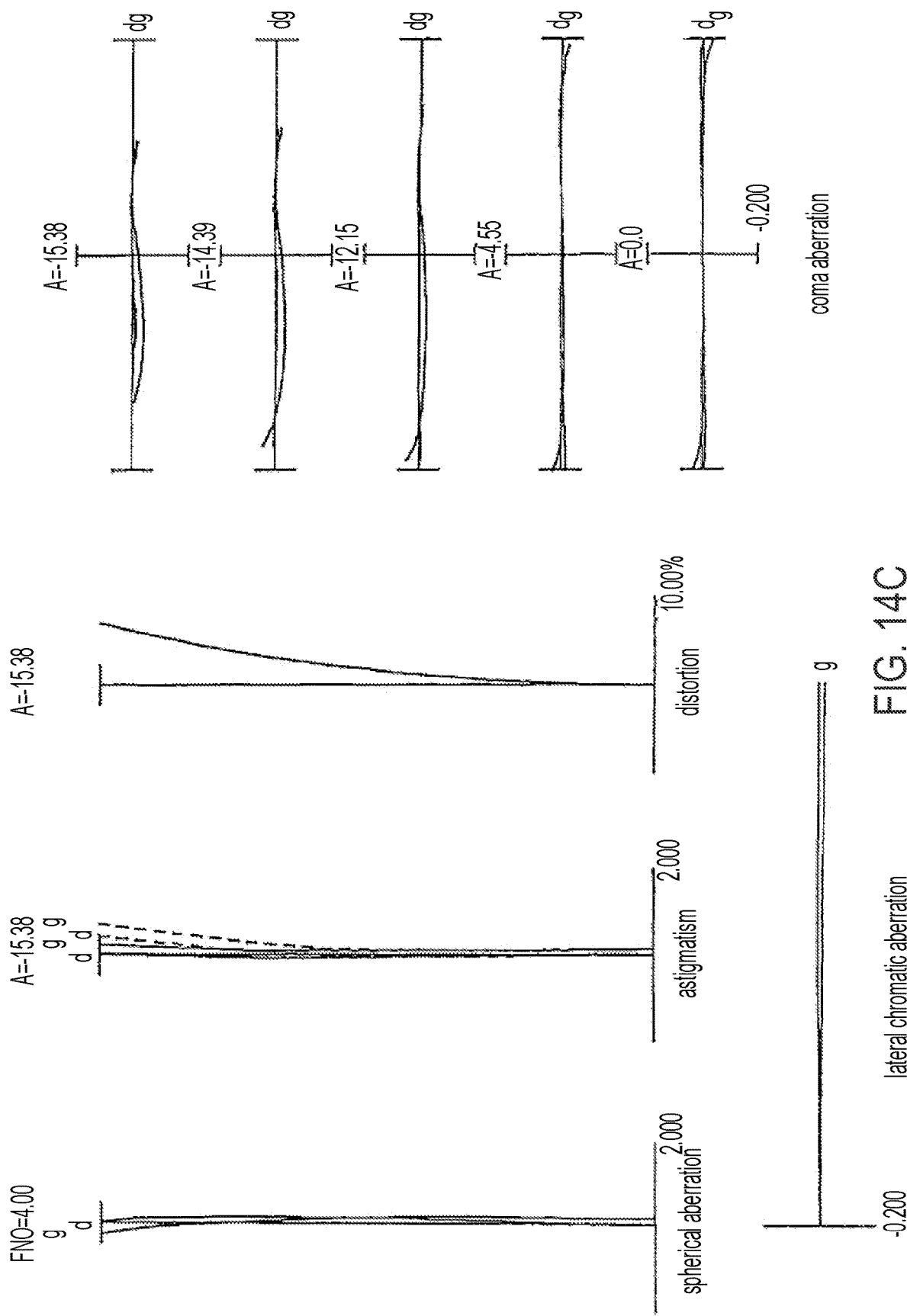

FIG. 14A, FIG. 14B and FIG. 14C are graphs showing various aberrations upon focusing on an infinite distance object, respectively, in the wide angle end state, in the intermediate focal length state and in the telephoto end state, of the variable magnification optical system according to the Fifth Example.

Figure 15A:
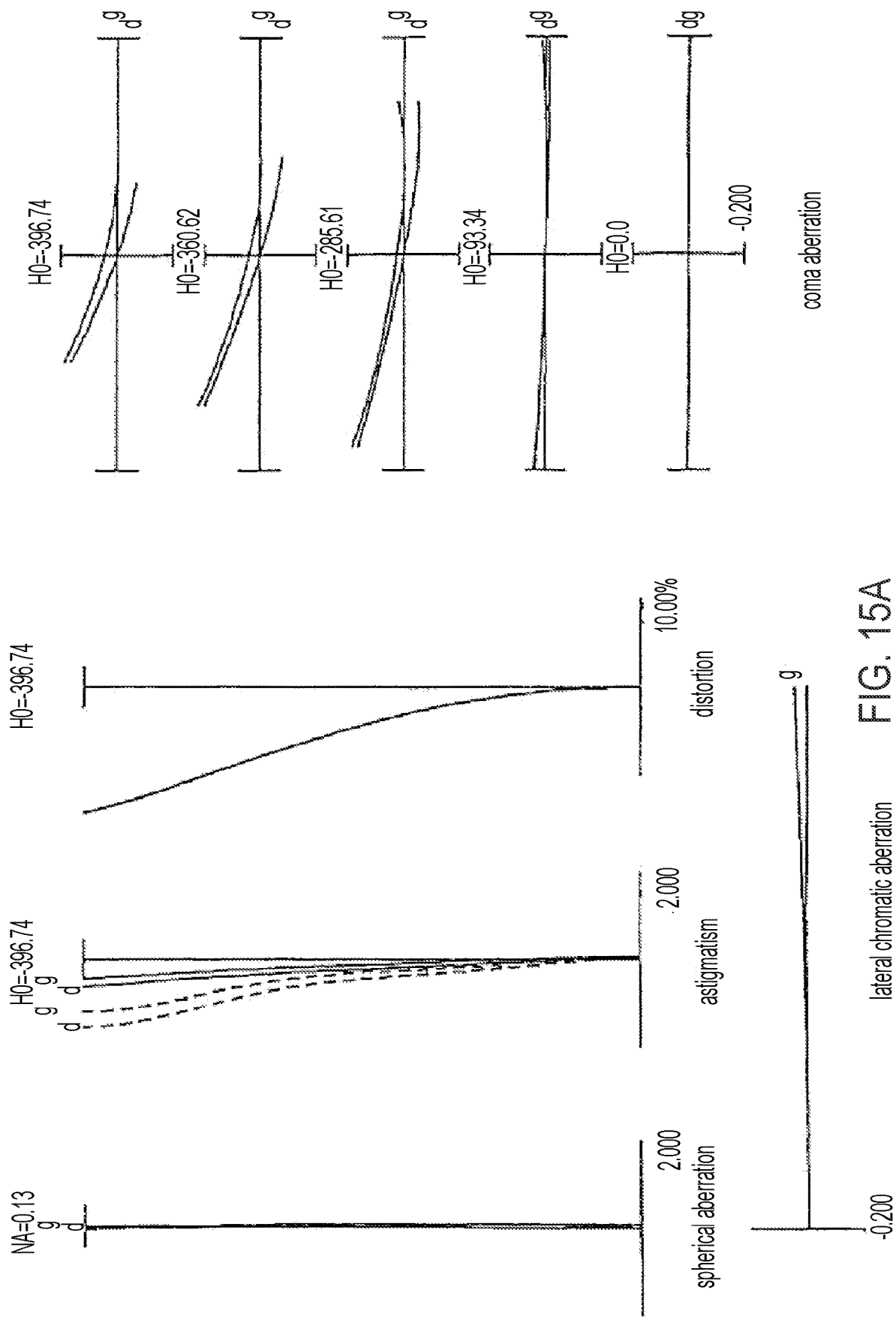
FIG. 15A, FIG. 15B and FIG. 15C are graphs showing various aberrations, upon focusing on a close distance object, in the wide angle end state, in the intermediate focal length state and in the telephoto end state, respectively, of the variable magnification optical system according to the Fifth Example.
Figure 15B:
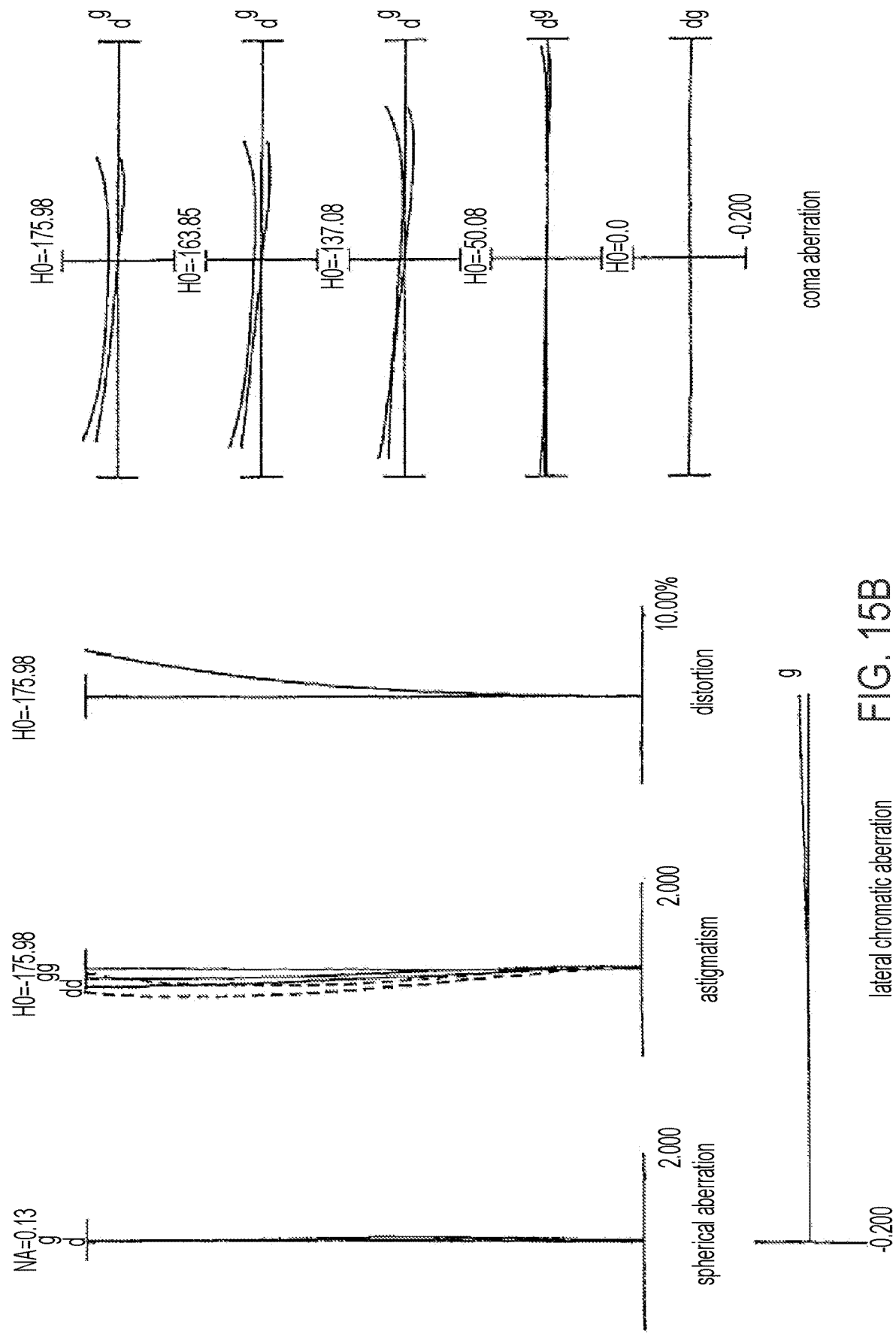
Figure 15C:
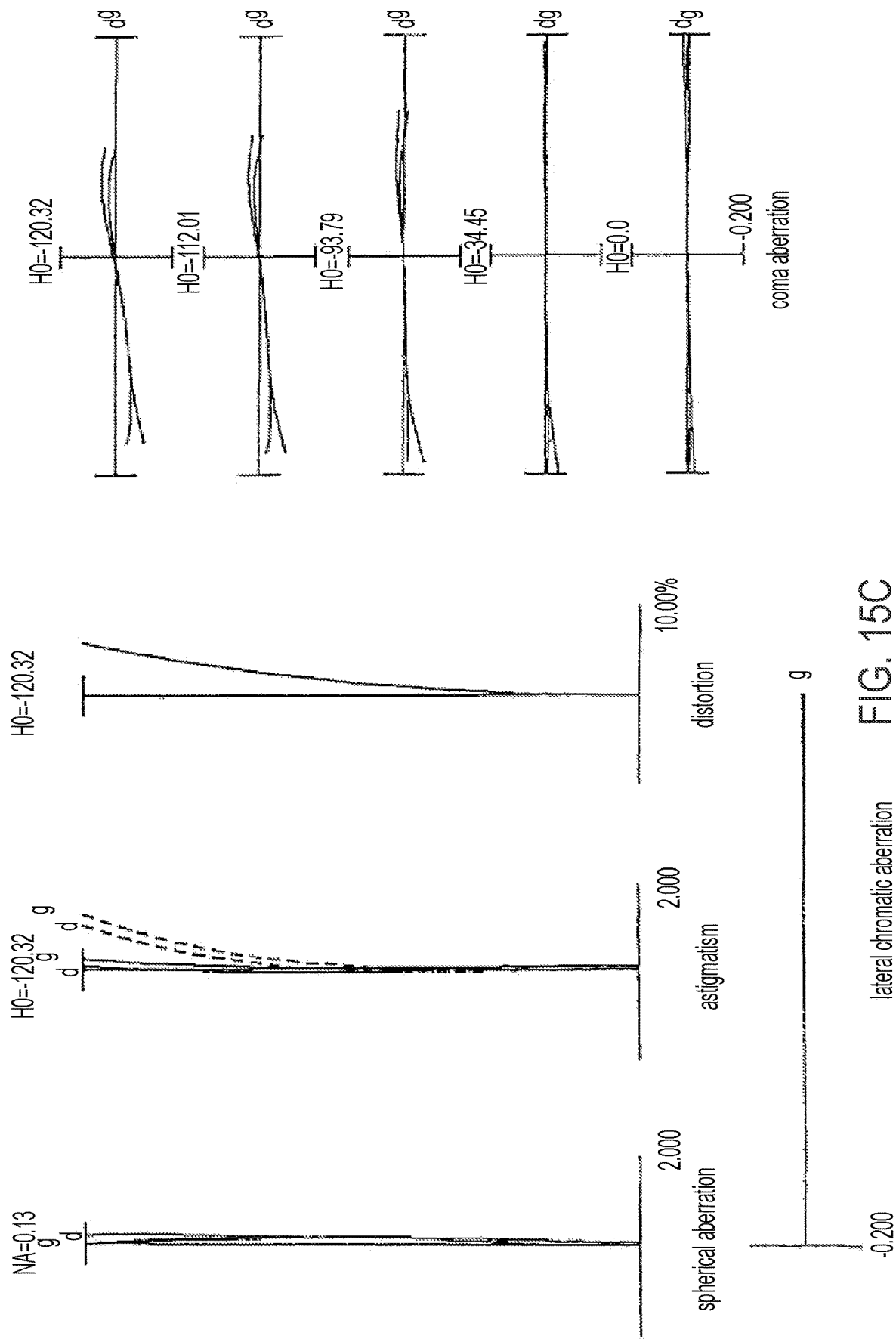

FIG. 15A, FIG. 15B and FIG. 15C are graphs showing various aberrations upon focusing on a close distance object, respectively, in the wide angle end state, in the intermediate focal length state and in the telephoto end state, of the variable magnification optical system according to the Fifth Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

According to the above described respective examples, it is possible to realize a variable magnification optical system which is compatible with a large-sized imaging device in spite that the optical system is small-sized, and which can correct superbly various aberrations upon varying magnification over the wide angle end state to the telephoto end state, and further has excellent imaging performance even upon focusing on a close distance object.

Meanwhile, in the variable magnification optical system relating to the present embodiment, a variable magnification ratio is on the order of 2 times to 10 times and a 35 mm-size converted focal length in the wide angle end state is on the order of 20 to 30 mm. Further, in the variable magnification optical system relating to the present embodiment, an F-number in the wide angle end state is on the order of f/2.0 to f/4.5, and the F-number in the tele photo end state is on the order of f/2.0 to f/6.3.

Further, each of the above described Examples is a concrete example of the present embodiment, and the present embodiment is not limited to the above described Examples. The contents described below can be adopted without deteriorating optical performance of the variable magnification optical systems according to the present embodiment.

Although variable magnification optical systems having a four group configuration, a five group configuration or a six group configuration were illustrated above as numerical examples of the variable magnification optical systems according to the present embodiment, the present embodiment is not limited to them and variable magnification optical systems having other configurations, such as seven group configuration, or the like, can be configured. Concretely, a configuration that a lens or a lens group is added to the most object side or to the most image side of the variable magnification optical system according to each of the above described Examples is possible. Alternatively, a lens or a lens group may be added between the first lens group G1 and the second lens group G2. Alternatively, a lens or a lens group may be added between the second lens group G2 and the third lens group G3. Alternatively, a lens or a lens group may be added between the third lens group G3 and the rear lens group GR.

Further, in each of the above described Examples, configurations that the rear lens group GR is composed of the fourth lens group G4, or of the fourth lens group G4 and the fifth lens group G5, or of the fourth lens group G4, the fifth lens group G5 and the sixth lens groups G6, were illustrated, but configurations are not limited to them.

Further, in each of the above described Examples, the focusing lens group is composed of one lens group or of a part of one lens group, but the focusing lens group may be composed of two or more lens groups. Auto focusing can be applied for such focusing group(s), and drive by motor for auto focusing, such as, ultrasonic motor, stepping motor VCM motor may be suitably adopted.

Further, in the variable magnification optical systems according to each of the above described Examples, any lens group in the entirety thereof or a portion thereof can be moved in a direction including a component perpendicular to the optical axis as a vibration reduction lens group, or rotationally moved (swayed) in an in-plane direction including the optical axis, whereby a configuration of a vibration reduction can be taken.

Further, in the variable magnification optical systems according to each of the above described Examples, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, in the variable magnification optical systems according to each of the above described Examples, it is preferable that the aperture stop S is disposed between the second lens group G2 and the third lens group G3, but the function may be substituted by a lens frame without disposing a member as an aperture stop.

Further, the lens surface(s) of the lenses configuring the variable magnification optical systems according to each of the above described Examples, may be coated with anti-reflection coating(s) having a high transmittance in a wide wavelength region. With this contrivance, it is feasible to reduce a flare as well as ghost and attain excellent optical performance with high contrast.

Next, a camera equipped with the variable magnification optical system according to the present embodiment, will be explained with referring to FIG. 16.

Figure 16:
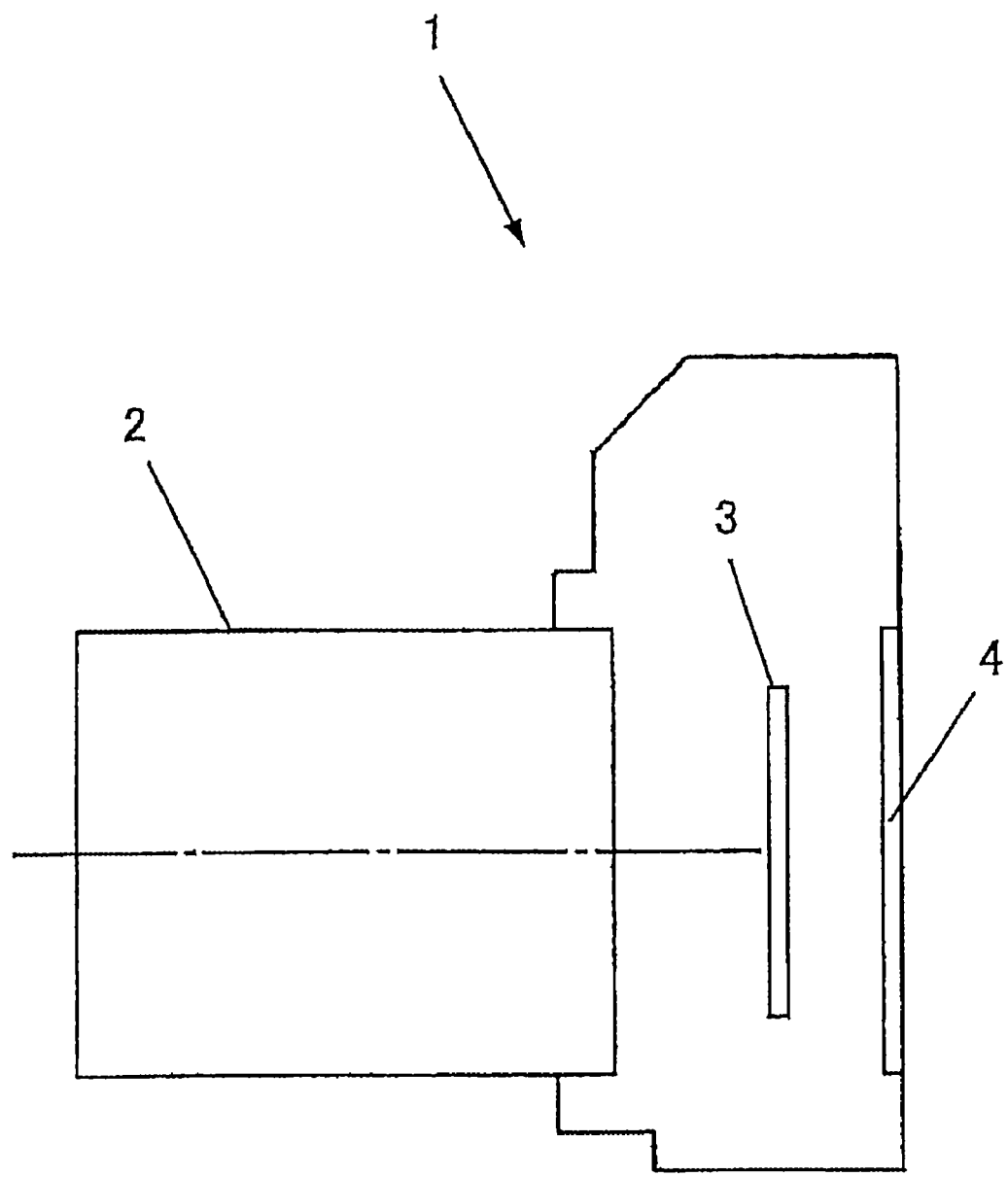
FIG. 16 is a view showing a configuration of a camera equipped with the variable magnification optical system.

FIG. 16 is a view showing a configuration of the camera equipped with the variable magnification optical system according to the present embodiment.

The camera 1 as shown in FIG. 16, is a so-called mirrorless camera of a lens interchangeable type equipped with the variable magnification optical system according to the first Example as an imaging lens 2.

In the present camera 1, a light emitted from an unillustrated object (an object to be photo-taken) is converged by the imaging lens 2, through an unillustrated OLPF (Optical low pass filter), and forms an image of the object on an imaging plane of an image pick-up portion 3. The light from the object is photo-electrically converted through a photoelectric conversion element provided on the image pick-up portion 3 to form a picture image of the object. This picture image is displayed on an EVF (electric view finder) 4 provided on the camera 1. Accordingly, a photographer can observe the object to be photo-taken through the EVF 4.

Further, upon unillustrated release button being depressed by the photographer, the picture image of the object formed by the image pick-up portion 3 is stored in an unillustrated memory. Thus, the photographer can take a photo of the object.

It is noted here that the variable magnification optical system relating to the First Example in which the present camera 1 is equipped with the imaging lens 2, has superb optical performance as described above and is made small in size. In other words, the present camera 1 can be made small in size and attain superb optical performances that various aberrations can be corrected well from the wide angle end state to the telephoto end state and excellent imaging performance is attained even upon focusing on a close distance object.

Incidentally, when there is configured a camera in which the variable magnification optical system according to any of the before-mentioned Second to Fifth Examples is installed as the imaging lens 2, the camera also can attain the same effects as those of the above-mentioned camera 1. Further, even when the variable magnification optical system according to any of the above Examples is installed in a camera of a single lens reflex type equipped with a quick return mirror in which the object image is observed through a finder optical system, the camera also can attain the same effects as those of the above-mentioned camera 1.

Figure 17:
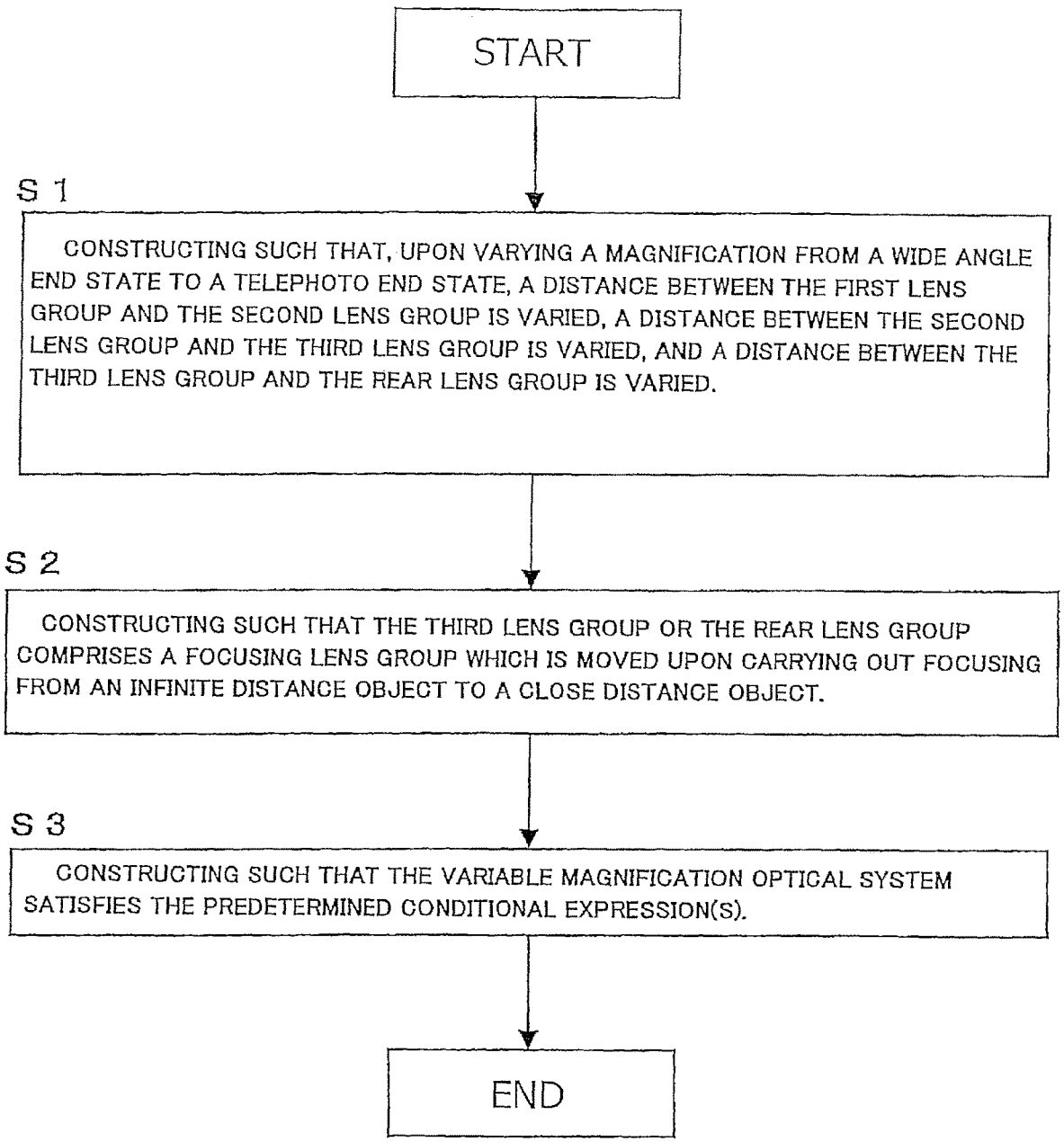
FIG. 17 is a flowchart schematically showing a method for manufacturing the variable magnification optical system.

Next, an outline of a method for manufacturing the variable magnification optical system according to the present embodiment, is described with referring to FIG. 17.

FIG. 17 is a flowchart schematically showing a method for manufacturing the variable magnification optical system according to the present embodiment.

The method for manufacturing the variable magnification optical system according to the present embodiment shown in FIG. 17, is a method for manufacturing a variable magnification optical system which comprises, in order from an object side, a first lens group having positive refractive power, a second lens group having negative refractive power, a third lens group having positive refractive power and a rear lens group having negative refractive power; the method comprising the following steps S1 to S3.

Step S1: constructing such that, upon varying a magnification from a wide angle end state to a telephoto end state, a distance between the first lens group and the second lens group is varied, a distance between the second lens group and the third lens group is varied, and a distance between the third lens group and the rear lens group is varied.

Step S2: constructing such that the third lens group or the rear lens group comprises a focusing lens group which is moved upon carrying out focusing from an infinite distance object to a close distance object.

Step S3: constructing such that the variable magnification optical system satisfies the following conditional expressions (1) and (2):

$$2.00 < f1/fw < 8.000 \tag{1}$$

$$0.400 < BFw/fw < 1.300 \tag{2}$$

where f1 denotes a focal length of the first lens group, fw denotes a focal length of the variable magnification optical system in the wide angle end state, BFw denotes a back focus of the variable magnification optical system in the wide angle end state, and fw denotes the focal length of the variable magnification optical system in the wide angle end state.

According to the above-stated method for manufacturing the variable magnification optical system according to the present embodiment, it is possible to realize a variable magnification optical system which is, while being downsized, compatible with a large-sized imaging device, and which can attain high optical performances that various aberrations can be corrected well over from the wide angle end state to the telephoto end state and which has excellent imaging performance even upon focusing on a close distance object.

EXPLANATION OF REFERENCE SYMBOLS

G1 first lens group
G2 second lens group
G3 third lens group
G4 fourth lens group
G5 fifth lens group
G6 sixth lens group
GR rear lens group
S aperture stop
I image plane

What is claimed is:

1. A variable magnification optical system comprising, in order from an object side, a first lens group having positive refractive power, a second lens group having negative refractive power, a third lens group having positive refractive power, and a rear lens group comprising at least one lens group;

upon varying a magnification, distances between adjacent lens groups being varied;

said rear lens group having negative refractive power in a wide angle end state;

the number of positive lenses in said first lens group being one;

said third lens group or said rear lens group comprising a focusing lens group which is moved upon carrying out focusing; and the following conditional expressions being satisfied:

$$2.00 < f1/fw < 8.000$$

$$0.400 < BFw/fw < 1.300$$

$$1.100 < \beta Fw < 2.500$$

where f1 denotes a focal length of said first lens group, fw denotes a focal length of said variable magnification optical system in the wide angle end state, BFw denotes a back focus of said variable magnification optical system in the wide angle end state, and βFw denotes a transverse magnification of said focusing lens group in the wide angle end state.

2. A variable magnification optical system according to claim 1, wherein a positive lens of said first lens group is a meniscus lens with a convex surface directed to the object side.

3. A variable magnification optical system according to claim 1, wherein the following conditional expression is satisfied:

$$4.000 < f1/f1Rw < 9.000$$

where f1Rw denotes a composite focal length of lens groups in the wide angle end state disposed on the side which is closer to an image plane than said first lens group.

4. A variable magnification optical system according to claim 1, wherein the following conditional expression is satisfied:

$$0.500 < f2fn/f2 < 1.100$$

where f2fn denotes a focal length of a most object side lens component in said second lens group and f2 denotes a focal length of said second lens group.

5. A variable magnification optical system according to claim 1, wherein the following conditional expression is satisfied:

$$0.300 < |fF|/ft < 1.000$$

where fF denotes a focal length of said focusing lens group and ft denotes a focal length of said variable magnification optical system in a telephoto end state.

6. A variable magnification optical system according to claim 1, wherein the following conditional expression is satisfied:

$$40.00° < \omega w < 85.00°$$

where ωw denotes a half angle of view of said variable magnification optical system in the wide angle end state.

7. A variable magnification optical system according to claim 1, wherein said rear lens group comprises a most image sided final lens group consisting of one positive lens, and at the object side of said final lens group and adjacent thereto, a lens group consisting of one negative lens.

8. A variable magnification optical system according to claim 7, wherein said first lens group consists of one lens component which includes a single lens or a cemented lens composed of two or more lenses cemented together.

9. An optical apparatus comprising a variable magnification optical system according to claim 1.

10. A variable magnification optical system comprising, in order from an object side, a first lens group having positive refractive power, a second lens group having negative refractive power, a third lens group having positive refractive power, and a rear lens group comprising at least one lens group;
upon varying a magnification, distances between adjacent lens groups being varied;
said rear lens group having negative refractive power in a wide angle end state;
the number of positive lenses in said first lens group being one;
said third lens group or said rear lens group comprising a focusing lens group which is moved upon carrying out focusing; and
the following conditional expressions being satisfied:

$$2.00 < f1/fw < 8.000$$

$$0.400 < BFw/fw < 1.300$$

where f1 denotes a focal length of said first lens group, fw denotes a focal length of said variable magnification optical system in the wide angle end state, and BFw denotes a back focus of said variable magnification optical system in the wide angle end state,
wherein said rear lens group comprises a most image sided final lens group consisting of one positive lens, and at the object side of said final lens group and adjacent thereto, a lens group consisting of one negative lens, and
said final lens group consists of a meniscus lens with a concave surface directed to the object side.

11. A variable magnification optical system according to claim 10, wherein the following conditional expression is satisfied:

$$0.500 < 1/\beta Rw < 1.200$$

where βRw denotes a transverse magnification of a lens group disposed at the most image side in the wide angle end state.

12. A variable magnification optical system according to claim 10, wherein said final lens group is fixed relative to an image plane upon varying a magnification.

13. A variable magnification optical system according to claim 10, wherein a positive lens of said first lens group is a meniscus lens with a convex surface directed to the object side.

14. A variable magnification optical system according to claim 10, wherein the following conditional expression is satisfied:

$$4.000 < f1/f1Rw < 9.000$$

where f1Rw denotes a composite focal length of lens groups in the wide angle end state disposed on the side which is closer to an image plane than said first lens group.

15. A variable magnification optical system according to claim 10, wherein the following conditional expression is satisfied:

$$0.500 < f2fn/f2 < 1.100$$

where f2fn denotes a focal length of a most object side lens component in said second lens group and f2 denotes a focal length of said second lens group.

16. A variable magnification optical system according to claim 10, wherein the following conditional expression is satisfied:

$$0.300 < |fF|/ft < 1.000$$

where fF denotes a focal length of said focusing lens group and ft denotes a focal length of said variable magnification optical system in a telephoto end state.

17. A variable magnification optical system according to claim 10, wherein the following conditional expression is satisfied:

$$40.00° < \omega w < 85.00°$$

where ωw denotes a half angle of view of said variable magnification optical system in the wide angle end state.

18. A variable magnification optical system according to claim 10, wherein said first lens group consists of one lens component which includes a single lens or a cemented lens composed of two or more lenses cemented together.

19. An optical apparatus comprising a variable magnification optical system according to claim 10.

20. A variable magnification optical system comprising, in order from an object side, a first lens group having positive refractive power, a second lens group having negative refractive power, a third lens group having positive refractive power, and a rear lens group comprising at least one lens group;

upon varying a magnification, distances between adjacent lens groups being varied;

said rear lens group having negative refractive power in a wide angle end state;

the number of positive lenses in said first lens group being one;

said third lens group or said rear lens group comprising a focusing lens group which is moved upon carrying out focusing; and the following conditional expressions being satisfied:

$$2.00 < f1/fw < 8.000$$

$$0.400 < BFw/fw < 1.300$$

$$0.500 < 1/\beta Rw < 1.200$$

where f1 denotes a focal length of said first lens group, fw denotes a focal length of said variable magnification optical system in the wide angle end state, BFw denotes a back focus of said variable magnification optical system in the wide angle end state, and βRw denotes a transverse magnification of a lens group disposed at the most image side in the wide angle end state.

21. An optical apparatus comprising a variable magnification optical system according to claim 20.

* * * * *